United States Patent
Kuroda

(10) Patent No.: US 10,696,881 B2
(45) Date of Patent: Jun. 30, 2020

(54) SILICONE ADHESIVE COMPOSITION AND AN ADHESIVE TAPE

(71) Applicant: SHIN-ETSU CHEMICAL CO., LTD., Tokyo (JP)

(72) Inventor: Yasuyoshi Kuroda, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 90 days.

(21) Appl. No.: 15/570,073

(22) PCT Filed: Apr. 21, 2016

(86) PCT No.: PCT/JP2016/062661
§ 371 (c)(1),
(2) Date: Oct. 27, 2017

(87) PCT Pub. No.: WO2016/175129
PCT Pub. Date: Nov. 3, 2016

(65) Prior Publication Data
US 2018/0118988 A1 May 3, 2018

(30) Foreign Application Priority Data

Apr. 28, 2015 (JP) ................... 2015-091473
Apr. 28, 2015 (JP) ................... 2015-091528

(51) Int. Cl.
| | |
|---|---|
| C09J 183/04 | (2006.01) |
| C09J 11/06 | (2006.01) |
| C09J 7/20 | (2018.01) |
| C08G 77/12 | (2006.01) |
| C08G 77/20 | (2006.01) |

(52) U.S. Cl.
CPC ............... *C09J 183/04* (2013.01); *C09J 7/20* (2018.01); *C09J 11/06* (2013.01); *C08G 77/12* (2013.01); *C08G 77/20* (2013.01)

(58) Field of Classification Search
CPC . C09J 183/04; C09J 7/20; C09J 11/06; C08G 77/12; C08G 77/20
USPC ....................................................... 428/447
See application file for complete search history.

(56) References Cited

U.S. PATENT DOCUMENTS

| | | | |
|---|---|---|---|
| 4,749,612 A | 6/1988 | Borkowski et al. | |
| 6,991,751 B2 | 1/2006 | Fukushima et al. | |
| 2004/0041131 A1 | 3/2004 | Fukushima et al. | |
| 2009/0012218 A1 | 1/2009 | Kuroda | |
| 2011/0118378 A1* | 5/2011 | Bublewitz | A61K 6/10 523/109 |
| 2012/0231245 A1* | 9/2012 | Kim | C09J 4/00 428/212 |

FOREIGN PATENT DOCUMENTS

| | | | |
|---|---|---|---|
| JP | 61-136573 A | 6/1986 | |
| JP | 63-380 A | 1/1988 | |
| JP | 4-135791 A | 5/1992 | |
| JP | 4-216887 A | 8/1992 | |
| JP | 6-220408 A | 8/1994 | |
| JP | 2003-306654 A | 10/2003 | |
| JP | 2004-91703 A | 3/2004 | |
| JP | 2004-91750 A | 3/2004 | |
| JP | 2005-154491 A | 6/2005 | |
| JP | 5309714 B2 | 7/2013 | |

OTHER PUBLICATIONS

International Search Report dated Aug. 2, 2016, in PCT International Application No. PCT/JP2016/062661.
Written Opinion of the International Searching Authority dated Aug. 2, 2016, in PCT International Application No. PCT/JP2016/062661.

* cited by examiner

*Primary Examiner* — William K Cheung
(74) *Attorney, Agent, or Firm* — Birch, Stewart, Kolasch & Birch, LLP

(57) ABSTRACT

One of the purposes of the present invention is to provide a silicone adhesive composition which provides an adhesive layer having an excellent antistatic property and which has an excellent strength of bond to a tape substrate and, therefore, when an adhesive tape or film having the adhesive layer is peeled from a tape-stuck body, less residual adhesive occurs on the tape-stuck body. The other purpose of the present invention is to provide a silicone adhesive composition which cures well by heating for a short time, particularly for less than 5 minutes, to provide an adhesive layer having an excellent antistatic property. The present invention first provides a silicone adhesive composition comprising (A) an addition reaction-curable silicone, (B1) a compound having at least two unsaturated hydrocarbon groups and two (poly)oxyalkylene residues in one molecule, and (C) an ionic liquid containing no lithium. The present invention secondly provides a silicone adhesive composition comprising (A) an addition reaction-curable silicone, (B) a compound having at least one unsaturated hydrocarbon group and at least one (poly)oxyalkylene residue in one molecule, (C) an ionic liquid containing no lithium and (e) a platinum group metal catalyst which is not a complex with a compound having an unsaturated hydrocarbon bond.

16 Claims, No Drawings

SILICONE ADHESIVE COMPOSITION AND AN ADHESIVE TAPE

This application is a national stage application under 35 USC 371 of international application PCT/JP2016/062661 filed Apr. 21, 2016, which claims priority from Japan application 2015-091528 filed Apr. 28, 2015 and from Japan application 2015-091473 filed Apr. 28, 2015, the entire contents of which are hereby incorporated herein by reference.

FIELD OF THE INVENTION

The present invention relates to a silicone adhesive composition and an adhesive tape. More particularly, the present invention relates to a silicone adhesive composition having an excellent antistatic property and to an adhesive tape comprising the composition.

BACKGROUND OF THE INVENTION

Recently, electronic equipments have become thinner, lighter and smaller. Accordingly, electronic parts to be mounted in the electronic equipments have also become smaller. Silicone adhesive tapes have been widely used as an adhesive tape in processing because of their high heat resistance and as an adhesive tape in transfer because of their good peelability.

However, silicone adhesives are electrically highly insulating and, therefore, may cause peeling electrification and, at worst, may cause a dielectric breakdown of the electronic part when a thin and small electronic part is peeled. In order to prevent the peeling electrification, it is needed to develop an antistatic silicone adhesive.

For example, Patent Literatures 1 and 2 describe antistatic adhesive tapes whose tape substrates are antistatic. Such adhesive tapes have problems that tape substrates to be used are limited, and peeling electrification is not prevented in a case where the adhesive is electrically insulating. Patent Literatures 3, 4 and 5 describe antistatic adhesive tapes having an antistatic layer between an adhesive layer and a tape substrate. The use of an adhesive tape worsens productivity due to steps of the production of the adhesive tape. Further, peeling electrification is not prevented in a case where the adhesive is electrically insulating, as described for the aforesaid antistatic adhesive tape.

Patent Literatures 6, 7, 8 and 9 describe antistatic adhesive tapes whose adhesives are antistatic. Patent Literature 6 describes that the adhesive comprises carbon black. Patent Literature 7 describes that the adhesive comprises a polyol. Patent Literatures 8 and 9 describe that the adhesive comprises electrically conductive microparticles dispersed therein.

A polyether polyol is less compatible with a silicone adhesive. Therefore, the adhesive comprising the polyol may be cloudy and cause separation of the polyol with time. The compound needs to be added in a large amount and, therefore, the adhesive comprising the compound may not have a desired adhesion strength. Further, in a case where this adhesive is used to form an adhesive tape, a strength of bond between the adhesive and a tape substrate is lower, so that the adhesive may remain on a tape-stuck body when the adhesive tape is peeled from the tape-stuck body. The adhesive comprising carbon black has such disadvantages that washing of an apparatus for producing an adhesive tape is a troublesome work due to carbon black; the adhesive tape has an opaque, black appearance and an unstable surface resistivity; and carbon remains on a tape-stuck body such as an electronic element after the adhesive tape is peeled from the tape-stuck body. Further, the adhesive comprising electrically conductive microparticles is opaque, and may not attain a desired performance due to separation of the electrically conductive microparticles caused by a difference in specific gravities between the adhesive composition and the electrically conductive microparticles.

Patent Literature 10 describes a silicone adhesive composition comprising an ion conductive antistatic agent which is a lithium salt, and that a silicone adhesive tape comprising the adhesive composition has an excellent antistatic property and maintains the antistatic property even after exposed to a high temperature for a long time. This Literature also describes that the antistatic property is improved by adding the ion conductive antistatic agent in such a manner that the agent is dissolved in an organic solvent having an oxyalkylene group. Patent Literature 10 refers to the following compounds as the organic solvent having an oxyalkylene group:

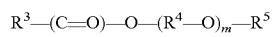

wherein $R^3$ is an alkyl group having 1 to 12 carbon atoms, $R^4$ may be identical to or different from each other and are each a polymethylene group having 2 to 8 carbon atoms, $R^5$ is a hydrogen atom or an alkyl group having 1 to 12 carbon atoms, and m is an integer of 2 to 50, and

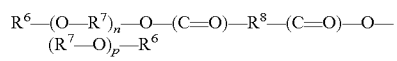

wherein $R^6$ may be identical to or different from each other and are each a hydrogen atom or an alkyl group having 1 to 12 carbon atoms, $R^7$ and $R^8$ may be identical to or different from each other and are each an ethylene group or a polymethylene group having 3 to 12 carbon atoms, and n and p may be identical to or different from each other and are each an integer of 2 to 50.

PRIOR LITERATURES

Patent Literatures

Patent Literature 1: JP application Laid-Open Hei 4-216887/1992
Patent Literature 2: JP Application Laid-Open 2003-306654
Patent Literature 3: JP Application Laid-Open Sho 63-380/1988
Patent Literature 4: JP Application Laid-Open Hei 4-135791/1992
Patent Literature 5: JP Application Laid-Open Hei 6-220408/1994
Patent Literature 6: JP Application Laid-Open Sho 61-136573/1986
Patent Literature 7: JP Application Laid-Open 2005-154491
Patent Literature 8: JP Application Laid-Open 2004-091703
Patent Literature 9: JP Application Laid-Open 2004-091750
Patent Literature 10: Japanese Patent No. 5309714

SUMMARY OF THE INVENTION

Problems to be Solved by the Invention

The oxyalkylene solvent described in Patent Literature 10 has poor compatibility with a silicone adhesive and, therefore, may separate from the adhesive layer after the adhesive layer is cured, which leads to insufficient curing. Further, an adhesive tape having the adhesive layer has a problem that a strength of bond between the adhesive layer and a tape substrate is low due to the separation of the oxyalkylene solvent.

When the lithium salt described in Patent Literature 10 is added as an antistatic agent to a silicone adhesive composition, it worsens a strength of bond between the adhesive layer and a tape substrate. Therefore, in the production of an adhesive tape having the adhesive layer on a tape substrate, it is necessary to use, as a release film put on the adhesive layer, a film which has a fluorine-modified silicone release agent layer which is easy to be released. Further, when the aforesaid adhesive tape is peeled from a tape-stuck body, an adhesive may remain on the tape-stuck body and, thus, the adhesive tape may not clearly be peeled.

In view of the aforesaid circumstances, the present invention aims first to provide a silicone adhesive which provides an adhesive layer having an excellent antistatic property and has an excellent strength of bond to a tape substrate so that a less adhesive remains on a tape-stuck body after an adhesive tape or film having the adhesive layer is peeled from the tape-stuck body.

The present inventor has first found that when a silicone adhesive composition which is addition reaction-curable comprises a compound having at least two unsaturated hydrocarbon groups and two (poly)oxyalkylene residues in one molecule together with an ionic liquid containing no lithium, the aforesaid problems are solved. Thus, the present invention has been completed.

Further, the present inventor has carried out earnest research in view of the aforesaid circumstances and found that when a silicone adhesive composition which is addition reaction-curable comprises a (poly)oxyalkylene compound having at least one unsaturated hydrocarbon group in one molecule together with an ionic liquid containing no lithium, curability of the composition and an antistatic property of a cured product of the composition are improved. Meanwhile, a silicone adhesive composition which is addition reaction-curable generally comprises a platinum group metal catalyst as a reaction catalyst. In particular, a reaction product of chloroplatinic acid with an olefinic compound and a reaction product of chloroplatinic acid with a vinyl group-containing siloxane are preferred in view of stability in storage. However, when a platinum group metal catalyst which is a complex with such a compound having an unsaturated hydrocarbon group is added to a silicone composition comprising an oxyalkylene compound having an unsaturated hydrocarbon group, curability of the composition is lower, compared to a composition comprising no oxyalkylene compound having an unsaturated hydrocarbon group. Thus, the silicone adhesive does not sufficiently cure by heating for a short time, in particular, for less than 5 minutes and, therefore, a strength of bond to a tape substrate is lower. Therefore, the present invention aims secondly to provide a silicone adhesive composition which cures well by heating for a short time, in particular for less than 5 minutes, to give an adhesive layer having an excellent antistatic property.

The present inventor has secondly found that when a silicone adhesive composition which is addition reaction-curable comprises a compound having at least one unsaturated hydrocarbon group and at least one (poly)oxyalkylene residue in one molecule, an ionic liquid containing no lithium and further, as an addition reaction catalyst, a platinum group metal catalyst which is not a complex with a compound having an unsaturated hydrocarbon group, the composition cures well in a short time to give an adhesive layer having an excellent antistatic property. Thus, the present invention has been completed.

Thus, the present invention first provides a silicone adhesive composition comprising
(A) an addition reaction-curable silicone,
(B1) a compound having at least two unsaturated hydrocarbon groups and two (poly)oxyalkylene residues in one molecule, and
(C) an ionic liquid containing no lithium.

The present invention secondly provides a silicone adhesive composition comprising
(A) an addition reaction-curable silicone,
(B) a compound having at least one unsaturated hydrocarbon group and at least one (poly)oxyalkylene residue in one molecule,
(C) an ionic liquid containing no lithium, and
(e) a platinum group metal catalyst which is not a complex with a compound having an unsaturated hydrocarbon bond.

The present invention also provides an adhesive tape or film comprising a sheet substrate of which at least one surface is laminated with a cured product of the first or second silicone adhesive composition.

Effects of the Invention

The first silicone adhesive composition provides an adhesive layer having an excellent antistatic property and an excellent strength of bond to the sheet substrate. The second silicone adhesive composition cures well in a short time to give an adhesive layer having an excellent antistatic property. This silicone adhesive composition cures well by heating for a short time, in particular for less than 5 minutes, at a predetermined temperature and, therefore, is advantageous in view of productivity find costs. After the adhesive tape or film comprising an adhesive layer obtained from the present silicone adhesive composition is peeled from a tape-stuck body, a less amount of the adhesive composition remains on the tape-stuck body. Therefore, the tape-stuck body is not contaminated. Accordingly, the adhesive tape or film may be suitably used for masking electronic parts. Further, the adhesive tape or film may be suitably used in situations where generation of static electricity is undesirable.

BEST MODE OF THE INVENTION

The present invention will be described below in detail.

First Embodiment

The first silicone adhesive composition is characterized by being addition reaction-curable and comprising (B1) a (poly)oxyalkylene compound having a specific structure and (C) a specific ionic liquid. Any other components than components (B1) and (C) may be incorporated in the silicone adhesive composition. Component (A), addition reaction-curable silicone, may be any conventional organopolysiloxane, such as an organopolysiloxane having an alkenyl group, a silicone resin and an organohydogenpolysiloxane. The characteristic components (B1) and (C) will be explained first below.

(B1) (Poly)oxyalkylene Compound

In the first embodiment according to the present invention, component (B1) is a compound having at least two unsaturated hydrocarbon groups and two (poly)oxyalkylene residues in one molecule. One of the characteristics of the (poly)oxyalkylene compound is that the compound has at least two unsaturated hydrocarbon groups in one molecule. Accordingly, the (poly)oxyalkylene compound may react with an organohydrogenpolysiloxane contained in the silicone adhesive composition to be bonded strongly in a cured product of the composition, i.e., adhesive layer. Therefore, the (poly)oxyalkylene compound does not leave the adhesive layer with time, a strength of bond between a sheet substrate and the adhesive layer is improved, and a tape-stuck body is less contaminated.

Another characteristic of the (poly)oxyalkylene compound (B1) is in that the compound has two (poly)oxyalkylene residues in one molecule. The (poly)oxyalkylene residue has a structure composed of at least one oxyalkylene group, preferably a structure where two or more oxyalkylene groups are bonded to each other in a linear manner. Particularly, it is preferred that the two (poly)oxyalkylene residues are each represented by $—(C_2H_4O)_m—(C_3H_6O)_n—$, wherein m is a real number of 0 to 20, n is a real number of 0 to 10, m+n is 1 to 30, and $(C_2H_4O)$ and $(C_3H_6O)$ may be bonded in random order. The present invention is characterized in that the number of the (poly)oxyalkylene residue in the compound (B1) is two in one molecule. The compound having such a structure incorporated in the silicone adhesive composition together with the ionic liquid (C) described hereinafter, so that a surface resistivity of the silicone adhesive layer is lowered. It is considered that this is because the oxyalkylene residues capture ions of the ionic liquid and efficiently cause the ions to move in the cured product, adhesive layer. To explain the decrease of the surface resistivity in more detail, a cured product of a silicone adhesive composition comprising no ionic liquid nor (poly)oxyalkylene compound has a surface resistivity larger than 1E+15 Ω/sq., i.e., $1\times10^{15}$ Ω/sq., and a cured product of a silicone adhesive composition comprising only the ionic liquid has a surface resistivity of 1E+13 to 1E+14 Ω/sq., i.e., $1\times10^{13}$ to $1\times10^{14}$ Ω/sq. Meanwhile, the cured product of the silicone adhesive composition comprising the ionic liquid and the (poly)oxyalkylene compound has a surface resistivity of 1E+9 to less than 1E+13 Ω/sq., i.e., $1\times10^9$ to less than $1\times10^{13}$ Ω/sq., preferably 1E+9 to 9.9E+12 Ω/sq., i.e., $1\times10^9$ to $9.9\times10^{12}$ Ω/sq., in particular, 1E+10 to 9.9E+11 Ω/sq., i.e., $1\times10^{10}$ to $9.9\times10^{11}$ Ω/sq. The surface resistivity in the present invention is determined according to the Japanese Industrial Standards (JIS) K6911.

In the silicone adhesive composition according to the first embodiment, if the (poly)oxyalkylene compound has only one unsaturated hydrocarbon group, the (poly)oxyalkylene compound is not sufficiently bonded in the adhesive layer and, therefore, a strength of bond between the adhesive layer and a sheet substrate is lower, so that an adhesive material remains on a tape-stuck body after an adhesive tape having the adhesive layer is peeled from the tape-stuck body, that is, a so-called residual adhesive occurs on the tape-stuck body. The residual adhesive may occur even if primer treatment is carried out to improve the strength of bond between the adhesive layer and the sheet substrate. If the (poly)oxyalkylene compound having at least two unsaturated hydrocarbon groups has only one (poly)oxyalkylene residue in one molecule, the silicone adhesive composition has a less decreased surface resistivity, so that the adhesive layer does not have a sufficient antistatic property. It is noted that an oxyalkylene compound having one unsaturated hydrocarbon group and one (poly)oxyalkylene residue in one molecule may provide a good antistatic property, but at strength of bond between the adhesive layer and a sheet substrate is poor, because the number of the unsaturated hydrocarbon group is one.

The unsaturated hydrocarbon group is preferably an alkenyl group having 2 to 12 carbon atoms, more preferably 2 to 10 carbon atoms. A vinyl group and an allyl group are preferred. The (poly)oxyalkylene compound has at least two organic groups having the unsaturated hydrocarbon group in one molecule. The organic group having the unsaturated hydrocarbon group is preferably an aliphatic hydrocarbon group which has an unsaturated bond and may have an oxygen atom. Particularly, the aliphatic hydrocarbon group is preferably an alkenyl group-containing aliphatic hydrocarbon group which has 2 to 12 carbon atoms, more preferably 2 to 10 carbon atoms and may have an oxygen atom, and includes a vinyl group, an allyl group, a hexenyl group, an octenyl group, an acryloylpropyl group, an acryloylmethyl group, a methacryloylpropyl group, an acryloxypropyl group, an acryloxymethyl group, a methacryloxypropyl group, a methacryloxymethyl group, a cyclohexenylethyl group, a vinyloxypropyl group, an allyloxy group and an allyloxymethyl group. Among these, an allyl group, a vinyl group, an allyloxy group and an allyloxymethyl group are preferred. A vinyl group is preferred from the industrial viewpoint.

It is preferred that the (poly)oxyalkylene compound volatilizes hardly at 130 degrees C. or lower and normal pressure. A (poly)oxyalkylene compound which volatilizes at 130 degrees C. or lower volatilizes in a process for curing the adhesive composition and, therefore, does not remain in a cured product of the adhesive composition. As a result, the cured product may not have a good antistatic effect.

The (poly)oxyalkylene compound (B1) may be any known compound as long as the compound has at least, two unsaturated hydrocarbon groups and two (poly)oxyalkylene residues in one molecule. The number of the unsaturated hydrocarbon groups is preferably 2 to 4, in particular, 2. Particularly, the (poly)oxyalkylene residue is preferably $—(C_2H_4O)_m—(C_3H_6O)_n—$. The (poly)oxyalkylene compound (B1) is particularly one represented by the following formula (1). In the formula (1), $(C_2H_4O)$ and $(C_3H_6O)$ may be bonded in random order. The formula (1) may be an average compositional formula.

(1)

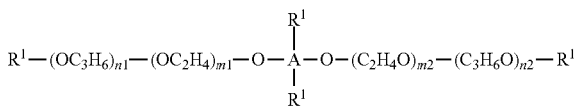

In the formula (1), A is a tetravalent hydrocarbon group having 2 to 22 carbon atoms, $R^1$ is, independently of each other, a hydrogen atom, an acyl group, or a monovalent hydrocarbon group which has 1 to 12 carbon atoms, may have an unsaturated bond and may have an oxygen atom, wherein at least two $R^1$'s are each an aliphatic hydrocarbon group which has 2 to 12 carbon atoms and an unsaturated bond and may have an oxygen atom.

In the formula (1) $m^1$ and $m^2$ are, independently of each other, a real number of 0 to 20, and $n^1$ and $n^2$ are, independently of each other, a real number of 0 to 10, provided that $m^1+n^1$ is not zero and $m^2+n^2$ is not zero. Each of $m^1$, $m^2$, $n^1$ and $n^2$ may be an average value. Preferably, $m^1+n^1$ is 1 to 30 and $m^2+n^2$ is 1 to 30. More preferably, $m^1+n^1$ is 4 to 20 and $m^2+n^2$ is 4 to 20. In particular, $m^1+n^1+m^2+n^2$ is 40 or less. If $m^1$, $m^2$, $n^1$ or $n^2$ is larger than the upper limit, the polyoxyalkylene compound may have a larger viscosity and, therefore, poor dispersibility, so that it may be difficult to uniformly disperse the compound in the silicone adhesive composition.

The ions move easier when oxygen atoms are closer to each other. Therefore, it is particularly preferred that both of $n^1$ and $n^2$ in the formula (1) are zero, that is, the (poly)oxyalkylene residues do not comprise an oxypropylene group. Such a (poly)oxyalkylene compound (B1) is represented by the formula (2):

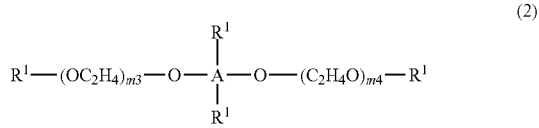

(2)

In the formula (2), A and $R^1$ are as defined above, and $m^3$ and $m^4$ are, independently of each other, a real number of 1 to 20, preferably a real number of 1 to 10, more preferably a real number of 2 to 10. If $m^3$ or $m^4$ is larger than the upper limit, the polyoxyalkylene compound may have a larger viscosity and, therefore, poor dispersibility, so that it may be difficult to uniformly disperse the compound in the silicone adhesive composition.

In the formulas (1) and (2), $R^1$ is, independently of each other, a hydrogen atom, sin acyl group, or a monovalent hydrocarbon group which has 1 to 12 carbon atoms, may have an unsaturated bond and may have an oxygen atom, wherein at least two $R^1$'s are each an aliphatic hydrocarbon group which has 2 to 12 carbon atoms and an unsaturated bond and may have an oxygen atom. The unsaturated hydrocarbon group may be those mentioned above. In particular, an allyl group, a vinyl group and an allyoxymethyl group are preferred. Examples of the monovalent hydrocarbon groups other than the unsaturated aliphatic hydrocarbon groups include alkyl groups such as a methyl group, an ethyl group, a propyl group, an isopropyl group, a butyl group and an octyl group; cycloalkyl groups such as a cyclopentyl group and a cyclohexyl group; aryl groups such as a phenyl group, a tolyl group and a naphthyl group; aralkyl groups such as a benzyl group, a phenylethyl group and a phenylpropyl group; such groups that a part or the whole of the hydrogen atoms bonded to carbon atoms may be replaced with, for example, a halogen atom such as fluorine, bromine and chlorine atoms, for example, halogenated monovalent hydrocarbon groups such as a trifluoropropyl group and a chloropropyl group; and a 3-methacryloxy propyl group and a 3-glycidyloxypropyl group. Among these, a methyl group is particularly preferred. Examples of the acyl group include an acetyl group, a propionyl group, an acryloyl group, a methacryloyl group and an octanoyl group. $R^1$ which is not the unsaturated aliphatic hydrocarbon groups is preferably a hydrogen atom.

In the formulas (1) and (2), A is a tetravalent hydrocarbon group having 2 to 22 carbon atoms. The tetravalent hydrocarbon group is preferably a linear or branched, aliphatic saturated hydrocarbon group having 2 to 16, preferably 2 to 8, carbon atoms, or a cyclic hydrocarbon group which has 6 to 22, preferably 6 to 14, carbon atoms and may have a branched chain. Examples of the linear or branched, tetravalent aliphatic saturated hydrocarbon group include those represented by the following formulas:

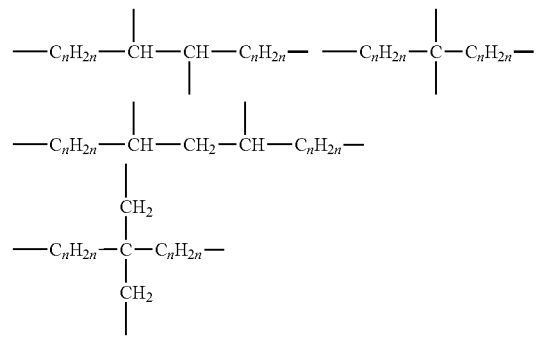

In the formulas, n is, independently of each other, an integer of 1 to 8. Examples of the tetravalent cyclic hydrocarbon group include those represented by the following formulas:

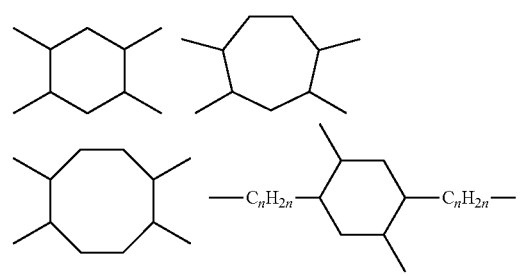

In the formulas, n is, independently of each other, an integer of 1 to 8.

Examples of the (poly)oxyalkylene compound (B1) include the following:

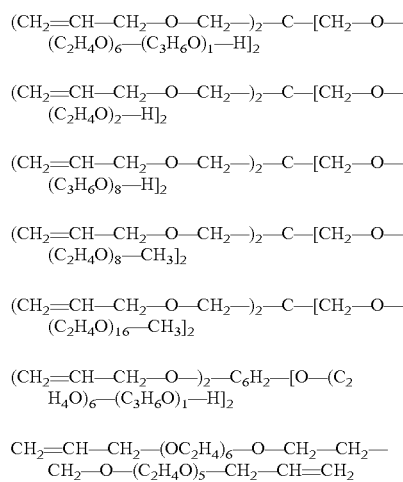

$(CH_2=CH-CH_2-O-CH_2-)_2-C-[CH_2-O-(C_2H_4O)_6-(C_3H_6O)_1-H]_2$ $(CH_2=CH-CH_2-O-CH_2-)_2-C-[CH_2-O-(C_2H_4O)_2-H]_2$ $(CH_2=CH-CH_2-O-CH_2-)_2-C-[CH_2-O-(C_3H_6O)_8-H]_2$ $(CH_2=CH-CH_2-O-CH_2-)_2-C-[CH_2-O-(C_2H_4O)_8-CH_3]_2$ $(CH_2=CH-CH_2-O-CH_2-)_2-C-[CH_2-O-(C_2H_4O)_{16}-CH_3]_2$ $(CH_2=CH-CH_2-O-)_2-C_6H_2-[O-(C_2H_4O)_6-(C_3H_6O)_1-H]_2$ $CH_2=CH-CH_2-(OC_2H_4)_6-O-CH_2-CH_2-CH_2-O-(C_2H_4O)_5-CH_2-CH=CH_2$

An amount of component. (B1) in the silicone adhesive composition according to the first embodiment is preferably 0.27 to 3.3 parts by mass, more preferably 0.3 to 3 parts by mass, most preferably 0.6 to 1.8 parts by mass, relative to 100 parts by mass of the addition reaction-curable silicone contained in the silicone adhesive composition. If the amount is less than the lower limit, the effect of providing an antistatic property is not sufficiently attained. If the amount is larger than the upper limit, an adhesion strength and curability of the silicone adhesive composition may be lower and a strength of bond to a sheet substrate may be lower. The addition reaction-curable silicone is a siloxane contained in any conventional silicone adhesive composition, such as an organopolysiloxane having an alkenyl group, an organohydrogenpolysiloxane and a silicone resin. The amount of component (B1) is preferably such that a ratio of the total number of the SiH groups in the silicone adhesive composition to the total number of the unsaturated hydrocarbon groups in component (B1) and the silicone adhesive composition is 1 to 20, more preferably 1 to 15. As a result, component (B1) is bonded strongly in the adhesive layer and, therefore, the aforesaid residual adhesive is avoided.

(C) Ionic Liquid

The ionic liquid is a salt composed of an anion and a cation, and represented by $Z^+Y^-$ wherein Z is a cation and Y is an anion. As component (C) In the present invention, any conventional ionic liquid may be used. The ionic liquid is generally a molten salt at room temperature. However, any conventional ionic liquid which is a solid salt at room temperature may also be used. The ionic liquid functions as an antistatic agent. Thus, ions of the ionic liquid move in a cured product obtained by curing the present silicone composition, i.e., adhesive layer, to decrease a surface resistivity of the product. Patent Literature 10 describes a lithium salt as an antistatic agent. However, when lithium is contained in a silicone adhesive composition, corrosion of a tape-stuck body to which an adhesive layer obtained from the composition is adhered increases; a strength of bond to a sheet substrate is insufficient, even if a primer is used; and an adhesive material remains on the tape-stuck body when an adhesive tape obtained with the adhesive composition is peeled from the tape-stuck body, that is, a residual adhesive occurs. Therefore, the lithium salt is not suitable. Examples of the lithium salt include $LiBF_4$, $LiClO_4$, $LiPF_6$, $LiAsF_6$, $LiSbF_6$, $LiSO_3CF_3$, $LiN(SO_2CF_3)_2$, $LiSO_3C_4F_9$, $LiC(SO_2CF_3)_3$ and $LiB(C_6H_5)_4$. Some of them are known as ionic liquids. However, component (C) in the present invention is an ionic liquid containing no lithium.

The ionic liquid in the present invention is preferably at least one selected from the group consisting of quaternary ammonium salts, quaternary phosphonium salts, imidazolium salts, pyridinium salts and pyrrolidinium salts. Thus, the cation ($Z^+$) is selected from the group consisting of quaternary ammonium cations, quaternary phosphonium cations, imidazolium cations, pyridinium cations and pyrrolidinium cations. In particular, quaternary ammonium salts are preferred. The anion ($Y^-$) of the ionic liquid is not limited to any particular one, and may be any anions of conventional ionic liquids.

Examples of the anion ($Y^-$) include halide ions, a cyanide ion, a dicyanoamine anion, a trifluoromethanesulphonate ion, a nonafluorobutansulphonate ion, a tetrafluoroethanesulphonate ion, a lactate ion, a salicylate ion, a thiosalicylate ion, a dibutylphosphate ion, an acetate ion, a hexafluoroantimonate ion, a hydrogensulfate ion, a sulfate ion, an octylsulphonate ion, a tetrachloroaluminate ion, a thiocyanate ion, a tris(trifuluoromethylsulphonyl)methide ion, an aminoacetate ion, an aminopropiante ion, a diethylphosphate ion, a dimethylphophate ion, an ethylsulfate ion, a methylsulfate ion, a hydroxide ion, a bis(trimethylpentyl)phosphinate ion, a decanoate ion, a trifluoroacetate ion, a ferrate ion, a tetrafluoroborate ion, a hexafluorophosphate ion, a sulfonylamide ion, a butansulphonate ion, a methylsulphonate ion, an ethylsulphonate ion, a bis(trifluoromethylsulfonyl)imide anion, a bis(trifluoroethylsulfonyl)imide anion and a bis(pentafluoroethylsulfonyl)imide anion. Among these, a bis(trifluoromethylsulfonyl)imide anion is preferred.

Examples of the ionic liquid include the following salts:
butyltrimethylammonium bis(trifluoromethanesulfonyl)imide,
ethyldimethylpropylammonium bis(trifluoromethane sulfonyl)imide,
2-hydroxymethyl-trimethylammonium L-(+)-lactate,
methyltrioctylammonium bis(trifluoromethanesulfonyl)imide,
methyltrioctylammonium thiosalicylate,
tetrabutylammonium nonafluorobutanesulfonate,
tetramethylammonium trifluoromethanesulfonate,
tetraheptylammonium chloride,
tributylmethylammonium dibutylphosphate,
tributylmethylammonium methylsulfate,
triethylmethylammonium dibutylphosphate,
tris(2-hydroxyethyl)methylammonium methylsulfate,
1-allyl-3-methylimidazolium bis(trifluoromethanesulfonyl)imide,
1-allyl-3-methylimidazolium bromide,
1-allyl-3-methylimidazolium chloride,
1-allyl-3-methylimidazolium dicyanamide,
1-allyl-3-methylimidazolium iodide,
1-benzyl-3-methylimidazolium chloride,
1-benzyl-3-methylimidazolium hexafluorophosphate,
1-benzyl-3-methylimidazolium tetrafluoroborate,
1,3-bis(cyanomethyl)imidazolium bis(trifluoromethanesulfonyl)imide,
1,3-bis(cyanomethyl)imidazolium chloride,
1,3-bis(cyanomethyl)imidazolium bis(trifluoromethanesulfonyl)imide,
1,3-bis(cyanopropyl)imidazolium chloride,
1-butyl-2,3-dimethylimidazolium chloride,
1-butyl-2,3-dimethylimidazolium hexafluorophosphate,
1-butyl-2,3-dimethylimidazolium tetrafluoroborate,
4-(3-butyl-1-imidazoilio)-1-butanesulfonate,
1-butyl-3-methylimidazolium acetate,
1-butyl-3-methylimidazolium bis(trifluoromethanesulfonyl)imide,
1-butyl-3-methylimidazolium bromide,
1-butyl-3-methylimidazolium chloride,
1-butyl-3-methylimidazolium dibutylphosphate,
1-butyl-3-methylimidazolium dicyanamide,
1-butyl-3-methylimidazolium hexafluoroantimonate,
1-butyl-3-methylimidazolium hexafluorophosphate,
1-butyl-3-methylimidazolium hydrogen sulfate,
1-butyl-3-methylimidazolium iodide,
1-butyl-3-methylimidazolium methanesulfonate,
1-butyl-3-methylimidazolium nitrate,
1-butyl-3-methylimidazolium octyl sulfate,
1-butyl-3-methylimidazolium tetrachloroaluminum,
1-butyl-3-methylimidazoliuim tetrafluoroborate,
1-butyl-3-methylimidazolium thiocyanate,
1-butyl-3-methylimidazolium trifluoroacetate,
1-butyl-3-methylimidazolium trifluoromethanesulfonate,
1-(3-cyanopropyl)-3-methylimidazolium bis(trifluoromethane sulfonyl)amide,
1-(3-cyanopropyl)-3-methylimidazolium dicyanamide,
1-decyl-3-methylimidazolium chloride,
1-decyl-3-methylimidazolium tetrafluoroborate,
1,3-diethoxyimidazolium bis(trifluoromethanesulfonyl)imide,
1,3-diethoxyimidazolium hexafluorophosphate,
1,3-dihydroxyimidazolium bis(trifluoromethanesulfonyl)imide,
1,3-dihydroxy-2-methylimidazolium bis(trifluoromethanesulfonyl)imide,
1,3-dimethoxyimidazolium bis(trifluoromethanesulfonyl)imide, 1,3-dimethoxyimidazolium hexafluorophosphate,
1,3-dimethoxy-2-methylimidazolium bis(trifluoromethyl-sulfonyl)imide,
1,3-dimethoxy-2-methylimidazolium hexafluorophosphate,
1,3-dimethylimidazolium dimethyl phosphate,
1,3-dimethylimidazolium methanesulfonate,
1,3-dimethylimidazolium methyl sulfate,
1,2-dimethyl-3-propylimidazolium bis(trifluoromethanesulfonyl)imide,
1,2-dimethyl-3-propylimidazolium tris(trifluoromethylsulfonyl)methide,
1-dodecyl-3-methylimidazolium iodide,
1-ethyl-2,3-dimethylimidazolium chloride,
1-ethyl-2,3-dimethylimidazolium hexafluorophosphate,
1-ethyl-2,3-dimethylimidazolium tetrafluoroborate,
1-ethyl-2,3-dimethylimidazolium trifluoromethanesulfonate,
1-ethyl-3-methylimidazolium acetate,
1-ethyl-3-methyldimidazolium aminoacetate,
1-ethyl-3-methylimidazolium (S)-2-aminopropionate,
1-ethyl-3-methylimidazolium bis(pentafluoroethylsulfonyl)imide,
1-thyl-3-methylimidazolium bis(trifluoromethanesulfonyl)imide,
1-ethyl-3-methylimidazolium bromide,
1-ethyl-3-methylimidazolium chloride,
1-ethyl-3-methylimidazolium dibutyl phosphate,
1-ethyl-3-methylimidazolium dicyanamide,
1-ethyl-3-methylimidazolium diethyl phosphate,
1-ethyl-3-methylimidazolium dimethyl phosphate,
1-ethyl-3-methylimidazolium ethyl sulfate,
1-ethyl-3-methylimidazolium hexafluorophosphate,
1-ethyl-3-methylimidazolium hydrogen sulfate,
1-ethyl-3-methylimidazolium hydroxide solution,
1-ethyl-3-methylimidazolium iodide,
1-ethyl-3-methylimidazolium L-(+)-lactate,
1-ethyl-3-methylimidazolium methyl sulfate,
1-ethyl-3-methylimidazolium nitrate,
1-ethyl-3-methylimidazolium tetrachloroaluminum,
1-ethyl-3-methylimidazolium tetrafluoroborate,
1-ethyl-3-methylimidazolium 1,1,2,2-tetrafluoroethanesulfonate,
1-ethyl-3-methylimidazolium thiocyanate,
1-ethyl-3-methylidazolium trifluoromethanesulfonate,
1-hexyl-3-methylimidazolium chloride,
1-hexyl-3-methylimidazolium hexafluorophosphate,
1-hexyl-3-methylimidazolium iodide,
1-hexyl-3-methylimidazolium tetrafluoroborate,
1-hexyl-3-methylimidazolium trifluoromethansulfonate,
1-(2-hydroxyethyl)-3-methylimidazolium dicyanamide,
1-methylimidazolium chloride,
1-methylimidazolium hydrogen sulfate,
1-methyl-3-octylimidazolium chloride,
1-methyl-3-octylimidazolium hexafluorophosphate,
1-methyl-3-octylimidazolium tetrafluoroborate,
1-methyl-3-octylimidazolium trifluoromethanesulfonate,
1-methyl-3-propylimidazolium iodide,
1-propyl-3-methylimidazolium bis(trifluoromethanesulfonyl)imide,
1,2,3-trimethylimidazolium methylsulfate,
1,2,3-trimethylimidazolium trifluoromethanesulfonate,
tetrabutylphosphonium methanesulfonate,
tributylmethylphosphonium dibutyl phosphate,
tributylmethylphosphonium methyl sulfate,
triethylmethylphosphonium dibutyl phosphate,
trihexyltetradecylphosphonium bis(trifluoromethylsulfonyl)amid,
trihexyltetradecylphosphonium bis(2,4,4-trimethylpentyl)phosphinate,
trihexyltetradecylphosphonium bromide,
trihexyltetradecylphosphonium chloride,
trihexyltetradecylphosphonium decanoate,
trihexyltetradecylphosphonium dicyanamide,
3-(triphenylphosphinate)propane-1-sulfonate,
1-butyl-4-methylpyridinium bromide,
1-butyl-4-methylpyridinium chloride,
1-butyl-4-methylpyridinium hexafluorophosphate,
1-butyl-4-methylpyridinium iodide,
1-butyl-4-methylpyridinium tetrafluoroborate,
1-butylpyridinium bromide,
1-(3-cyanopropyl)pyridinium chloride,
1-ethylpyridinium tetrafluoroborate,
3-methyl-1-propylpyridinium bis(trifluormethylsulfonyl)imide,
1-butyl-1-methylpyrrolidinium bis(trifluoromethanesulfonyl)imide,
1-butyl-1-methylpyrrolidinium bromide,
1-butyl-1-methylpyrrolidinium dicyanamide,
1-butyl-1-methylpyrrolidinium hexafluorophosphate,
1-butyl-1-methylpyrrolidinium iodide,
1-butyl-1-methylpyrrolidinium tetrafluoroborate,
1-butyl-1-methylpyrrolidinium trifluoromethanesulfonate,
1-ethyl-1-methylpyrrolidinium bis(trifluoromethanesulfonyl)imide,
1-ethyl-1-methylpyrrolidinium bromide,
1-ethyl-1-methylpyrrolidinium hexafluorophosphate,
1-ethyl-1-methylpyrrolidinium tetrafluoroborate,
1-butyl-1-methylpiperidinium bis(trifluoromethanesulfonyl)imide,
1-butyl-1-methylpiperidinium hexafluorophosphate,
1-butyl-1-methylpiperidinium tetrafluoroborate,
triethylsulfonium bis(trifluoromethanesulfonyl)imide,
1-ethyl-3-methylimidazolium methanesulfonate,
methyl-tri-n-butylammonium methylsulfate,
1,2,4-trimethylpyrazolium methylsulfate,
1-ethyl-2,3-di-methylimidazolium ethylsulfate,
methylimidazolium chloride,
methylimidazolium hydrogensulfate,
1-ethyl-3-methylimidazolium tetrachloroaluminum,
1-ethyl-3-methylimidazolium ethylsulfate,
1-butyl-3-methylimidazolium methylsulfate,
choline acetate,
choline salicylate,
methyltrioctylammonium hexafluorophosphate,
tetrabutylphosphonium bis(trifluoromethanesulfonyl)imide,
tributyldodecylphosphonium bis(trifluoromethanesulfonyl)imide,
trimethylhexylammonium bis(trifluoromethanesulfonyl)imide,
trimethylpropylammonium bis(trifluoromethanesulfonyl)imide,
1-octyl-4-methylpyridinium bis(trifluoromethanesulfonyl)imide,
1-hexyl-4-methylpyridinium hexafluorophosphate,
1-hexyl-4-methylpyridinium bis(trifluoromethanesulfonyl)imide,
1,2-dimethyl-3-propylimidazolium iodide,
1-ethyl-3-methylimidazolium trifluoroacetate,
1-butyl-3-methylimidazolium tetrachloroferrate(III),
1-methyl-1-propylpiperidinium bis(trifluoromethanesulfonyl) imide,
1-butylimidazolium bis(trifluoromethanesulfonyl)imide,
1-butyl-3-methylpyridinium bis(trifluoromethanesulfonyl)imide, 1-butyl-4-methylpyridinium bis(trifluoromethanesulfonyl) imide,
1-methyl-1-pyrrolidinium bis(trifluoromethanesulfonyl) imide,
1-butyl-1-methylpyrrolidinium bis(trifluoromethanesulfonyl) imide,
1-butyl-1-methylpyrrolidinium chloride,
1-methyl-3-propylimidazolium bis(trifluoromethanesulfonyl)imide,
1-hexyl-3-methylimidazolium bis(trifluoromethanesulfonyl)imide,
1-butyl-2,3-dimethylimidazolium bis(trifluoromethanesulfonyl)imide,
1,2-dimethyl-3-propylimidazolium bis(trifluoromethanesulfonyl)imide,
1-methyl-3-octylimidazolium tetrafluoroborate,
1-(3-hydroxypropyl)-3-methylimidazolium tetrafluoroborate,
1-butylpyridinium hexafluorophosphate,
1-butyl-3-methylpyridinium hexafluorophosphate,
1-butylpyridinium tetrafluoroborate,
1-butyl-3-methylpyridinium tetrafluoroborate,
1-butylpyridinium chloride,
tributylmethylammonium bis(trifluoromethanesulfonyl)imide,
tetrabutylammonium hexafluorophosphate,
tetrabutylammonium bromide,
tetrapentylammonium bromide,
tetrabutylphosphonium hexafluorophosphate, and
tributylmethylphosphonium iodide.

Among these, ionic liquids whose anions are a bis(trifluoromethylsulfonyl)imide anion are particularly preferred, because curing of the silicone adhesive composition is less hindered.

In particular, salts composed of a quaternary ammonium cation and a bis(trifluoromethylsulfonyl)imide anion are preferred, because curing of the silicone adhesive composition is least hindered. Examples of such ionic liquids include the following salts:
butyltrimethylammonium bis(trifluoromethanesulfonyl)imide,
ethyldimethylpropylammonium bis(trifluoromethanesulfonyl)imide,
methyltrioctylammonium bis(trifluoromethanesulfonyl)imide,
trimethylhexylammonium bis(trifluoromethanesulfonyl)imide,
trimethylpropylammonium bis(trifluoromethanesulfonyl) imide, and
tributylmethylammonium bis(trifluoromethanesulfonyl)imide.

The ionic liquid may be used as such in the silicone adhesive composition, or in such a manner that the ionic liquid is diluted with an organic solvent or that the ioninc liquid is dispersed in a silicone oil to be pasty. However, the ionic liquid may be used in any other manner.

An amount of component (C) is preferably 0.003 to 1.5 parts by mass, more preferably 0.006 to 1.2 parts by mass, still more preferably 0.06 to 1.2 parts by mass, particularly 0.06 to 0.6 part by mass, relative to 100 parts by mass of the addition reaction-curable silicone contained in the silicone adhesive composition. If the amount is less than the lower limit, the effect of providing an antistatic property is not sufficiently attained. If the amount is larger than the upper limit, an adhesion strength and curability of the silicone adhesive composition may be lower and a strength of bond to a sheet substrate may be lower.

First Silicone Adhesive Composition which is Addition Reaction-Curable

Components other than components (B1) and (C) contained in the first silicone adhesive composition which is addition reaction-curable may be components contained in conventional silicone adhesive compositions which are addition reaction-curable, as mentioned above. For example, the addition reaction-curable silicone (A) may be the following (a) to (c), and further the following components (d) and (e) may be incorporated:

(a) a linear diorganopolysiloxane having two or more alkenyl groups in one molecule, (b) an organopolysiloxane having $R^4_3SiO_{0.5}$ units and $SiO_2$ units in a mole ratio of the $R^4_3SiO_{0.5}$ units to the $SiO_2$ units of 0.6 to 1.7, wherein $R^4$ is a monovalent hydrocarbon group having 1 to 10 carbon atoms, (c) an organopolyslloxane having two or more SiH groups in one molecule, (d) optionally a reaction inhibitor, and (e') a catalyst for an addition reaction.

Components (a) to (d) and (e') will be described below in more detail.

(a) Linear Diorganopolysiloxane Having Alkenyl Groups

Any linear diorganopolysiloxane may be used as long as it has two or more alkenyl groups in one molecule.

The diorganopolysiloxane may be oily or raw rubber-like. The oily diorganopolysiloxane preferably has a viscosity of 1000 mPa·s or more, in particular 10,000 mPa·s or more, at 25 degrees C. If the viscosity is less than the lower limit, curability of the adhesive composition is lower, and cohesion, i.e., a strength of bond to a sheet substrate, is lower. In a case of the raw rubber-like diorganopolysiloxane, a viscosity of a 30% solution of it in toluene is preferably 100,000 mPa·s or less at 25 degrees C. If the viscosity is larger than 100,000 mPa·s, a viscosity of the composition is too high, so that it is difficult to stir the composition in its preparation. The viscosity is determined with a BM type rotary viscometer. Two or more of the diorganopolysiloxane may be used in combination.

The linear diorganopolysiloxane having alkenyl groups is represented, for example, by the following formula (8) or (9).

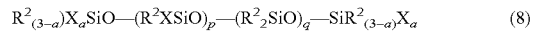

$$R^2_{(3-a)}X_aSiO\text{---}(R^2XSiO)_p\text{---}(R^2_2SiO)_q\text{---}SiR^2_{(3-a)}X_a \quad (8)$$

$$R^2_2(OH)SiO\text{---}(R^2XSiO)_{p+2}\text{---}(R^2_2SiO)_q\text{---}SiR^2_2(OH) \quad (9)$$

In the formulas, $R^2$ is, independently of each other, a monovalent hydrocarbon group having no aliphatic unsaturated bond, X is an organic group having an alkenyl group, a is an integer of 0 to 3, preferably 1, p is an integer of zero or larger, and q is an integer of 100 or larger, provided that at least one of a and p is not zero. p+q is such that a viscosity of the diorganopolysiloxane is 1,000 mPa·s or more at 25 degrees C.

$R^2$ is preferably a monovalent hydrocarbon group which has 1 to 10 carbon atoms, preferably 1 to 7 carbon atoms, and has no aliphatic unsaturated bond. Examples of the monovalent hydrocarbon group include alkyl groups such as a methyl group, an ethyl group, a propyl group and a butyl group; cycloalkyl groups such as a cyclohexyl group; and aryl groups such as a phenyl group and a tolyl group. In particular, a methyl group and a phenyl group are preferred.

X is preferably an organic group which has 2 to 10 carbon atoms and an alkenyl group, and includes a vinyl group, an allyl group, a hexenyl group, an octenyl group, an acryloylpropyl group, an acryloylmethyl group, a methacryloylpropyl group, an acryloxypropyl group, an acryloxymethyl group, a methacryloxypropyl group, a methacryloxymethyl group, a cyclohexenylethyl group and a vinyloxypropyl group. Among these, a vinyl group is preferred from the industrial viewpoint.

(b) Organopolysiloxane Having M Units and Q Units

The organopolysiloxane has $R^4_3SiO_{0.5}$ units and $SiO_2$ units and may be any conventional one. The organopolysiloxane preferably has $R^4_3SiO_{0.5}$ units and $SiO_2$ units in a mole ratio of the $R^4_3SiO_{0.5}$ units to the $SiO_2$ units of 0.6 to 1.7, more preferably 0.7 to 1.3. $R^4$ is a monovalent hydrocarbon group having 1 to 10 carbon atoms, and may be those mentioned above for $R^2$. If the mole ratio of $R^4_3SiO_{0.5}$ units to the $SiO_2$ units is less than the lower limit, an adhesion strength and a tackiness of the adhesive layer may be too low. If the ratio is larger than the upper limit, an adhesion strength of the adhesive layer and a strength of bond to a sheet substrate may be lower. The organopolysiloxane may have an OH group. A content of the OH group is preferably 4.0% by mass or less, relative to a mass of the organopolysiloxane. If the content is larger than the upper limit, curability of the adhesive layer may be lower.

Two or more of the organopolysiloxane may be used in combination. Further, the organopolysiloxane may have $R^4SiO_{1.5}$ units and/or $R^4_2SiO$ units as long as the effects of the present invention are not obstructed.

Components (a) and (b) may be simply mixed with each other and used. In a case where an organopolysiloxane represented by the formula (9) is used as component (a), components (a) and (b) may be reacted with each other to obtain a condensation reaction product and used. The condensation reaction may be carried out by dissolving a mixture of components (a) and (b) in a solvent such as toluene and reacting the components with each other in the presence of an alkaline catalyst in a range from room temperature to a reflux temperature.

A mass ratio of component, (a) to component (b) may be 20/80 to 100/0, preferably 30/70 to 95/5. If the amount of component (a) is less than the lower limit, an adhesion strength of the adhesive layer and a strength of bond to a sheet substrate are lower.

(c) Organohydrogenpolysioxane

The organohydrogenpolysiloxane is a crosslinking agent and has at least two, preferably three or more, SiH groups. The organohydrogenpolysiloxane may be linear, branched or cyclic. The organohydrogenpolysiloxane preferably has a viscosity at 25 degrees C. of 1 to 5,000 mPa·s, more preferably 5 to 500 mPa·s. The viscosity is determined with a BM type rotary viscometer. The organohydrogenpolysiloxane may be any conventional one.

The organohydrogenpolysiloxane includes, for example, linear siloxanes represented by the following formula (6) and cyclic siloxanes represented by the following formula (7).

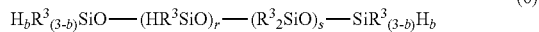

In the formulas, $R^3$ is a monovalent hydrocarbon group having 1 to 10 carbon atoms, b is 0 or 1, r and s are each such an integer that the viscosity of the organohydrogenpolysiloxane at 25 degrees C. is 1 to 5,000 mPa·s, more preferably 5 to 500 mPa·s, t is an integer of 2 or larger, v is an integer of 0 or larger, provided that t+v □ 3, preferably 8 □ t+v □ 3. Two or more of the organohydrogenpolysiloxane may be used in combination.

$R^3$ is a monovalent hydrocarbon group having 1 to 10 carbon atoms, preferably 1 to 7 carbon atoms, and includes alkyl groups such as a methyl group, an ethyl group, a propyl group and a butyl group; cycloalkyls such as a cyclohexyl group; aryl groups such as a phenyl group and a tolyl group; and alkenyl groups such as a vinyl group and an allyl group. In particular, a methyl group and a phenyl group are preferred.

An amount of the organohydrogenpolysiloxane is preferably such that a ratio of the number of SiH groups in component (c) to the number of alkenyl groups in component (a) is 1 to 20, in particular, 1 to 15. If the amount is less than the lower limit, a degree of cross linking in a cured product of the adhesive composition is lower and, therefore, a strength of bond to a sheet substrate may be lower. If the amount is larger than the upper limit, a degree of crosslinking of the cured product is too high and, therefore, the adhesive layer may not have a sufficient adhesion strength nor a sufficient tackiness. Further, a time period for the adhesive composition (composition bath) to be usable may be shorter. As mentioned above, the present silicone adhesive composition comprises (poly)oxyalkylene compound (B1) which has unsaturated hydrocarbon groups. A ratio of the number of SiH groups in component (c) to the number of unsaturated hydrocarbon groups in components (B1) and (a) is preferably 1 to 20, more preferably 1 to 15. As a result, component (B1) is bonded strongly in the adhesive layer and, therefore, a residual adhesive is avoided as mentioned above.

(d) Reaction Inhibitor

The silicone adhesive composition may comprise a reaction inhibitor as an optional component. When the silicone adhesive composition is prepared, applied on a sheet substrate and, then, heated to be cured, the reaction inhibitor works to prevent increase of a viscosity and gelation of the composition before heat curing. The reaction inhibitor may be any conventional one. Examples of the reaction inhibitor include 3-methyl-1-butyn-3-ol, 3-methyl-1-penthyn-3-ol, 3,5-dimethyl-1-hexyn-3-ol, 1-ethynylcyclohexanol, 3-methyl-3-trimethylsiloxy-1-butyne, 3-methyl-3-trimethylsiloxy-1-penthyne, 3,5-dimethyl-3-trimethylsiloxy-1-hexyne, 1-ethynyl-1-trimethylsiloxycyclohexane, bis(2,2-dimethyl-3-butynoxy)dimethylsilane, 1,3,5,7-tetramethyl-1,3,5,7-tetravinylcyclotetrasiloxane and 1,1,3,3-tetramethyl-1,3-divinyldisiloxane.

An amount of the reaction inhibitor is 0 to 8 parts by mass, preferably 0.01 to 8 parts by mass, in particular, 0.05 to 2 parts by mass, relative to total 100 parts by mass of components (a) and (b). If the amount is larger than the upper limit, curability of the composition may be lower.

(e') Addition Reaction Catalyst

The addition reaction catalyst according to the first embodiment is to accelerate an addition reaction of components (a) and (B1) with component (c), and may be any conventional one. A platinum group metal catalyst is preferred. Examples of the platinum group metal catalyst include platinum catalysts, palladium catalysts, rhodium catalysts and ruthenium catalysts. Among these platinum catalysts are preferred. Examples of the platinum catalysts include chloroplatinic acid, a solution of chloroplatinic acid in an alcohol, a reaction product of chloroplatinic acid with an alcohol, a reaction product of chloroplatinic acid with an olefinic compound, and a reaction product of chloroplatinic acid with a vinyl group-containing siloxane. A reaction product of chloroplatinic acid with an olefinic compound and a reaction product of chloroplatinic acid with a vinyl group-containing siloxane are preferred in view of stability in storage.

An amount of the catalyst may be a catalytic amount, i.e., an amount effective in accelerating the addition reaction of components (a) and (B1) with component (c). In particular, the amount is preferably such that an amount of a platinum group metal is 1 to 5,000 ppm, particularly 5 to 1,000 ppm, relative to a total amount by mass of components (a), (B1) and (b). If the amount is less than the lower limit, curability of the silicone adhesive composition is lower and a degree of crosslinking of a cured product of the composition is lower, so that a strength of bond to a sheet substrate may be lower. If the amount is larger than the upper limit, the composition in a bath is usable only for a shorter period of time.

The present silicone adhesive composition may be prepared by adding components (B1) and (C) to a commercially available silicone adhesive component which is addition reaction-curable. Examples of the commercially available silicone adhesive component include KR-3700, KR-3701, KR-3704, X-40-3237 and KR-3706, ex Shin-Etsu Chemical Co. Ltd. When components (B1) and (C) are added to a commercially available silicone adhesive component, it may happen that the ratio of the total number of SiH groups to the total number of unsaturated hydrocarbon groups in the composition be outside the afore-mentioned range. In that case, the organohydrogenpolysiloxane (c) may be added to adjust the ratio.

Second Embodiment

The present silicone adhesive composition according to the second embodiment is addition reaction-curable, and characterized first by comprising (B) a (poly)oxyalkylene compound having a specific structure and (C) a specific ionic liquid, and second by comprising, as an addition reaction catalyst, (e) a platinum group metal catalyst which is not a complex with a compound having an unsaturated hydrocarbon bond. Any other components than components (B), (C) and (e) may be incorporated in the silicone adhesive composition. Component (A), addition reaction-curable silicone, may be any conventional organopolysiloxane, such as an organopolysiloxane having an alkenyl group, a silicone resin and an organohydogenpolysiloxane. The characteristic components (B), (C) and (e) will be explained first below.
(B) (Poly)oxyalkylene Compound In the second embodiment according to the present invention, component (B) is a compound having at least one unsaturated hydrocarbon group and at least one (poly) oxyalkylene residue in one molecule. One of the characteristics of component (B) in the second embodiment is that the compound has at least one unsaturated hydrocarbon group in one molecule. Accordingly, the compound is compatible in the silicone adhesive composition which is addition reaction-curable, and may react with the organohydrogenpolysiloxane contained in the composition to be bonded in a cured product of the composition. Therefore, the (poly) oxyalkylene compound does not leave from the adhesive layer with time, and a tape-stuck body is less contaminated.

Another characteristic of component (B) is in that component (B) has at least one (poly)oxyalkylene residue in one molecule. The (poly)oxyalkylene residue is preferably one represented by —$(C_2H_4O)_m$—$(C_3H_6O)_n$—, wherein m is a real number of 0 to 20, n is a real number of 0 to 10, m+n is 1 to 30, and ($C_2H_4O$) and ($C_3H_6O$) may be bonded in random order. The oxyalkylene compound having such a structure is incorporated in the silicone adhesive composition together with the ionic liquid (C) described hereinafter, so that a surface resistivity of the silicone adhesive layer is lowered. It is considered that this is because the oxyalkylene residues capture ions of the ionic liquid and efficiently cause the ions to move in the cured product, adhesive layer. To explain the decrease of the surface resistivity in more detail, a cured product of a silicone adhesive composition comprising no ionic liquid nor (poly)oxyalkylene compound has a surface resistivity larger than 1E+15 Ω/sq., i.e., $1\times10^{15}$ Ω/sq., and a cured product of a silicone adhesive composition comprising only the ionic liquid has a surface resistivity of 1e+13 to 1E+14 Ω/sq., i.e., $1\times10^{13}$ to $1\times10^{14}$ Ω/sq. Meanwhile, the cured product of the silicone adhesive composition comprising the ionic liquid and the (poly) oxyalkylene compound has a surface resistivity of 1E+9 to less than 1E+13 Ω/sq., i.e., $1\times10^{9}$ to less than $1\times10^{13}$ Ω/sq. The surface resistivity in the present invention is determined according to Japanese Industrial Standards (JIS) K6911. Preferably, component (B) in the second embodiment of the present invention has one or two (poly)oxyalkylene residues in one molecule.

The unsaturated hydrocarbon group is preferably an alkenyl group having 2 to 12 carbon atoms, more preferably 2 to 10 carbon atoms. A vinyl group and an allyl group are preferred. The (poly)oxyalkylene compound has at least one organic group having the unsaturated hydrocarbon group in one molecule. Examples of the unsaturated hydrocarbon group may be those mentioned above for component (B1).

It is preferred that the (poly)oxyalkylene compound volatilizes hardly at 130 degrees C. or lower and normal pressure. A (poly)oxyalkylene compound which volatilizes at 130 degrees C. or lower voltilize in a process of curing an adhesive composition and, therefore, does not remain in a cured product of the adhesive composition. As a result, the cured product may not have a good antistatic effect.

Component (B) is preferably a compound having at least two unsaturated hydrocarbon groups and two (poly)oxyalkylene residues in one molecule (hereinafter referred to as compound (B1)), which is the same as compound (B1) in the first embodiment. The number of the unsaturated hydrocarbon groups is preferably 2 to 4, in particular, 2. The compound (B1) is represented by the following formula (1). In the formula (1), ($C_2H_4O$) and ($C_3H_6O$) may be bonded in random order. The formula (1) may be an average compositional formula.

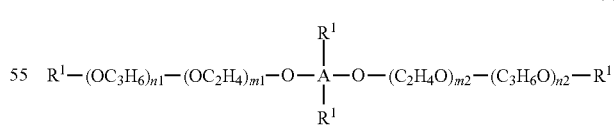

(1)

The compound represented by the formula (1) is as explained in the aforesaid first embodiment. A, $R^1$, $m^1$, $m^2$, $n^1$ and $n^2$ are as defined above.

The ions move easier when oxygen atoms are closer to each other. Therefore, it is particularly preferred that both of $n^1$ and $n^2$ in the formula (1) are zero, that is, the (poly) oxyalkylene compound (B1) does not comprise an oxypropylene group. Such a (poly)oxyalkylene compound is represented by the formula (2):

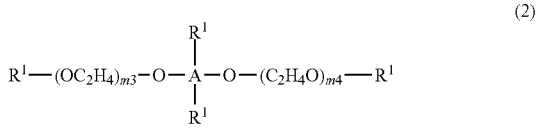

(2)

The compound represented by the formula (2) is as explained in the aforesaid first embodiment. A, $R^1$, $m^3$ and $m^4$ are as defined above.

Examples of the (poly)oxyalkylene compound (B1) include the following:

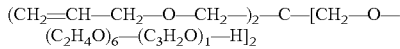

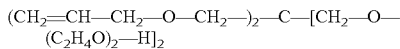

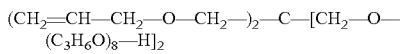

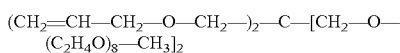

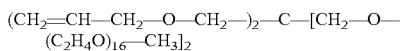

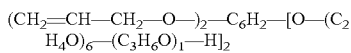

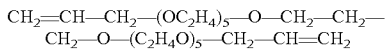

It is also preferred that component (B) in the second embodiment is a compound having at least one unsaturated hydrocarbon group and one (poly)oxyalkylene residue in one molecule (hereinafter referred to as compound (B2)). The compound (B2) is particularly one represented by the following formula (3), In the formula (3), $(C_2H_4O)$ and $(C_3H_6O)$ may be bonded in random order. The formula (3) may be an average compositional formula.

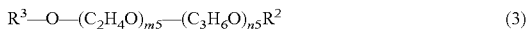

In the formula (3), $R^3$ is a monovalent apliphatic hydrocarbon group which has 2 to 12 carbon atoms and an unsaturated bond, $R^2$ is a hydrogen atom, a saturated monovalent hydrocarbon group having 1 to 8 carbon atoms, or a group as defined for $R^3$, $m^5$ is a real number of 0 to 20, and $n^5$ is a real number of 0 to 10, provided that $m^5+n^5$ is not zero.

In the formula (3), $m^5$ is a real number of 0 to 20, and $n^5$ is a real number of 0 to 10, provided that $m^5+n^5$ is not zero. Each of $m^5$ and $n^5$ may be an average value. Preferably, $m^5+n^5$ is 1 to 30, more preferably 4 to 20. If $m^5$ or $n^5$ is larger than the upper limit, the polyoxyalkylene compound may have a larger viscosity and, therefore, poor dispersibility, so that it may be difficult to uniformly disperse the compound in the silicone adhesive composition.

The ions move easier when oxygen atoms are closer to each other. Therefore, it is particularly preferred that $n^5$ in the formula (3) is zero, that is, the (poly)oxyalkylene compound (B2) does not comprise an oxypropylene group. Such a (poly)oxyalkylene compound is represented by the formula (4):

In the formula (4), $R^2$ and $R^3$ are as defined above, and $m^5$ is a real number of 1 to 20, preferably a real number of 1 to 10, more preferably a real number of 2 to 10. When $m^5$ is larger, compatibility of the (poly)oxyalkylene compound with a silicone adhesive is poorer, so that the adhesive composition may not sufficiently cure. Further, the (poly)oxyalkylene compound has a larger viscosity and, therefore, it may be difficult to uniformly disperse the compound in the silicone adhesive composition.

In the formulas (3) and (4), $R^3$ is a monovalent hydrocarbon group which has 1 to 12 carbon atoms and an unsaturated bond, $R^2$ is a hydrogen atom, a saturated monovalent hydrocarbon group having 1 to 8 carbon atoms, or a group as defined for $R^3$. Examples of the unsaturated hydrocarbon group may be those mentioned above. In particular, an allyl group and a vinyl group are preferred. The saturated monovalent hydrocarbon group having 1 to 8 carbon atoms is in particular an alkyl group, such as a methyl group, an ethyl group, a propyl group, an isopropyl group, a butyl group and an octyl group. Among these, a methyl group is preferred. $R^2$ is particularly a methyl group, a hydrogen atom or a group as defined, for $R^3$.

Examples of the (poly)oxyalkylene compound (B2) include the following:

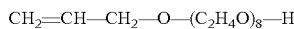

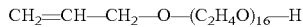

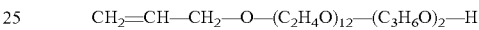

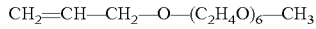

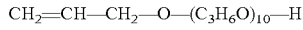

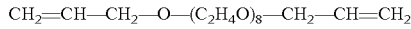

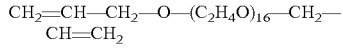

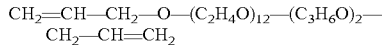

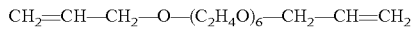

In particular, component (B) in the second embodiment is preferably the (poly)oxyalkylene compound (B1).

An amount of component (B) in the silicone adhesive composition according to the second embodiment is preferably 0.27 to 3.3 parts by mass, more preferably 0.3 to 3 parts by mass, most preferably 0.6 to 1.8 parts by mass, relative to 100 parts by mass of the addition reaction-curable silicone contained in the silicone adhesive composition. If the amount is less than the lower limit, the effect of providing an antistatic property is not sufficiently attained. If the amount is larger than the upper limit, an adhesion strength and curability of the silicone adhesive composition may be lower and a strength of bond to a sheet substrate may be lower. The addition reaction-curable silicone is a conventional siloxane which is contained in silicone adhesive compositions, such as an organopolysiloxane having an alkenyl group, an organohydrogenpolysiloxane and a silicone resin. The amount of component (B) is preferably such that a ratio of the total number of the SiH groups in the silicone adhesive composition to the total number of the unsaturated hydrocarbon groups in component (B) and the silicone adhesive composition is 1 to 20, more preferably 1 to 15, whereby component (B) is bonded strongly in the adhesive layer and, therefore, a residual adhesive is avoided as mentioned above.

(C) Ionic Liquid

The ioninc liquid is as described in the aforesaid first embodiment. In the second embodiment, an amount of component (C) is preferably 0.003 to 1.5 parts by mass, more preferably 0.006 to 1.2 parts by mass, still more preferably 0.06 to 1.2 parts by mass, particularly 0.06 to 0.6 part by mass, relative to 100 parts by mass of the addition reaction-curable silicone contained in the silicone adhesive composition. If the amount is less than the lower limit, the effect of providing an antistatic property is not sufficiently attained. If the amount is larger than the upper limit, an adhesion strength and curability of the silicone adhesive composition may be lower and a strength of bond to a sheet substrate may be lower.

(e) Platinum Group Metal Catalyst

The silicone adhesive composition according to the second embodiment is characterized by comprising, as an addition reaction catalyst, a platinum group metal catalyst which is not a complex with a compound having an unsaturated hydrocarbon bond. The compound having an unsaturated hydrocarbon bond is particularly an olefinic compound or a vinyl group-containing siloxane. The platinum group metal for forming the complex includes platinum, palladium, rhodium and ruthenium.

Examples of the complex of the platinum group metal with the compound having an unsaturated hydrocarbon bond include a reaction product of chloroplatinic acid with an olefinic compound, a reaction product of chloroplatinic acid with a vinyl group-containing siloxane, a complex of platinum with an olefinic compound, a complex of platinum with a vinyl group-containing siloxane, a complex of rhodium with an olefin and chlorotris(triphenylphosphine)rhodium (Wilkinson's catalyst). These have generally been used as an addition reaction catalyst. However, when these catalysts are used in a silicone adhesive composition comprising the polyoxyalkylene compound having an unsaturated group (B), curability of the composition is not enough to cure the composition in a short time. Therefore, the catalysts need to be added in larger amounts than usual. Further, a higher heating temperature and a longer heating time are necessary for curing. It is unknown what causes the insufficient curability. In the aforesaid complex, for example, a platinum atom coordinates with an olefin or a vinyl group so that the platinum atom is stably present in a solution. The formation of the complex causes no problem in usual silicone adhesive compositions which are addition reaction-curable. Meanwhile, when the aforesaid catalyst is used in the present silicone adhesive composition comprising the (poly)oxyalkylene compound having an unsaturated group, curability of the composition is lower. This is presumably because the olefin or the vinyl group-containing siloxane is removed by heating and then the platinum atom is coordinated with the unsaturated group of the (poly)oxyalkylene compound to inhibit early activation of the platinum atom.

Therefore, the silicone adhesive composition according to the second embodiment is characterized by comprising a platinum group metal catalyst which is not a complex with a compound having an unsaturated hydrocarbon bond. Accordingly, the silicone adhesive composition cures well by heating at a usual temperature for a short time, particularly for less than 5 minutes, more particularly for 30 seconds to 3 minutes. It is considered that this is because no platinum atom coordinates with an olefin or a vinyl group-containing siloxane in the platinum group metal catalyst which is not a complex with a compound having an unsaturated hydrocarbon bond, such as chloroplatinic acid, a solution of chloroplatinic acid in an alcohol and an reaction product of chloroplatinic acid with an alcohol and, therefore, even if the platinum atom is coordinated with the unsaturated group of the (poly)oxyalkylene compound upon the addition of the catalyst, the platinum atom activates at an early stage.

In the second embodiment, any platinum group metal catalyst may be used as long as it is not a complex with a compound having an unsaturated hydrocarbon bond. The catalyst may be selected from those conventionally used as an addition reaction catalyst, such as platinum group metals themselves such as platinum (including platinum black), rhodium and palladium; platinum chloride, chloroplatinic acid and chloroplatinic acid salts such as $H_2PtCl_4 \cdot kH_2O$, $H_2PtCl_6 \cdot kH_2O$, $NaHPtCl_6 \cdot kH_2O$, $KHPtCl_6 \cdot kH_2O$, $Na_2PtCl_6 \cdot kH_2O$, $K_2PtCl_4 \cdot kH_2O$, $PtCl_4 \cdot kH_2O$, $PtCl_2$, and $Na_2HPtCl_4 \cdot kH_2O$ wherein k is an integer of 0 to 6, preferably 0 or 6; an alcohol denuatured-chloroplatinic acid; and a platinum group metal such as platinum black and palladium supported on a carrier such as alumina, silica and carbon. Among these, platinum catalysts are preferred, and chloroplatinic acid, a solution of chloroplatinic acid in an alcohol and a reaction product of chloroplatinic acid with an alcohol are more preferred.

Particularly, a solution of chloroplatinic acid in an alcohol and a reaction product of chloroplatinic acid with an alcohol are preferred. These may be any conventional ones, such as one obtained by dissolving chloroplatinic acid in an alcohol and one obtained by dissolving chloroplatinic acid in an alcohol, followed by stirring at a temperature of room temperature to 80 degrees C.

Preferred examples of the alcohol to be used in the solution of chloroplatinic acid in an alcohol and in the reaction product of chloroplatinic acid with an alcohol include alcohols having 1 to 8 carbon atoms and boiling points of 200 degrees C. or lower. Alcohols having 3 to 7 carbon atoms are particularly preferred. If the boiling point is too low, a concentration of chloroplatinic acid may change during storage. If the boiling point is too high, the alcohol may remain in an adhesive after drying.

An amount of the catalyst may be a catalytic amount, i.e., an amount effective in acclerating the addition reaction of components (a) and (B) with component (c). In particular, the amount is preferably such that an amount of a platinum group metal is 1 to 5,000 ppm, particularly 5 to 1,000 ppm, relative to a total amount by mass of components (a), (B) and (b). If the amount is less than the lower limit, curability of the silicone adhesive composition is lower and a degree of crosslinking in a cured product of the composition is lower, so that a strength of bond to a sheet substrate may be lower. If the amount is larger than the upper limit, the composition in a bath is usable only for a shorter period of time.

Second Silicone Adhesive Composition Which is Addition Reaction-Curable

Components other than components (B), (C) and (e) contained in the second silicone adhesive composition which is addition reaction-curable may be components contained in any conventional silicone adhesive composition which are addition reaction-curable, as mentioned above. For example, the addition curable silicone (A) may be the following (a) to (c) and, further, the following component (d) may be incorporated:

(a) a linear diorganopolysiloxane having two or more alkenyl groups in one molecule, (b) an organopolysiloxane having $R^4_3SiO_{0.5}$ units and $SiO_2$ units in a mole ratio of the $R^4_3SiO_{0.5}$ units to the $SiO_2$ units of 0.6 to 1.7, wherein $R^4$ is a monovalent hydrocarbon group having 1 to 10 carbon atoms, (c) an organopolysiloxane having two or mere SiH groups in one molecule, and (d) optionally, a reaction inhibitor.

The details for the aforesaid components (a) to (d) are as explained in the aforesaid first embodiment.

The second silicone adhesive composition according to the present invention may be prepared by adding components (B2), (C) and (e) to a commercially available silicone adhesive component which is addition reaction-curable. Examples of the commercially available silicone adhesive component include KR-3700, KR-3701, KR-3704, X-40-3237 and KR-3706, ex Shin-Etsu Chemical Co. Ltd. When components (B2) and (C) are added to a commercially available silicone adhesive component, it may happen that the ratio of the total number of SiH groups and the total number of unsaturated hydrocarbon groups in the composition be outside the afore-mentioned range. In that case, the organohydrogenpolysiloxan (c) may be added to adjust the ratio.

The first and second silicone adhesive compositions according to the present invention may further comprise an organic solvent in order to decrease their viscosities in use in coating. The organic solvent is aromatic solvents such as toluene and sylene; aliphatic solvents such as hexane, octane and isoparaffins; ketone solvents such as methyl ethyl ketone and methyl isobutyl ketone; ester solvents such as ethyl acetate and isobutyl acetate; ether solvents such as diisopropyl ether and 1,4-dioxane; and a mixture thereof.

In the present invention, ionic conductive materials other than lithium salts, and other organopolymeric antistatic agents may further be added as long as the performances of the present silicone adhesive composition are not obstructed.

The first and second silicone adhesive compositions according to the present invention may comprise other optional components in addition to the aforesaid components. Examples of the optional component include unreactive organopolysioxanes such as polydimethylsiloxsane and polydimethyldiphenylsiloxane; antioxidants such as phenol, kinone, amine, phosphorus, phosphite, sulfur or thioether antioxidant; light stabilizers such as a triazole or benzophenone light stabilizer; flame retardants such as a phosphate ester, halogen, phosphorus or antimony flame retardant; and antistatic agents such as cationic activators, anionic activators and nonionic activators.

The first and second silicone adhesive compositions according to the present invention are prepared by mixing and dissolving the aforesaid components with each other in any conventional manners. The mixing may be carried out by mixing the components other than components (B) and (C) in advance and then adding components (B) and (C) to the mixture, or by mixing all of the components in one step. Particularly, the aforesaid components (a) to (d) are first mixed with each other, to which components (B) and (C) and optionally component (c) are then added and mixed to obtain a homogeneous mixture. Then, an addition reaction catalyst and optionally a solvent are added and mixed to obtain the present silicone adhesive composition.

The first or second silicone adhesive compositions may be applied on a subsrate in a sheet form and then cured in predetermined conditions to obtain an adhesive tape or film which has an adhesive layer. The sheet substrate to which the silicone adhesive composition is to be applied may be any conventional one. Examples of the substrate include plastic films such as polyesters, polytetrafluoroethylenes, polyimides, polyphenylene sulfides, polyamides, polyether ether ketones, polycarbonates, polystyrenes, polypropylenes, polyethylenes and polyvinyl chlorides; mtal foil such as aluminum foil and cupper foil; paper such as traditional Japanese paper, synthetic paper and polyethylene-laminated paper; cloths; glass fiber; and composite substrates obtained by laminating a plurality of the aforesaid substrates. The substrate may be subjected in advance, for example, to primer treatment, corona treatment, etching treatment, plasma treatment or plasma treatment, in order to improve a strength of bond by the silicone adhesive layer.

The adhesive layer, i.e., cured product, obtained from the first silicone adhesive composition has a low surface resistivity and an excellent antistatic property. The surface resistivity may be in any range as long as the adhesive layer is applicable to antistatic use. The first silicone adhesive composition provides an adhesive layer preferably having a surface resistivity of 1E+9 to less than 1E+13 $\Omega$/sq., i.e., $1\times10^9$ to less than $1\times10^{13}$ $\Omega$/sq., more preferably 1E+9 to 9.9E+12 $\Omega$/sq., i.e., $1\times10^9$ to $9.9\times10^{12}$ $\Omega$/sq., still more preferably 1E+9 to less than 1E+12 $\Omega$/sq., i.e., $1\times10^9$ to less than $1\times10^{12}$ $\Omega$/sq., particularly 1E+10 to 9.9E+11 $\Omega$/sq., i.e., $1\times10^{10}$ to $9.9\times10^{11}$ $\Omega$/sq. The surface resistivity in the present invention is determined according to JIS K6911.

The second silicone adhesive composition according to the present Invention is heated for a short time to provide an adhesive layer, i.e., cured product, having a good antistatic property. The surface resistivity of the adhesive layer may be in any range as long as the adhesive layer is applicable to antistatic use. The second silicone adhesive composition provides an adhesive layer preferably having a surface resistivity of 1E+9 to less than 1E+13 $\Omega$/sq., i.e., $1\times10^9$ to less than $1\times10^{13}$ $\Omega$/sq., more preferably 1E+9 to 9.9E+12 $\Omega$/sq., i.e., $1\times10^9$ to $9.9\times10^{12}$ $\Omega$/sq., still more preferably 1E+9 to less than 1E+12 $\Omega$/sq., i.e., $1\times10^9$ to less than $1\times10^{12}$ $\Omega$/sq., particularly 1E+10 to 9.9E+11 $\Omega$/sq., i.e., $1\times10^{10}$ to $9.9\times10^{11}$ $\Omega$/sq. The surface resistivity in the present invention is determined according to JIS K6911.

The first and second silicone adhesive compositions may be applied in any conventional manners. For example, use may be made of a comma coater, a lip coater, a roll coater, a die coater, a knife coater, a blade coater, a rod coater, a kiss coater, a gravure coater, screen coating, dip coating and cast coating. An amount of the composition to be applied is preferably such that a thickness of the adhesive layer after cured is 2 to 200 µm, particularly 3 to 100 µm. Curing conditions for the composition according to the first embodiment may be 80 to 150 degrees C. for 30 seconds to 5 minutes, but are not limited thereto. Curing conditions for the composition according to the second embodiment are preferably 80 to 150 degrees C. for 30 seconds to less than 5 minutes, particularly 80 to 140 degrees C. for 30 seconds to 3 minutes.

An adhesive tape may be prepared in any conventional manners, for example, by applying the adhesive composition directly on a sheet substrate, followed by curing, as described above. Alternatively, it may be prepared by a transfer method wherein the adhesive composition is applied on a releasing film or paper-coated with a releasing agent, and cured and, then, the adhesive side is bonded to a sheet substrate.

The present adhesive tape has an excellent antistatic property. Further, no residual adhesive occurs when the adhesive tape is peeled from a tape-stuck body. Therefore, the adhesive tape may be suitably used as an antistatic adhesive tape for various bodies. The tape-stuck body on which the present adhesive tape is to be applied is not particularly limited, and may be metals such as stainless steel, copper and iron; these metals whose surface was subjected to plating or rustproofing; ceramics such as glasses and ceramic wares; resins such as polytetrafluoroethylenes, polyimides, epoxy resins and novolac resins; and composites thereof.

EXAMPLES

The present invention will be explained in more detail by reference to the Examples and the Comparative Examples, but shall not be limited thereto.

Part I: First Embodiment

The Examples and the Comparative Examples for the first embodiment are described in Part I. Components used in the Examples and the Comparative Examples are as follows. The viscosity was hereinafter determined at 25 degrees C. with a Brookfield rotary viscometer of the BM type.
(A) Addition Reaction-Curable Silicone
   Polysiloxane (a1): vinyl group-containing polydimethylsiloxane with the molecular chain terminals each capped with a dimethylvinylsilyl ($SiMe_2Vi$) group, having a viscosity of 27000 mPa·s in a 30% solution in toluene and a vinyl group content of 0.075 mole %
   Polysiloxane (a2): vinyl group-containing polydimethylsiloxane with the molecular chain terminals each capped with a dimethylvinylsilyl ($SiMe_2Vi$) group, having a viscosity of 27000 mPa·s in a 30% solution in toluene and a vinyl group content of 0.15 mole %
   Polysiloxane (b): a 60% solution of polysilosane composed of $Me_3SiO_{0.5}$ units and $SiO_2$ units ($Me_3SiO_{0.5}$ units/$SiO_2$ units=0.82), in toluene
   Polysiloxane (c1): organohydrogenpolysiloxane represented by the following formula:

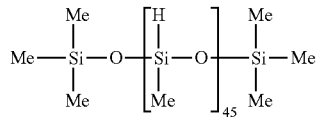

Polysiloxane (c2): organohydrogenpolysiloxane represented by the following formula:

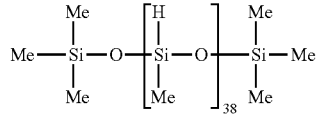

Component (B1): polyoxyalkylene represented by the following formula:

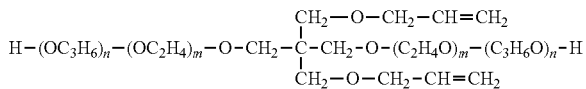

wherein m and n are a combination of (m,n)=(2,0), (8,0), (12,0), (18,0), (0,8) or (6,2). The combination of m and n in component (B1) used in the Examples and the Comparative Examples is as shown in the following Tables.
Component (C):
   Ionic liquid A: trimethylpropylammonium bis(trifluoromethanesulfonyl)imide
   Ionic liquid B: butyltrimethylammonium bis(trifluoromethyl sulfonyl)imide
   Ionic liquid C: ethyldimethylpropylammonium bis(trifluoromethylsulfonyl)imide
Comparative polyoxyalkylene (1): polyoxyalkylene represented by the following formula:

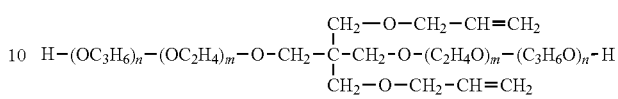

wherein m and n are a combination of (m,n)=(22,0) or (0,12). The combination of m and n in the comparative polyoxyalkylene used in the Comparative Examples is as shown in the following Tables.
Comparative polyoxyalkylene (2): polyoxyalkylene having one unsaturated hydrocarbon group and one polyoxyalkylene residue in one molecule, and represented by the following formula (a) or (b):

$$CH_2=CH—CH_2—O—(C_2H_4O)_4—H \quad (a)$$

$$CH_2=CH—CH_2—O—(C_2H_4O)_8—CH_3 \quad (b)$$

Comparative polyoxyalkylene (3): polyoxyalkylene having one polyoxyalkylene residue and two unsaturated hydrocarbon groups in one molecule, and represented by the following formula (c) or (d):

$$CH_2=CH—CH_2—O—(C_2H_4O)_8—CH_2—CH=CH_2 \quad (c)$$

$$CH_2=CH—CH_2—O—(C_2H_4O)_{16}—CH_2—CH=CH_2 \quad (d)$$

Comparative polyoxyalkylene (4): polyoxyalkylene having two polyoxyalkylene residues and no unsaturated hydrocarbon group in one molecule, and represented by the following formula (e):

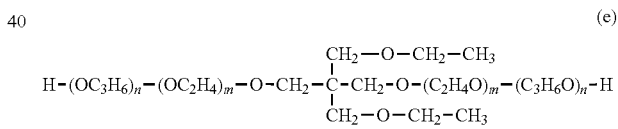

Comparative lithium salt: lithium bis(trifluoromethanesulfonyl)imide

Preparation Example I-1

Preparation of Silicone Adhesive Composition (I-α)
   Forty parts by mass of polysiloxane (a1), 83.3 parts by mass of polysiloxane (b), 0.4 part by mass of polysiloxane (c1) and 33.3 parts by mass of toluene were mixed to obtain a solution, to which 0.2 part by mass of 1-ethynylcyclohexanol was added and mixed to obtain a mixture having a siloxane content of approximately 60% by mass at a ratio of the number of the SiH groups in component (c1) to the number of the alkenyl groups in component (a2) of 15. To 100 parts by mass of the mixture, the (poly)oxyalkylene shown in the following Tables, ionic liquid (C) or the lithium salt shown in the Tables, and polysiloxane (c2) were added in the amounts in part by mass shown in the Tables, and then stirred to obtain a homogeneous mixture. To 100 parts by mass of the mixture, 50 parts by mass of toluene were added, and then mixed to prepare a mixture having a siloxane content of approximately 40% by mass. A reaction product (complex) of chloroplatinic acid with a vinyl group-containing siloxane was added so that the mass of platinum atoms was 250 ppm relative to a total mass of components (a) and (b), and then stirred enough to obtain a silicone adhesive composition (I-α). It is noted that the amount of polysiloxane (c2) was such that a ratio of the number of the SiH groups in polysiloxane (c2) to the number of the alkenyl groups in component (B1) or in the comparative polyoxyalkylene was 1.

Preparation of Silicone Adhesive Composition (I-β)

Ninety five parts by mass of polysiloxane (a2), 8.3 parts by mass of polysiloxane (b), 0.6 part by mass of polysiloxane (c1) and 33.3 parts by mass of toluene were mixed to obtain a solution, to which 0.2 part by mass of 1-ethynyl-cyclohexanol was added to obtain a mixture having a siloxane content of approximately 60% by mass at a ratio of the number of the SiH groups in component (c1) to the number of the alkenyl groups in component (a2) of 5. To 100 parts by mass of the mixture, the (poly)oxylalkylene shown in the following Tables, ionic liquid (C) or the lithium salt shown in the Tables, and polysiloxane (c2) were added in the amounts in part by mass shown in the Tables, and then stirred to obtain a homogeneous mixture. To 100 parts by mass of the mixture, 50 parts by mass of toluene were added, and then mixed to prepare a mixture having a siloxane content of approximately 40% by mass. A reaction product (complex) of chloroplatinic acid with a vinyl group-containing siloxane was added so that the mass of platinum atoms was 250 ppm relative to a total mass of components (a) and (b), and then stirred enough to obtain a silicone adhesive composition (I-β). It is noted that the amount of polysiloxane (c2) was such that a ratio of the number of the SiH groups in polysiloxane (c2) to the number of the alkenyl groups in component (B1) or in the comparative polyoxyalkylene was 1.

The silicone adhesive compositions obtained above were subjected to the following tests.

Curability

The silicone adhesive composition was applied on a polyimide film having a dimension of 110 mm×110 mm and a thickness of 25 μm with an applicator so as to provide a coating having a thickness of 30 μm and, then, heated at 130 degrees C. for 5 minutes to be cured, to thereby prepare an adhesive sheet. The adhesive sheet was put on a surface of stainless steel of SUS304 polished with grade #280 sandpaper and, then, pressed by one cycle of going and returning of a 2 kg roller. Then, the adhesive sheet was peeled from the stainless steel surface to evaluate curability. In a case where no adhesive remained on the stainless steel surface, curing proceeded sufficiently and no adhesive transferred to the substrate. Curability was evaluated as G. Meanwhile in a case where some adhesive remained on the stainless steel surface, curing did not sufficiently proceed and some adhesive transferred to the substrate. Curability was evaluated as NG.

Strength of Bond to a Sheet Substrate (Hereinafter Referred to as Bond Strength)

The antistatic silicone adhesive composition was applied on a polyimide film having a dimension of 110 mm×110 mm and a thickness of 25 μm with an applicator so as to provide a coating having a thickness of 30 μm and, then, heated at 130 degrees C. for 5 minutes to be cured, to thereby prepare an adhesive sheet. The adhesive sheet was put on a surface of stainless steel of SUS304 polished with grade #280 sandpaper and, then, pressed by one cycle of going and returning of a 2 kg roller. Then, the adhesive sheet was peeled from the stainless steel surface to evaluate a strength of bond to the sheet substrate (polyimide film). In a case where the adhesive separated from the sheet substrate, or peeled from the sheet substrate and transferred wholly to the stainless steel surface, the bond strength was evaluated as NG. Meanwhile in a case where the adhesive did not separate from the sheet substrate and no adhesive remained on the stainless steel surface, the bond strength was evaluated as G. It is noted that the composition which was evaluated as NG in the aforesaid curability test is naturally NG also in this test and, therefore, was not subjected to this test. This is indicated as "–" in the Tables.

Surface Resistivity

The silicone adhesive composition was applied on a polyimide film having a dimension of 110 mm×110 mm and a thickness of 25 μm with an applicator so as to provide a coating having a thickness of 30 μm and, then, heated at 130 degrees C. for 5 minutes to be cured, to thereby prepare an adhesive sheet. The surface resistivity of the adhesive sheet was determined according to JIS-K6911 using Hiresta UP MCT-UP450, ex Dia Instruments Co., Ltd., at an applied voltage of 500V. The determination was carried out two or more times. In the Tables, a surface resistivity in the range of 1E+9 to 5E+9 Ω/sq., i.e., $1\times10^9$ to $5\times10^9$ Ω/sq. is indicated as a former half of the order of $10^9$. A surface resistivity in the range of more than 5E+9 to 9.9E+9 Ω/sq., i.e., more than $5\times10^9$ to $9.9\times10^9$ Ω/sq. is indicated as a latter half of the order of $10^9$. Similarly, the following surface resistivities are indicated as follows: 1E+10 to 5E+10 Ω/sq., i.e., $1\times10^{10}$ to $5\times10^{10}$ Ω/sq.: former half of the order of $10^{10}$; more than 5E+10 to 9.9E+10 Ω/sq., i.e., more than $5\times10^{10}$ to $9.9\times10^{10}$ Ω/sq.: latter half of the order of $10^{10}$; 1E+11 to 5E+11 Ω/sq., i.e., $1\times10^{11}$ to $5\times10^{11}$ Ω/sq.: former half of the order of $10^{11}$; more than 5E+11 to 9.9E+11 Ω/sq., i.e., more than $5\times10^{11}$ to $9.9\times10^{11}$ Ω/sq.: latter half of the order of $10^{11}$; 1E+12 to 5E+12 Ω/sq., i.e., $1\times10^{12}$ to $5\times10^{12}$ Ω/sq.: former half of the order of $10^{12}$; more than 5E+12 to 9.9E+12 Ω/sq., i.e., more than $5\times10^{12}$ to $9.9\times10^{12}$ Ω/sq.: latter half of the order of $10^{12}$; 1E+13 to 5E+13 Ω/sq., i.e., $1\times10^{13}$ to $5\times10^{13}$ Ω/sq.: former half of the order of $10^{13}$; more than 5E+13 to 9.9E+13 Ω/sq., i.e., more them $5\times10^{13}$ to $9.9\times10^{13}$ Ω/sq.: latter half of the order of $10^{13}$; 1E+14 to 5E+14 Ω/sq., i.e., $1\times10^{14}$ to $5\times10^{14}$ Ω/sq.: former half of the order of $10^{14}$; more than 5E+14 to 9.9E+14 Ω/sq., i.e., more than $5\times10^{14}$ to $9.9\times10^{14}$ Ω/sq.: latter half of the order of $10^{14}$; and 1E+15 Ω/sq. or more, i.e., $1\times10^{15}$ Ω/sq. or more: $10^{15}$ or more.

The evaluation results of the various silicone adhesive compositions (I-α) comprising the various types of oxyalkylene compounds and ionic liquids in the various amounts are as shown in Tables 1(I) to 14(I). The evaluation results of the various silicone adhesive compositions (I-β) comprising the various types of oxyalkylene compounds and ionic liquids in the various amounts are as shown in Tables 15(I) to 28(I). Further, the evaluation results of the various silicone adhesive compositions (I-α) and the various silicone adhesive compositions (I-β) which comprised the polyoxyalkylene compound represented by the formula (e) having no unsaturated hydrocarbon group in place of component (B1) are as shown in Tables 29(I) to 30(I).

Silicone Adhesive Composition I-α

In Examples 1(I) to 4(I) and Comparative Examples 1(I) and 2(I), polyoxyalkylene compound (B1) with m=2 and n=0 and ioninc liquid A were used in the various amounts of the polyoxyalkylene compound. The results are as shown in Table 1(I). The term "(I)" in the Example and Comparative Example numbers is omitted in this Table.

TABLE 1(I)

| Example | Comparative Example | Component (B1) m | Component (B1) n | Component (B1) Amount, part by mass | Component (C) Type | Component (C) Amount, part by mass | Component (c2) Amount, part by mass | Evaluation results Curability | Evaluation results Surface resistivity | Evaluation results Bond strength |
|---|---|---|---|---|---|---|---|---|---|---|
| Example 1 | | 2 | 0 | 0.5 | A | 0.5 | 0.25 | G | Latter half of the order of $10^{12}$ | G |
| Example 2 | | | | 1 | | | 0.5 | G | Latter half of the order of $10^{10}$ | G |
| Example 3 | | | | 3 | | | 1.49 | G | Former half of the order of $10^{10}$ | G |
| Example 4 | | | | 5 | | | 2.48 | G | Former half of the order of $10^{10}$ | G |
| | Comp. Example 1 | | | 0.4 | | | 0.1 | G | Former half of the order of $10^{13}$ | G |
| | Comp. Example 2 | | | 6 | | | 2.97 | NG | Former half of the order of $10^{10}$ | — |

Silicone Adhesive Composition I-α

In Examples 5(I) to 8(I) and Comparative Examples 3(I) and 4(I), polyoxyalkylene compound (B1) with m=8 and n=0 and ioninc liquid A were used in the various amounts of the polyoxyalkylene compound. The results are as shown in Table 2(I). The term "(I)" in the Example and Comparative Example numbers is omitted in this Table.

TABLE 2(I)

| Example | Comparative Example | Component (B1) m | Component (B1) n | Component (B1) Amount, part by mass | Component (C) Type | Component (C) Amount, part by mass | Component (c2) Amount, part by mass | Evaluation results Curability | Evaluation results Surface resistivity | Evaluation results Bond strength |
|---|---|---|---|---|---|---|---|---|---|---|
| Example 5 | | 8 | 0 | 0.5 | A | 0.5 | 0.12 | G | Latter half of the order of $10^{12}$ | G |
| Example 6 | | | | 1 | | | 0.25 | G | Former half of the order of $10^{11}$ | G |
| Example 7 | | | | 3 | | | 0.74 | G | Latter half of the order of $10^{10}$ | G |
| Example 8 | | | | 5 | | | 1.23 | G | Latter half of the order of $10^{10}$ | G |
| | Comp. Example 3 | | | 0.4 | | | 0.1 | G | Former half of the order of $10^{13}$ | G |
| | Comp. Example 4 | | | 6 | | | 1.47 | NG | Former half of the order of $10^{10}$ | — |

Silicone Adhesive Composition I-α

In Examples 9(I) to 12(I) and Comparative Examples 5(I) and 6(I), polyoxyalkylene compound (B1) with m=12 and n=0 and ioninc liquid A were used in the various amounts of the polyoxyalkylene compound. The results are as shown in Table 3(I). The term "(I)" in the Example and Comparative Example numbers is omitted in this Table.

TABLE 3(I)

| Example | Comparative Example | Component (B1) m | Component (B1) n | Component (B1) Amount, part by mass | Component (C) Type | Component (C) Amount, part by mass | Component (c2) Amount, part by mass | Curability | Surface resistivity | Bond strength |
|---|---|---|---|---|---|---|---|---|---|---|
| Example 9 | | 12 | 0 | 0.5 | A | 0.5 | 0.08 | G | Latter half of the order of $10^{12}$ | G |
| Example 10 | | | | 1 | | | 0.16 | G | Former half of the order of $10^{11}$ | G |
| Example 11 | | | | 3 | | | 0.49 | G | Latter half of the order of $10^{10}$ | G |
| Example 12 | | | | 5 | | | 0.81 | G | Latter half of the order of $10^{10}$ | G |
| | Comp. Example 5 | | | 0.4 | | | 0.07 | G | Former half of the order of $10^{13}$ | G |
| | Comp. Example 6 | | | 6 | | | 0.98 | NG | Former half of the order of $10^{10}$ | — |

Silicone Adhesive Composition I-α

In Examples 13(I) to 16(I) and Comparative Examples 7(I) and 8(I), polyoxyalkylene compound (B1) with m=18 and n=0 and ioninc liquid A were used in the various amounts of the polyoxyalkylene compound. The results are as shown in Table 4(I). The term "(I)" in the Example and Comparative Example numbers is omitted in this Table.

TABLE 4(I)

| Example | Comparative Example | Component (B1) | | | Component (C) | | Component (c2) | Evaluation results | | |
|---|---|---|---|---|---|---|---|---|---|---|
| | | m | n | Amount, part by mass | Type | Amount, part by mass | Amount, part by mass | Curability | Surface resistivity | Bond strength |
| Example 13 | | 18 | 0 | 0.5 | A | 0.5 | 0.07 | G | Latter half of the order of $10^{12}$ | G |
| Example 14 | | | | 1 | | | 0.13 | G | Latter half of the order of $10^{11}$ | G |
| Example 15 | | | | 3 | | | 0.4 | G | Former half of the order of $10^{11}$ | G |
| Example 16 | | | | 5 | | | 0.67 | G | Former half of the order of $10^{11}$ | G |
| | Comp. Example 7 | | | 0.4 | | | 0.05 | G | Former half of the order of $10^{13}$ | G |
| | Comp. Example 8 | | | 6 | | | 0.8 | NG | Former half of the order of $10^{11}$ | — |

Silicone Adhesive Composition I-α

In Examples 17(I) to 20(I) and Comparative Examples 9(I) and 10(I), polyoxyalkylene compound (B1) with m=0 and n=8 and ioninc liquid A were used in the various amounts of the polyoxyalkylene compound. In Examples 21(I) to 23(I), polyoxyalkylene compound (B1) with m=6 and n=2 and ioninc liquid A were used in the various amounts of the polyoxyalkylene compound. The results are as shown in Table 5(I). The term "(I)" in the Example and Comparative Example numbers is omitted in this Table.

TABLE 5(I)

| Example | Comparative Example | Component (B1) | | | Component (C) | | Component (c2) | Evaluation results | | |
|---|---|---|---|---|---|---|---|---|---|---|
| | | m | n | Amount, part by mass | Type | Amount, part by mass | Amount, part by mass | Curability | Surface resistivity | Bond strength |
| Ex. 17 | | 0 | 8 | 0.5 | A | 0.5 | 0.1 | G | Latter half of the order of $10^{12}$ | G |
| Ex. 18 | | | | 1 | | | 0.19 | G | Latter half of the order of $10^{11}$ | G |
| Ex. 19 | | | | 3 | | | 0.58 | G | Former half of the order of $10^{11}$ | G |
| Ex. 20 | | | | 5 | | | 0.97 | G | Former half of the order of $10^{11}$ | G |
| | Comp. Ex. 9 | | | 0.4 | | | 0.08 | G | Former half of the order of $10^{13}$ | G |
| | Comp. Ex. 10 | | | 6 | | | 1.16 | NG | Former half of the order of $10^{11}$ | — |
| Ex. 21 | | 6 | 2 | 0.5 | A | 0.5 | 0.09 | G | Latter half of the order of $10^{11}$ | G |
| Ex. 22 | | | | 1 | | | 0.18 | G | Latter half of the order of $10^{11}$ | G |
| Ex. 23 | | | | 3 | | | 0.53 | G | Former half of the order of $10^{11}$ | G |

Silicone Adhesive Composition I-α

In Examples 24(I) to 27(I) and Comparative Examples 11(I) and 12(I), polyoxyalkylene compound (B1) with m=2 and n=0 and ioninc liquid B were used in the various amounts of the polyoxyalkylene compound. In Examples 28(I) to 31(I) and Comparative Examples 13(I) and 14(I), polyoxyalkylene compound (B1) with m=8 and n=0 and ioninc liquid B were used in the various amounts of the polyoxyalkylene compound. The results are as shown in Table 6(I). The term "(I)" in the Example and Comparative Example numbers is omitted in this Table.

TABLE 6(I)

| Example | Comparative Example | Component (B1) m | Component (B1) n | Component (B1) Amount, part by mass | Component (C) Type | Component (C) Amount, part by mass | Component (c2) Amount, part by mass | Evaluation results Curability | Evaluation results Surface resistivity | Evaluation results Bond strength |
|---|---|---|---|---|---|---|---|---|---|---|
| Ex. 24 | | 2 | 0 | 0.5 | B | 0.5 | 0.25 | G | Latter half of the order of $10^{12}$ | G |
| Ex. 25 | | | | 1 | | | 0.5 | G | Latter half of the order of $10^{10}$ | G |
| Ex. 26 | | | | 3 | | | 1.49 | G | Former half of the order of $10^{10}$ | G |
| Ex. 27 | | | | 5 | | | 2.48 | G | Former half of the order of $10^{10}$ | G |
| | Comp. Ex. 11 | | | 0.4 | | | 0.1 | G | Former half of the order of $10^{12}$ | G |
| | Comp. Ex. 12 | | | 6 | | | 2.97 | NG | Former half of the order of $10^{10}$ | — |
| Ex. 28 | | 8 | 0 | 0.5 | A | 0.5 | 0.08 | G | Latter half of the order of $10^{11}$ | G |
| Ex. 29 | | | | 1 | | | 0.16 | G | Former half of the order of $10^{11}$ | G |
| Ex. 30 | | | | 3 | | | 0.49 | G | Latter half of the order of $10^{10}$ | G |
| Ex. 31 | | | | 5 | | | 0.81 | G | Latter half of the order of $10^{10}$ | G |
| | Comp. Ex. 13 | | | 0.4 | | | 0.07 | G | Former half of the order of $10^{13}$ | G |
| | Comp. Ex. 14 | | | 6 | | | 0.98 | NG | Former half of the order of $10^{10}$ | — |

Silicone Adhesive Composition I-α

In Examples 32(I) to 35(I) and Comparative Examples 15(I) and 16(I), polyoxyalkylene compound (B1) with m=2 and n=0 and ioninc liquid C were used in the various amounts of the polyoxyalkylene compound. In Examples 36(I) to 39(I) and Comparative Examples 17(I) and 18(I), polyoxyalkylene compound (B1) with m=8 and n=0 and ioninc liquid C were used in the various amounts of the polyoxyalkylene compound. The results are as shown in Table 7(I). The term "(I)" in the Example and Comparative Example numbers is omitted in this Table.

TABLE 7(I)

| Example | Comparative Example | Component (B1) m | Component (B1) n | Component (B1) Amount, part by mass | Component (C) Type | Component (C) Amount, part by mass | Component (c2) Amount, part by mass | Evaluation results Curability | Evaluation results Surface resistivity | Evaluation results Bond strength |
|---|---|---|---|---|---|---|---|---|---|---|
| Ex. 32 | | 2 | 0 | 0.5 | C | 0.5 | 0.25 | G | Latter half of the order of $10^{11}$ | G |
| Ex. 33 | | | | 1 | | | 0.5 | G | Latter half of the order of $10^{10}$ | G |
| Ex. 34 | | | | 3 | | | 1.49 | G | Former half of the order of $10^{10}$ | G |
| Ex. 35 | | | | 5 | | | 2.48 | G | Former half of the order of $10^{10}$ | G |
| | Comp. Ex. 15 | | | 0.4 | | | 0.2 | G | Former half of the order of $10^{12}$ | G |
| | Comp. Ex. 16 | | | 6 | | | 2.97 | NG | Former half of the order of $10^{10}$ | — |
| Ex. 36 | | 8 | 0 | 0.5 | A | 0.5 | 0.08 | G | Latter half of the order of $10^{11}$ | G |
| Ex. 37 | | | | 1 | | | 0.16 | G | Former half of the order of $10^{11}$ | G |
| Ex. 38 | | | | 3 | | | 0.49 | G | Latter half of the order of $10^{10}$ | G |
| Ex. 39 | | | | 5 | | | 0.81 | G | Latter half of the order of $10^{10}$ | G |
| | Comp. Ex. 17 | | | 0.4 | | | 0.07 | G | Former half of the order of $10^{12}$ | G |
| | Comp. Ex. 18 | | | 6 | | | 0.98 | NG | Former half of the order of $10^{10}$ | — |

Silicone Adhesive Composition I-α

In Examples 40(I) to 47(I), ioninc liquid A was used in an amount of 0.01 part by mass. In Examples 48(I) to 55(I), ioninc liquid A was used in an amount of 2 parts by mass. The results are as shown in Table 8(I). The term "(I)" in the Example numbers is omitted in this Table.

TABLE 8(I)

| Example | Component (B1) m | n | Amount, part by mass | Component (C) Type | Amount, part by mass | Component (c2) Amount, part by mass | Evaluation results Curability | Surface resistivity | Bond strength |
|---|---|---|---|---|---|---|---|---|---|
| Ex. 40 | 2 | 0 | 0.5 | A | 0.01 | 0.25 | G | Latter half of the order of $10^{11}$ | G |
| Ex. 41 |   |   | 1 | A |   | 0.5 | G | Latter half of the order of $10^{10}$ | G |
| Ex. 42 |   |   | 3 | A |   | 1.49 | G | Former half of the order of $10^{10}$ | G |
| Ex. 43 |   |   | 5 | A |   | 2.48 | G | Former half of the order of $10^{10}$ | G |
| Ex. 44 | 8 | 0 | 0.5 | A |   | 0.08 | G | Latter half of the order of $10^{11}$ | G |
| Ex. 45 |   |   | 1 | A |   | 0.16 | G | Former half of the order of $10^{11}$ | G |
| Ex. 46 |   |   | 3 | A |   | 0.49 | G | Latter half of the order of $10^{10}$ | G |
| Ex. 47 |   |   | 5 | A |   | 0.81 | G | Latter half of the order of $10^{10}$ | G |
| Ex. 48 | 2 | 0 | 0.5 | A | 2 | 0.25 | G | Latter half of the order of $10^{11}$ | G |
| Ex. 49 |   |   | 1 | A |   | 0.5 | G | Latter half of the order of $10^{10}$ | G |
| Ex. 50 |   |   | 3 | A |   | 1.49 | G | Former half of the order of $10^{10}$ | G |
| Ex. 51 |   |   | 5 | A |   | 2.48 | G | Former half of the order of $10^{10}$ | G |
| Ex. 52 | 8 | 0 | 0.5 | A |   | 0.08 | G | Latter half of the order of $10^{11}$ | G |
| Ex. 53 |   |   | 1 | A |   | 0.16 | G | Former half of the order of $10^{11}$ | G |
| Ex. 54 |   |   | 3 | A |   | 0.49 | G | Latter half of the order of $10^{10}$ | G |
| Ex. 55 |   |   | 5 | A |   | 0.81 | G | Latter half of the order of $10^{10}$ | G |

Silicone Adhesive Composition I-α

In Comparative Examples 19(I) to 27(I), ioninc liquid A was used in an amount of 3 parts by mass. In Comparative Examples 28(I) to 30(I), no ioninc liquid was used. The results are as shown in Table 9(I). The term "(I)" in the Comparative Example numbers is omitted in this Table.

TABLE 9(I)

| Comparative Example | Component (B1) m | n | amount, part by mass | Component (C) Type | amount, part by mass | Component (c2) Amount, part by mass | Evaluation results Curability | Surface resistivity | Bond strength |
|---|---|---|---|---|---|---|---|---|---|
| Comp. Ex. 19 | 2 | 0 | 0.4 | A | 3 | 0.2 | NG | Former half of the order of $10^{12}$ | — |
| Comp. Ex. 20 |   | 0 | 0.5 |   |   | 0.25 | NG | Former half of the order of $10^{12}$ | — |
| Comp. Ex. 21 |   | 0 | 1 |   |   | 0.5 | NG | Latter half of the order of $10^{11}$ | — |
| Comp. Ex. 22 |   | 0 | 3 |   |   | 1.49 | NG | Latter half of the order of $10^{10}$ | — |
| Comp. Ex. 23 | 8 | 0 | 0.4 |   |   | 0.03 | NG | Former half of the order of $10^{10}$ | — |
| Comp. Ex. 24 |   | 0 | 0.5 |   |   | 0.08 | NG | Former half of the order of $10^{12}$ | — |
| Comp. Ex. 25 |   | 0 | 1 |   |   | 0.16 | NG | Latter half of the order of $10^{11}$ | — |
| Comp. Ex. 26 |   | 0 | 3 |   |   | 0.49 | NG | Former half of the order of $10^{11}$ | — |
| Comp. Ex. 27 |   | 0 | 5 |   |   | 0.81 | NG | Latter half of the order of $10^{10}$ | — |
| Comp. Ex. 28 | 2 | 0 | 0.5 | — |   | 0.25 | G | Former half of the order of $10^{14}$ | G |
| Comp. Ex. 29 |   | 0 | 5 |   |   | 2.48 | G | Former half of the order of $10^{14}$ | G |
| Comp. Ex. 30 |   | 0 | 6 |   |   | 2.97 | G | Former half of the order of $10^{14}$ | NG |

Silicone Adhesive Composition I-α

In Comparative Examples 31(I) to 34(I), no polyoxyalkylene compound was used. In Comparative Example 35(I), neither polyoxyalkylene compound nor ioninc liquid was used. The results are as shown in Table 10(I). The term "(I)" in the Comparative Example numbers is omitted in this Table.

TABLE 10(I)

| Comparative Example | Component (B1) m | n | Amount, part by mass | Component (C) type | Amount, part by mass | Component (c2) Amount, part by mass | Evaluation results Curability | Surface resistivity | Bond strength |
|---|---|---|---|---|---|---|---|---|---|
| Comp. Ex. 31 |   |   | — | A | 0.5 | — | G | Former half of the order of $10^{13}$ | G |
| Comp. Ex. 32 |   |   |   |   | 1 |   | G | Former half of the order of $10^{13}$ | G |
| Comp. Ex. 33 |   |   |   |   | 3 |   | G | Former half of the order of $10^{13}$ | G |

TABLE 10(I)-continued

| Comparative Example | Component (B1) Amount, part by mass m n | Component (C) type | Component (c2) Amount, part by mass | Amount, part by mass | Evaluation results Curability | Surface resistivity | Bond strength |
|---|---|---|---|---|---|---|---|
| Comp. Ex. 34 | | | 5 | | G | Former half of the order of $10^{13}$ | G |
| Comp. Ex. 35 | | | — | — | G | $10^{15}$ or more | G |

Silicone Adhesive Composition I-α

In Comparative Examples 36(I) to 46(I), the lithium salt was substituted for component (C). The results are as shown in Table 11(I). The term "(I)" in the Comparative Example numbers is omitted in this Table.

TABLE 11(I)

| Comparative Example | Component (B1) m n | Amount, part by mass | Lithium salt Amount, part by mass | Component (c2) Amount, part by mass | Curability | Surface resistivity | Bond strength |
|---|---|---|---|---|---|---|---|
| Comp. Ex. 36 | 2 0 | 0.4 | 0.5 | 0.1 | G | Former half of the order of $10^{11}$ | NG |
| Comp. Ex. 37 | | 0.5 | 0.5 | 0.25 | G | Latter half of the order of $10^{10}$ | NG |
| Comp. Ex. 38 | | 0.5 | 0.05 | 0.5 | G | Latter half of the order of $10^9$ | NG |
| Comp. Ex. 39 | | 0.5 | 0.01 | 0.5 | G | Latter half of the order of $10^9$ | NG |
| Comp. Ex. 40 | | 1 | 0.5 | 0.5 | G | Latter half of the order of $10^9$ | NG |
| Comp. Ex. 41 | | 3 | 0.5 | 1.49 | G | Former half of the order of $10^9$ | NG |
| Comp. Ex. 42 | | 5 | 0.5 | 2.48 | G | Former half of the order of $10^9$ | NG |
| Comp. Ex. 43 | 8 0 | 0.5 | 0.5 | 0.08 | G | Latter half of the order of $10^{10}$ | NG |
| Comp. Ex. 44 | | 1 | | 0.16 | G | Former half of the order of $10^{10}$ | NG |
| Comp. Ex. 45 | | 3 | | 0.81 | G | Latter half of the order of $10^9$ | NG |
| Comp. Ex. 46 | | 0.4 | | 0.49 | G | Former half of the order of $10^{11}$ | NG |

Silicone Adhesive Composition I-α

In Comparative Examples 47(I) and 48(I), comparative polyoxyalkylene compound (1) with m=0 and n=12 was used. In Comparative Examples 49(I) and 50(I), comparative polyoxyalkylene compound (1) with m=22 and n=0 was used. The results are as shown in Table 12(I). The term "(I)" in the Comparative Example numbers is omitted in this Table.

TABLE 12(I)

| Comparative Example | Polyoxyalkylene compound (1) m n | Amount, part by mass | Component (C) Type | Amount, part by mass | Component (c2) Amount, part by mass | Curability | Surface resistivity | Bond strength |
|---|---|---|---|---|---|---|---|---|
| Comp. Ex. 47 | 0 12 | 1 | A | 0.5 | 0.16 | G | Former half of the order of $10^{13}$ | NG |
| Comp. Ex. 48 | | 3 | | | 0.49 | NG | Former half of the order of $10^{13}$ | — |
| Comp. Ex. 49 | 22 0 | 1 | | | 0.12 | G | Former half of the order of $10^{12}$ | NG |
| Comp. Ex. 50 | | 3 | | | 0.37 | NG | Latter half of the order of $10^{11}$ | — |

Silicone Adhesive Composition I-α

In Comparative Examples 51(I) to 56(I), comparative polyoxyalkylene compound (a) or (b) having one unsaturated hydrocarbon group and one polyoxyalkylene residue in one molecule was used. The results are as shown in Table 13(I). The term "(I)" in the Comparative Example numbers is omitted in this Table.

TABLE 13(I)

| Comparative Example | Polyoxyalkylene compound Type | Amount, part by mass | Component (C) Type | Amount, part by mass | Component (c2) Amount, part by mass | Evaluation results Curability | Surface resistivity | Bond strength |
|---|---|---|---|---|---|---|---|---|
| Comp. Ex. 51 | (a) | 0.5 | A | 0.5 | 0.14 | G | Latter half of the order of $10^{12}$ | NG |
| Comp. Ex. 52 | | 1 | | | 0.27 | G | Former half of the order of $10^9$ | NG |
| Comp. Ex. 53 | | 3 | | | 0.82 | G | Former half of the order of $10^9$ | NG |
| Comp. Ex. 54 | (b) | 0.5 | | | 0.13 | G | Latter half of the order of $10^{12}$ | NG |
| Comp. Ex. 55 | | 1 | | | 0.26 | G | Former half of the order of $10^9$ | NG |
| Comp. Ex. 56 | | 3 | | | 0.78 | G | Former half of the order of $10^9$ | NG |

Silicone Adhesive Composition I-α

In Comparative Examples 57(I) to 62(I), comparative polyoxyalkylene compound (c) or (d) having one polyoxyalkylene residue in one molecule was used. The results are as shown in Table 14(I). The term "(I)" in the Comparative Example numbers is omitted in this Table.

TABLE 14(I)

| Comp. Ex. | Polyoxyalkylene compound Type | Amount, part by mass | Component (C) Type | Amount, part by mass | Component (c2) Type | Evaluation results Curability | Surface resistivity | Bond strength |
|---|---|---|---|---|---|---|---|---|
| Comp. Ex. 57 | (c) | 0.5 | A | 0.5 | 0.25 | G | Latter half of the order of $10^{13}$ | G |
| Comp. Ex. 58 | | 1 | | | 0.49 | G | Former half of the order of $10^{13}$ | G |
| Comp. Ex. 59 | | 5 | | | 2.47 | NG | Latter half of the order of $10^{12}$ | — |
| Comp. Ex. 60 | (d) | 0.5 | | | 0.13 | G | Latter half of the order of $10^{13}$ | G |
| Comp. Ex. 61 | | 1 | | | 0.27 | G | Former half of the order of $10^{13}$ | G |
| Comp. Ex. 62 | | 5 | | | 1.34 | NG | Latter half of the order of $10^{12}$ | — |

Silicone Adhesive Composition I-β

In Examples 56(I) to 59(I) and Comparative Examples 63(I) and 64(I), polyoxyalkylene compound (B1) with m=2 and n=0 and ioninc liquid A were used in the various amounts of the polyoxyalkylene compound. The results are as shown in Table 15(I). The term "(I)" in the Example and Comparative Example numbers is omitted in this Table.

TABLE 15(I)

| Example | Comparative Example | Component (B1) m | n | Amount, part by mass | Component (C) Type | Amount, part by mass | Component (c2) Amount, part by mass | Curability | Surface resistivity | Bond strength |
|---|---|---|---|---|---|---|---|---|---|---|
| Example 56 | | 2 | 0 | 0.5 | A | 0.5 | 0.25 | G | Latter half of the order of $10^{12}$ | G |
| Example 57 | | | | 1 | | | 0.5 | G | Latter half of the order of $10^{10}$ | G |
| Example 58 | | | | 3 | | | 1.49 | G | Former half of the order of $10^{10}$ | G |
| Example 59 | | | | 5 | | | 2.48 | G | Former half of the order of $10^{10}$ | G |
| | Comp. Example 63 | | | 0.4 | | | 0.1 | G | Former half of the order of $10^{13}$ | G |
| | Comp. Example 64 | | | 6 | | | 2.97 | NG | Former half of the order of $10^{10}$ | — |

Silicone Adhesive Composition I-β

In Examples 60(I) to 63(I) and Comparative Examples 65(I) and 66(I), polyoxyalkylene compound (B1) with m=8 and n=0 and ioninc liquid A were used in the various amounts of the polyoxyalkylene compound. The results are as shown in Table 16(I). The term "(I)" in the Example and Comparative Example numbers is omitted in this Table.

TABLE 16(I)

| Example | Comp. Example | Component (B1) m | n | Amount, part by mass | Component (C) type | Amount, part by mass | Component (c2) Amount, part by mass | Evaluation results Curability | Surface resistivity | Bond strength |
|---|---|---|---|---|---|---|---|---|---|---|
| Example 60 | | 8 | 0 | 0.5 | A | 0.5 | 0.12 | G | Former half of the order of $10^{12}$ | G |
| Example 61 | | | | 1 | | | 0.25 | G | Former half of the order of $10^{11}$ | G |
| Example 62 | | | | 3 | | | 0.74 | G | Latter half of the order of $10^{10}$ | G |
| Example 63 | | | | 5 | | | 1.23 | G | Latter half of the order of $10^{10}$ | G |
| | Comp. Example 65 | | | 0.4 | | | 0.1 | G | Former half of the order of $10^{13}$ | G |
| | Comp. Example 66 | | | 6 | | | 1.47 | NG | Former half of the order of $10^{10}$ | — |

Silicone Adhesive Composition I-β

In Examples 64(I) to 67(I) and Comparative Examples 67(I) and 68(I), polyoxyalkylene compound (B1) with m=12 and n=0 and ioninc liquid A were used in the various amounts of the polyoxyalkylene compound. The results are as shown in Table 17(I). The term "(I)" in the Example and Comparative Example numbers is omitted in this Table.

TABLE 17(I)

| Example | Comp. Example | Component (B1) m | n | Amount, part by mass | Component (C) Type | Amount, part by mass | Component (c2) Amount, part by mass | Evaluation results Curability | Surface resistivity | Bond strength |
|---|---|---|---|---|---|---|---|---|---|---|
| Example 64 | | 12 | 0 | 0.5 | A | 0.5 | 0.08 | G | Former half of the order of $10^{12}$ | G |
| Example 65 | | | | 1 | | | 0.16 | G | Former half of the order of $10^{11}$ | G |
| Example 66 | | | | 3 | | | 0.49 | G | Latter half of the order of $10^{10}$ | G |
| Example 67 | | | | 5 | | | 0.81 | G | Latter half of the order of $10^{10}$ | G |
| | Comp. Example 67 | | | 0.4 | | | 0.07 | G | Former half of the order of $10^{13}$ | G |
| | Comp. Example 68 | | | 6 | | | 0.98 | NG | Former half of the order of $10^{10}$ | — |

Silicone Adhesive Composition I-β

In Examples 68(I) to 71(I) and Comparative Examples 69(I) and 70(I), polyoxyalkylene compound (B1) with m=18 and n=0 and ioninc liquid A were used in the various amounts of the polyoxyalkylene compound. The results are as shown in Table 18(I). The term "(I)" in the Example and Comparative Example numbers is omitted in this Table.

TABLE 18(I)

| Example | Comparative Example | Component (B1) m | n | Amount, part by mass | Component (C) Type | Amount, part by mass | Component (c2) Amount, part by mass | Evaluation results Curability | Surface resistivity | Bond strength |
|---|---|---|---|---|---|---|---|---|---|---|
| Example 68 | | 18 | 0 | 0.5 | A | 0.5 | 0.07 | G | Former half of the order of $10^{12}$ | G |
| Example 69 | | | | 1 | | | 0.13 | G | Latter half of the order of $10^{11}$ | G |
| Example 70 | | | | 3 | | | 0.4 | G | Former half of the order of $10^{11}$ | G |
| Example 71 | | | | 5 | | | 0.67 | G | Former half of the order of $10^{11}$ | G |
| | Comp. Example 69 | | | 0.4 | | | 0.05 | G | Former half of the order of $10^{13}$ | G |
| | Comp. Example 70 | | | 6 | | | 0.8 | NG | Former half of the order of $10^{11}$ | — |

Silicone Adhesive Composition I-β

In Examples 72(I) to 75(I) and Comparative Examples 71(I) and 72(I), polyoxyalkylene compound (B1) with m=0 and n=8 and ioninc liquid A were used in the various amounts of the polyoxyalkylene compound. In Examples 76(I) to 78(I), polyoxyalkylene compound (B1) with m=6 and n=2 and ioninc liquid A were used in the various amounts of the polyoxyalkylene compound. The results are as shown in Table 19(I). The term "(I)" in the Example and Comparative Example numbers is omitted in this Table.

TABLE 19(I)

| Example | Comparative Example | Component (B1) m | Component (B1) n | Component (B1) Amount, part by mass | Component (C) Type | Component (C) Amount, part by mass | Component (c2) Amount, part by mass | Evaluation results Curability | Evaluation results Surface resistivity | Bond strength |
|---|---|---|---|---|---|---|---|---|---|---|
| Ex. 72 | | 0 | 8 | 0.5 | A | 0.5 | 0.1 | G | Latter half of the order of $10^{11}$ | G |
| Ex. 73 | | | | 1 | | | 0.19 | G | Latter half of the order of $10^{11}$ | G |
| Ex. 74 | | | | 3 | | | 0.58 | G | Former half of the order of $10^{11}$ | G |
| Ex. 75 | | | | 5 | | | 0.97 | G | Former half of the order of $10^{11}$ | G |
| | Comp. Ex. 71 | | | 0.4 | | | 0.08 | G | Former half of the order of $10^{12}$ | G |
| | Comp. Ex. 72 | | | 6 | | | 1.16 | NG | Former half of the order of $10^{11}$ | — |
| Ex. 76 | | 6 | 2 | 0.5 | A | 0.5 | 0.09 | G | Latter half of the order of $10^{11}$ | G |
| Ex. 77 | | | | 1 | | | 0.18 | G | Latter half of the order of $10^{11}$ | G |
| Ex. 78 | | | | 3 | | | 0.53 | G | Former half of the order of $10^{11}$ | G |

Silicone Adhesive Composition I-β

In Examples 79(I) to 82(I) and Comparative Examples 73(I) and 74(I), polyoxyalkylene compound (B1) with m=2 and n=0 and ioninc liquid B were used in the various amounts of the polyoxyalkylene compound. In Examples 83(I) to 86(I) and Comparative Examples 75(I) and 76(I), polyoxyalkylene compound (B1) with m=8 and n=0 and ioninc liquid B were used in the various amounts of the polyoxyalkylene compound. The results are as shown in Table 20(I). The term "(I)" in the Example and Comparative Example numbers is omitted in this Table.

TABLE 20(I)

| Example | Comparative Example | Component (B1) m | Component (B1) n | Component (B1) Amount, part by mass | Component (C) Type | Component (C) Amount, part by mass | Component (c2) Amount, part by mass | Evaluation results Curability | Evaluation results Surface resistivity | Bond strength |
|---|---|---|---|---|---|---|---|---|---|---|
| Ex. 79 | | 2 | 0 | 0.5 | B | 0.5 | 0.25 | G | Latter half of the order of $10^{12}$ | G |
| Ex. 80 | | | | 1 | | | 0.5 | G | Latter half of the order of $10^{10}$ | G |
| Ex. 81 | | | | 3 | | | 1.43 | G | Former half of the order of $10^{10}$ | G |
| Ex. 82 | | | | 5 | | | 2.48 | G | Former half of the order of $10^{10}$ | G |
| | Comp. Ex. 73 | | | 0.4 | | | 0.1 | G | Former half of the order of $10^{12}$ | G |
| | Comp. Ex. 74 | | | 6 | | | 2.97 | NG | Former half of the order of $10^{10}$ | — |
| Ex. 83 | | 8 | 0 | 0.5 | | | 0.08 | G | Latter half of the order of $10^{11}$ | G |
| Ex. 84 | | | | 1 | | | 0.16 | G | Former half of the order of $10^{11}$ | G |
| Ex. 85 | | | | 3 | | | 0.49 | G | Latter half of the order of $10^{11}$ | G |
| Ex. 86 | | | | 5 | | | 0.81 | G | Latter half of the order of $10^{10}$ | G |
| | Comp. Ex. 75 | | | 0.4 | | | 0.07 | G | Former half of the order of $10^{13}$ | G |
| | Comp. Ex. 76 | | | 6 | | | 0.98 | NG | Former half of the order of $10^{10}$ | — |

Silicone Adhesive Composition I-β

In Examples 87(I) to 90(I) and Comparative Examples 77(I) and 78(I), polyoxyalkylene compound (B1) with m=2 and n=0 and ioninc liquid C were used in the various amounts of the polyoxyalkylene compound. In Examples 91(I) to 94(I) and Comparative Examples 79(I) and 80(I), polyoxyalkylene compound (B1) with m=8 and n=0 and ioninc liquid C were used in the various amounts of the polyoxyalkylene compound. The results are as shown in Table 21(I). The term "(I)" in the Example and Comparative Example numbers is omitted in this Table.

TABLE 21(I)

| Example | Comparative Example | Component (B1) m | n | Amount, part by mass | Component (C) Type | Amount, part by mass | Component (c2) Amount, part by mass | Evaluation results Curability | Surface resistivity | Bond strength |
|---|---|---|---|---|---|---|---|---|---|---|
| Ex. 87 | | 2 | 0 | 0.5 | C | 0.5 | 0.25 | G | Latter half of the order of $10^{12}$ | G |
| Ex. 88 | | | | 1 | | | 0.5 | G | Latter half of the order of $10^{10}$ | G |
| Ex. 89 | | | | 3 | | | 1.49 | G | Former half of the order of $10^{10}$ | G |
| Ex. 90 | | | | 5 | | | 2.48 | G | Former half of the order of $10^{10}$ | G |
| | Comp. Ex. 77 | | | 0.4 | | | 0.2 | G | Former half of the order of $10^{12}$ | G |
| | Comp. Ex. 78 | | | 6 | | | 2.97 | NG | Former half of the order of $10^{10}$ | — |
| Ex. 91 | | 8 | 0 | 0.5 | | | 0.08 | G | Latter half of the order of $10^{11}$ | G |
| Ex. 92 | | | | 1 | | | 0.16 | G | Former half of the order of $10^{11}$ | G |
| Ex. 93 | | | | 3 | | | 0.49 | G | Latter half of the order of $10^{10}$ | G |
| Ex. 94 | | | | 5 | | | 0.81 | G | Latter half of the order of $10^{10}$ | G |
| | Comp. Ex. 79 | | | 0.4 | | | 0.07 | G | Former half of the order of $10^{13}$ | G |
| | Comp. Ex. 80 | | | 6 | | | 0.98 | NG | Former half of the order of $10^{10}$ | — |

Silicone Adhesive Composition I-α

In Examples 95(I) to 102(I), ioninc liquid A was used in an amount of 0.01 part by mass. In Examples 103(I) to 110(I), ioninc liquid A was used in an amount of 2 parts by mass. The results are as shown in Table 22(I). The term "(I)" in the Example numbers is omitted in this Table.

TABLE 22(I)

| Example | Component (B1) m | n | Amount, part by mass | Component (C) Type | Amount, part by mass | Component (c2) Amount, part by mass | Curability | Surface resistivity | Bond strength |
|---|---|---|---|---|---|---|---|---|---|
| Ex. 95 | 2 | 0 | 0.5 | A | 0.01 | 0.25 | G | Latter half of the order of $10^{11}$ | G |
| Ex. 96 | | | 1 | A | | 0.5 | G | Latter half of the order of $10^{10}$ | G |
| Ex. 97 | | | 3 | A | | 1.49 | G | Former half of the order of $10^{10}$ | G |
| Ex. 98 | | | 5 | A | | 2.48 | G | Former half of the order of $10^{10}$ | G |
| Ex. 99 | 8 | 0 | 0.5 | A | | 0.08 | G | Latter half of the order of $10^{11}$ | G |
| Ex. 100 | | | 1 | A | | 0.16 | G | Former half of the order of $10^{11}$ | G |
| Ex. 101 | | | 3 | A | | 0.49 | G | Latter half of the order of $10^{10}$ | G |
| Ex. 102 | | | 5 | A | | 0.81 | G | Latter half of the order of $10^{10}$ | G |
| Ex. 103 | 2 | 0 | 0.5 | A | 2 | 0.25 | G | Latter half of the order of $10^{11}$ | G |
| Ex. 104 | | | 1 | A | | 0.5 | G | Latter half of the order of $10^{10}$ | G |
| Ex. 105 | | | 3 | A | | 1.49 | G | Former half of the order of $10^{10}$ | G |
| Ex. 106 | | | 5 | A | | 2.48 | G | Former half of the order of $10^{10}$ | G |
| Ex. 107 | 8 | 0 | 0.5 | A | | 0.08 | G | Latter half of the order of $10^{11}$ | G |
| Ex. 108 | | | 1 | A | | 0.16 | G | Former half of the order of $10^{11}$ | G |
| Ex. 109 | | | 3 | A | | 0.49 | G | Latter half of the order of $10^{10}$ | G |
| Ex. 110 | | | 5 | A | | 0.81 | G | Latter half of the order of $10^{10}$ | G |

Silicone Adhesive Composition I-β

In Comparative Examples 81(I) to 89(I), ioninc liquid A was used in an amount of 3 parts by mass. In Comparative Examples 90(I) to 92(I), no ioninc liquid was used. The results are shown in Table 23(I). The term "(I)" in the Comparative Example numbers is omitted in this Table.

TABLE 23(I)

| Comparative Example | Component (B1) m | n | Amount, part by mass | Component (C) Type | Amount, part by mass | Component (c2) Amount, part by mass | Curability | Surface resistivity | Bond strength |
|---|---|---|---|---|---|---|---|---|---|
| Comp. Ex. 81 | 2 | 0 | 0.4 | A | 3 | 0.2 | NG | Former half of the order of $10^{12}$ | — |
| Comp. Ex. 82 | | 0 | 0.5 | | | 0.25 | NG | Former half of the order of $10^{12}$ | — |
| Comp. Ex. 83 | | 0 | 1 | | | 0.5 | NG | Latter half of the order of $10^{11}$ | — |
| Comp. Ex. 84 | | 0 | 3 | | | 1.49 | NG | Latter half of the order of $10^{10}$ | — |

TABLE 23(I)-continued

|  | Component (B1) | | Component (C) | | Component (c2) | Evaluation results | | |
|---|---|---|---|---|---|---|---|---|
| Comparative Example | m | n | Amount, part by mass | Type | Amount, part by mass | Amount, part by mass | Curability | Surface resistivity | Bond strength |
| Comp. Ex. 85 | 8 | 0 | 0.4 | | | 0.03 | NG | Former half of the order of $10^{10}$ | — |
| Comp. Ex. 86 | | 0 | 0.5 | | | 0.08 | NG | Former half of the order of $10^{12}$ | — |
| Comp. Ex. 87 | | 0 | 1 | | | 0.16 | NG | Latter half of the order of $10^{11}$ | — |
| Comp. Ex. 88 | | 0 | 3 | | | 0.49 | NG | Former half of the order of $10^{11}$ | — |
| Comp. Ex. 89 | | 0 | 5 | | | 0.81 | NG | Latter half of the order of $10^{10}$ | — |
| Comp. Ex. 90 | 2 | 0 | 0.5 | | — | 0.25 | G | Former half of the order of $10^{14}$ | G |
| Comp. Ex. 91 | | 0 | 5 | | | 2.48 | G | Former half of the order of $10^{14}$ | G |
| Comp. Ex. 92 | | 0 | 6 | | | 2.97 | G | Former half of the order of $10^{14}$ | NG |

Silicone Adhesive Composition I-β

In Comparative Examples 93(I) to 96(I), no polyoxyalkylene compound was used. In Comparative Example 97(I), neither polyoxyalkylene compound nor ioninc liquid was used. The results are as shown in Table 24(I). The term "(I)" in the Comparative Example numbers is omitted in this Table.

TABLE 24(I)

|  | Component (B1) | | Component (C) | | Component (c2) | Evaluation results | | |
|---|---|---|---|---|---|---|---|---|
| Comparative Example | m | n | Amount, part by mass | Type | Amount, part by mass | Amount, part by mass | Curability | Surface resistivity | Bond strength |
| Comp. Ex. 93 | | — | | A | 0.5 | — | G | Former half of the order of $10^{13}$ | G |
| Comp. Ex. 94 | | | | | 1 | | G | Former half of the order of $10^{13}$ | G |
| Comp. Ex. 95 | | | | | 3 | | G | Former half of the order of $10^{13}$ | G |
| Comp. Ex. 96 | | | | | 5 | | G | Former half of the order of $10^{13}$ | G |
| Comp. Ex. 97 | | | | | — | — | G | $10^{15}$ or more | G |

Silicone Adhesive Composition I-β

In Comparative Examples 98(I) to 108(I), the lithium salt was substituted for component (C). The results are as shown in Table 25(I). The term "(I)" in the Comparative Example numbers is omitted in this Table.

TABLE 25(I)

|  | Component (B1) | | Lithium salt | Component (c2) | Evaluation results | | |
|---|---|---|---|---|---|---|---|
| Comparative Example | m | n | Amount, part by mass | Amount, part by mass | Amount a part by mass | Curability | Surface resistivity | Bond strength |
| Comp. Ex. 98 | 2 | 0 | 0.4 | 0.5 | 0.1 | G | Former half of the order of $10^{11}$ | NG |
| Comp. Ex. 99 | | | 0.5 | 0.5 | 0.25 | G | Latter half of the order of $10^{10}$ | NG |
| Comp. Ex. 100 | | | 0.5 | 0.05 | 0.5 | G | Latter half of the order of $10^{9}$ | NG |
| Comp. Ex. 101 | | | 0.5 | 0.01 | 0.5 | G | Latter half of the order of $10^{9}$ | NG |
| Comp. Ex. 102 | | | 1 | 0.5 | 0.5 | G | Latter half of the order of $10^{9}$ | NG |
| Comp. Ex. 103 | | | 3 | 0.5 | 1.49 | G | Former half of the order of $10^{9}$ | NG |
| Comp. Ex. 104 | | | 5 | 0.5 | 2.48 | G | Former half of the order of $10^{9}$ | NG |
| Comp. Ex. 105 | 8 | 0 | 0.5 | 0.5 | 0.08 | G | Latter half of the order of $10^{10}$ | NG |
| Comp. Ex. 106 | | | 1 | | 0.16 | G | Former half of the order of $10^{10}$ | NG |
| Comp. Ex. 107 | | | 5 | | 0.81 | G | Latter half of the order of $10^{9}$ | NG |
| Comp. Ex. 108 | | | 0.4 | | 0.49 | G | Former half of the order of $10^{11}$ | NG |

Silicone Adhesive Composition I-β

In Comparative Examples 109(I) and 110(I), comparative polyoxyalkylene compound (1) with m=0 and n=12 was used. In Comparative Examples 111(I) and 112(I), comparative polyoxyalkylene compound (1) with m=22 and n=0 was used. The results are as shown in Table 26(I). The term "(I)" in the Comparative Example numbers is omitted in this Table.

TABLE 26(I)

| Comparative Example | Polyoxyalkylene compound (1) m | Polyoxyalkylene compound (1) n | Polyoxyalkylene compound (1) Amount, part by mass | Component (C) Type | Component (C) Amount, part by mass | Component (c2) Amount, part by mass | Curability | Surface resistivity | Bond strength |
|---|---|---|---|---|---|---|---|---|---|
| Comp. Ex. 109 | 0 | 12 | 1 | A | 0.5 | 0.16 | G | Former half of the order of $10^{13}$ | NG |
| Comp. Ex. 110 | | | 3 | | | 0.49 | NG | Former half of the order of $10^{13}$ | — |
| Comp. Ex. 111 | 22 | 0 | 1 | | | 0.12 | G | Former half of the order of $10^{12}$ | NG |
| Comp. Ex. 112 | | | 3 | | | 0.37 | NG | Latter half of the order of $10^{11}$ | — |

Silicone Adhesive Composition I-β

In Comparative Examples 113(I) to 118(I), comparative polyoxyalkylene compound (a) or (b) having one unsaturated hydrocarbon group and one polyoxyalkylene residue in one molecule was used. The results are as shown in Table 27(I). The term "(I)" in the Comparative Example numbers is omitted in this Table.

TABLE 27(I)

| Comparative Example | Polyoxyalkylene compound Type | Polyoxyalkylene compound Amount, part by mass | Component (C) Type | Component (C) Amount, part by mass | Component (c2) Amount, part by mass | Curability | Surface resistivity | Bond strength |
|---|---|---|---|---|---|---|---|---|
| Comp. Ex. 113 | (a) | 0.5 | A | 0.5 | 0.14 | G | Latter half of the order of $10^{12}$ | NG |
| Comp. Ex. 114 | | 1 | A | 0.5 | 0.27 | G | Former half of the order of $10^{9}$ | NG |
| Comp. Ex. 115 | | 3 | A | 0.5 | 0.82 | G | Former half of the order of $10^{9}$ | NG |
| Comp. Ex. 116 | (b) | 0.5 | A | 0.5 | 0.13 | G | Latter half of the order of $10^{12}$ | NG |
| Comp. Ex. 117 | | 1 | A | 0.5 | 0.26 | G | Former half of the order of $10^{9}$ | NG |
| Comp. Ex. 118 | | 3 | A | 0.5 | 0.78 | G | Former half of the order of $10^{9}$ | NG |

Silicone Adhesive Composition I-β

In Comparative Examples 119(I) to 124(I), comparative polyoxyalkylene compound (c) or (d) having one polyoxyalkylene residue in one molecule was used. The results are as shown in Table 28(I). The term "(I)" in the Comparative Example numbers is omitted in this Table.

TABLE 28(I)

| Comparative Example | Polyoxyalkylene compound Type | Polyoxyalkylene compound Amount, part by mass | Component (C) Type | Component (C) Amount, part by mass | Component (c2) Amount, part by mass | Curability | Surface resistivity | Bond strength |
|---|---|---|---|---|---|---|---|---|
| Comp. Ex. 119 | (c) | 0.5 | A | 0.5 | 0.25 | G | Latter half of the order of $10^{13}$ | G |
| Comp. Ex. 120 | | 1 | | | 0.49 | G | Former half of the order of $10^{13}$ | G |
| Comp. Ex. 121 | | 5 | | | 2.47 | NG | Latter half of the order of $10^{12}$ | — |
| Comp. Ex. 122 | (d) | 0.5 | | | 0.13 | G | Latter half of the order of $10^{13}$ | G |
| Comp. Ex. 123 | | 1 | | | 0.27 | G | Former half of the order of $10^{13}$ | G |
| Comp. Ex. 124 | | 5 | | | 1.34 | NG | Latter half of the order of $10^{12}$ | — |

Silicone Adhesive Composition I-α

In Comparative Examples 125(I) to 132(I), comparative polyoxyalkylene compound (e) having two polyoxyalkylene residues and no unsaturated hydrocarbon group in one molecule was used to obtain silicone adhesive compositions α. The results are as shown in Table 29(I). The term "(I)" in the Comparative Example numbers is omitted in this Table.

TABLE 29(I)

| Comparative Example | Polyoxyalkylene compound Type | Amount, part by mass | Component (C) Type | Amount, part by mass | Component (c2) Amount, part by mass | Evaluation results Curability | Surface resistivity | Bond strength |
|---|---|---|---|---|---|---|---|---|
| Comp. Ex. 125 | (e) | 0.5 | A | 0.5 | 0 | NG | Latter half of the order of $10^{11}$ | — |
| Comp. Ex. 126 | | 1 | | | 0 | NG | Latter half of the order of $10^{10}$ | — |
| Comp. Ex. 127 | | 3 | | | 0 | NG | Former half of the order of $10^{10}$ | — |
| Comp. Ex. 128 | | 5 | | | 0 | NG | Former half of the order of $10^{10}$ | — |
| Comp. Ex. 129 | | 0.5 | A | 0.5 | 0.25 | NG | Latter half of the order of $10^{11}$ | — |
| Comp. Ex. 130 | | 1 | | | 0.5 | NG | Latter half of the order of $10^{10}$ | — |
| Comp. Ex. 131 | | 3 | | | 1.49 | NG | Former half of the order of $10^{10}$ | — |
| Comp. Ex. 132 | | 5 | | | 2.48 | NG | Former half of the order of $10^{10}$ | — |

Silicone Adhesive Composition I-β

In Comparative Examples 133(I) to 140(I), comparative polyoxyalkylene compound (e) having two polyoxyalkylene residues and no unsaturated hydrocarbon group in one molecule was used to obtain silicone adhesive compositions β. The results are as shown in Table 30(I). The term "(I)" in the Comparative Example numbers is omitted in this Table.

TABLE 30(I)

| Comparative Example | Polyoxyalkylene compound Type | Amount, part by mass | Component (C) Type | Amount, part by mass | Component (c2) Amount, part by mass | Evaluation results Curability | Surface resistivity | Bond strength |
|---|---|---|---|---|---|---|---|---|
| Comp. Ex. 133 | (e) | 0.5 | A | 0.5 | 0 | NG | Latter half of the order of $10^{13}$ | — |
| Comp. Ex. 134 | | 1 | | | 0 | NG | Former half of the order of $10^{13}$ | — |
| Comp. Ex. 135 | | 3 | | | 0 | NG | Latter half of the order of $10^{12}$ | — |
| Comp. Ex. 136 | | 5 | | | 0 | NG | Latter half of the order of $10^{13}$ | — |
| Comp. Ex. 137 | | 0.5 | A | 0.5 | 0.25 | NG | Latter half of the order of $10^{13}$ | — |
| Comp. Ex. 138 | | 1 | | | 0.5 | NG | Former half of the order of $10^{13}$ | — |
| Comp. Ex. 139 | | 3 | | | 1.49 | NG | Latter half of the order of $10^{12}$ | — |
| Comp. Ex. 140 | | 5 | | | 2.48 | NG | Latter half of the order of $10^{13}$ | — |

As shown in Tables 11(I) and 25(I), the silicone adhesive compositions comprising the lithium salt had the poor strengths of bond to the sheet substrate and, therefore, caused residual adhesives on the sheet-stuck body. In contrast, the present adhesive compositions comprising the ioninc liquid and the oxyalkylene compound had the good strengths of bond to the sheet substrate and, therefore, caused no residual adhesive on the sheet-stuck body. As shown in Tables 10(I) and 24(I), the cured products of the silicone adhesive compositions comprising neither ioninc liquid nor oxyalkylene compound had the high surface resistivities of $10^{15}$, i.e., 1E+15 Ω/sq., or more, and the cured products of the silicone adhesive compositions comprising the ionic liquid with no oxyalkylene compound had the less decreased surface resistivities of a former half of the order of $10^{13}$, i.e., 1E+13 to 5E+13 Ω/sq. In contrast, the cured, products of the present compositions comprising a combination of the oxyalkylene compound with the ionic liquid had the low surface resistivities of a former half of the order of $10^{10}$ to a latter half of the order of $10^{12}$, i.e., 1E+10 to 9.9E+12 Ω/sq., and the excellent antistatic properties, as shown in the Examples.

As shown in Tables 29(I) and 30(I), the adhesive compositions comprising the oxyalkylene compound having no unsaturated hydrocarbon group were inferior in the curability. This is because the oxyalkylene compound has poor compatibility with the compositions. As shown in Tables 13(I) and 27(I), the cured products of the compositions comprising the oxyalkylene compound having one polyoxyalkylene residue and one unsaturated hydrocarbon group had the poor strengths of bond to the sheet substrate, though they had the low surface resistivities. As shown in Tables 14(I) and 28(I), the cured products of the adhesive compositions comprising the oxyalkylene compound having one polyoxyalkylene residue and two unsaturated hydrocarbon groups had the high surface resistivities, though they had the good strengths of bond to the sheet substrate. In contrast, the present adhesive compositions comprising the oxyalkylene compound had the good strengths of bond to the sheet substrate and the low surface resistivities. Thus, it is important for the oxyalkylene compound to have two polyoxyalkylene residues and two unsaturated hydrocarbon groups, in order to provide an adhesive layer which is excellent in an antistatic property and a strength of bond to a sheet substrate.

Part II: Second Embodiment

The Examples and the Comparative Examples for the second embodiment are described in Part II. Components used in the Examples and the Comparative Examples are as follows. The viscosity was hereinafter determined at 25 degrees C. with a Brookfield rotary viscometer of the BM type.

(A) Addition Reaction-Curable Silicone
  Polysiloxane (a1): vinyl group-containing polydimethylsiloxane with the molecular chain terminals each capped with a dimethylvinylsilyl (SiMe$_2$Vi) group, having a viscosity of 27000 mPa·s in a 30% solution in toluene and a vinyl group content of 0.075 mole %

Polysiloxane (a2): vinyl group-containing polydimethylsiloxane with the molecular chain terminals each capped with a dimethylvinylsilyl (SiMe$_2$Vi) group, having a viscosity of 27000 mPa·s in a 30% solution in toluene and a vinyl group content of 0.15 mole %

Polysiloxane (b): a 60% solution of polysilosane composed of Me$_3$SiO$_{0.5}$ units and SiO$_2$ units (Me$_3$SiO$_{0.5}$ units/SiO$_2$ units=0.82), in toluene Polysiloxane (c1): organohydrogenpolysiloxane represented by the following formula:

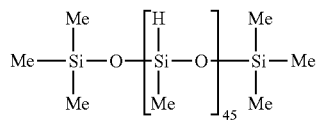

Polysiloxane (c2): organohydrogenpolysiloxane represented by the following formula:

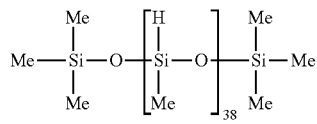

Component (B): polyoxyalkylene represented by the following formulas:

(B-1): polyoxyalkylene having one unsaturated hydrocarbon group and represented by the following formula (a) or (b):

$$CH_2=CH-CH_2-O-(C_2H_4O)_m-(C_3H_6O)_n-H \quad (a)$$

wherein m and n are a combination of (m,n)=(8,0), (16,0), (0,10) or (12,2). The combination of m and n in the polyoxyalkylene used in the Examples and the Comparative Examples is as shown in the following Tables.

$$CH_2=CH-CH_2-O-(C_2H_4O)_m-(C_3H_6O)_n-CH_3 \quad (b)$$

wherein m and n is (m,n)=(6,0).

(B-2): polyoxyalkylene having two unsaturated hydrocarbon groups and represented by the following formula (c):

$$CH_2=CH-CH_2-O-(C_2H_4O)_m-(C_3H_6O)_n-$$
$$CH_2-CH=CH_2 \quad (c)$$

wherein m and n are a combination of (m,n)=(8,0), (16,0), (0,10) or (12,2). The combination of m and n in the polyoxyalkylene used in the Examples and the Comparative Examples is as shown in the following Tables.

(B-3): polyoxyalkylene represented by the following formula:

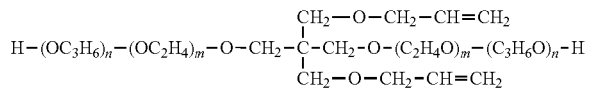

wherein m and n are a combination of (m/n)=(2,0), (10,0) or (20,0). The combination of m and n in component (B) used in the Examples and the Comparative Examples is as shown in the following Tables.

Component (C):
Ionic liquid A: trimethylpropylammonium bis(trifluoromethanesulfonyl)imide
Ionic liquid B: butyltrimethylammonium bis(trifluoromethyl sulfonyl)imide
Ionic liquid C: ethyldimethylpropylammonium bis(trifluoromethylsulfonyl)imide Catalyst:
Platinum catalyst A: a solution of chloroplatinic acid in 1-butanol
Platinum catalyst B: a solution of chloroplatinic acid in 2-ethylhexyl alcohol
Comparative catalyst C: a reaction product (complex) of chloroplatinic acid with a vinyl group-containing siloxane Preparation Example II-1

Preparation of Silicone Adhesive Composition (II-α)

Forty parts by mass of polysiloxane (a1), 83.3 parts by mass of polysiloxane (b), 0.4 part by mass of polysiloxane (c1) and 33.3 parts by mass of toluene were mixed to obtain a solution, to which 0.2 part by mass of 1-ethynylcyclohexanol was added and mixed to obtain a mixture having a siloxane content of approximately 60% by mass at a ratio of the number of the SiH groups in component (c1) to the number of the alkenyl groups in component (a2) of 15. To 100 parts by mass of the mixture, the (poly)oxyalkylene shown in the following Tables, ionic liquid (C) shown in the Tables, and polysiloxane (c2) were added in the amounts in part by mass shown in the Tables, and then stirred to obtain a homogeneous mixture. To 100 parts by mass of the mixture, 50 parts by mass of toluene were added, and then mixed to prepare a mixture having a siloxane content of approximately 40% by mass. The catalyst shown in the Tables was added so that the mass of platinum atoms was 250 ppm relative to a total mass of components (a) and (b), and then stirred enough to obtain a silicone adhesive composition (II-α). It is noted that the amount of polysiloxane (c2) was such that a ratio of the number of the SiH groups in polysiloxane (c2) to the number of the alkenyl groups in component (B) was 1.

Preparation Example II-2

Preparation of Silicone Adhesive Composition (II-β)

Ninety five parts by mass of polysiloxane (a2), 8.3 parts by mass of polysiloxane (b), 0.6 part by mass of polysiloxane (c1) and 33.3 parts by mass of toluene were mixed to obtain a solution, to which 0.2 part by mass of 1-ethynylcyclohexanol was added to obtain a mixture having a siloxane content of approximately 60% by mass at a ratio of the number of the SiH groups in component (c1) to the number of the alkenyl groups in component (a2) of 5. To 100 parts by mass of the mixture, the (poly)oxylalkylene shown in the following Tables, ionic liquid (C) shown in the Tables, and polysiloxane (c2) were added in the amounts in part by mass shown in the Tables, and then stirred to obtain a homogeneous mixture. To 100 parts by mass of the mixture, 50 parts by mass of toluene were added, and then mixed to prepare a mixture having a siloxane content of approximately 40% by mass. The catalyst shown in the Tables was added so that the mass of platinum atoms was 250 ppm relative to a total mass of components (a) and (b), and then stirred enough to obtain a silicone adhesive composition (II-β). It is noted that the amount of polysiloxane (c2) was such that a ratio of the number of the SiH groups in polysiloxane (c2) to the number of the alkenyl groups in component (B) was 1.

The silicone adhesive compositions obtained above were subjected to the following tests.

Curability

The silicone adhesive composition was applied on a polyimide film having a dimension of 110 mm×110 mm and a thickness of 25 μm with an applicator so as to provide a coating having a thickness of 30 μm and, then, heated at 130 degrees C. to prepare an adhesive sheet. The heating time was 1 minute, 3 minutes or 5 minutes. Each of the adhesive sheet was put on a surface of stainless steel of SUS304 polished with grade #280 sandpaper and, then, pressed by one cycle of going and returning of a 2 kg roller. Then, the adhesive sheet was peeled from the stainless steel surface to evaluate curability. In a case where no adhesive remained on the stainless steel surface, curing proceeded sufficiently and no adhesive transferred to the substrate. Curability was evaluated as G. Meanwhile in a case where some adhesive remained on the stainless steel surface, curing did not sufficiently proceed and some adhesive transferred to the substrate. Curability was evaluated as NG. Also in a case where curing was not completed even after heating for 5 minutes, curability was evaluated as NG.

Surface Resistivity

The silicone adhesive composition was applied on a polyimide film having a dimension of 110 mm×110 mm and a thickness of 25 μm with an applicator so as to provide a coating having a thickness of 30 μm and, then, heated at 130 degrees C. for 2 minutes to be cured, to thereby prepare an adhesive sheet. The surface resistivity of the adhesive sheet was determined in the same manner as in Part I. The results are shown in the following Tables in the same manner as in Part I.

The evaluation results of the various silicone adhesive compositions (II-α) are as shown in the following Tables 1(II) to 15(II) and 30(II) to 32(II). The evaluation results of the various silicone adhesive compositions (II-β) are as shown in the following Tables 16(II) to 29(II).

Silicone Adhesive Composition II-α

The following Tables 1(II) to 10(II) show the cases where polyoxyalkylene (B-1) having one unsaturated hydrocarbon group was used. In Examples 1(II) to 4(II) and Comparative Examples 1(II) and 2(II), polyoxyalkylene (a) with m=8 and n=0, ioninc liquid A and catalyst A were used in the various amounts of the polyoxyalkylene. In Examples 5(II) to 8(II) and Comparative Examples 3(II) and 4(II), polyoxyalkylene (a) with m=16 and n=0, ioninc liquid A and catalyst A were used in the various amounts of the polyoxyalkylene. The results are as shown in Table 1(II). The term "(II)" in the Example and Comparative Example numbers is omitted in this Table.

TABLE 1(II)

| Example | Comparative Example | Catalyst | Component (B-1) m | n | Amount, part by mass | Component (C) Type | Amount, part by mass | Component (c2) Amount, part by mass | Curability, Heating time, minute 1 | 3 | 5 | Surface resistivity |
|---|---|---|---|---|---|---|---|---|---|---|---|---|
| | Comp. Ex. 1 | A | 8 | 0 | 0.4 | A | 0.5 | 0.06 | G | G | G | Former half of the order of $10^{13}$ |
| Ex. 1 | | | | | 0.5 | | | 0.08 | G | G | G | Latter half of the order of $10^{12}$ |
| Ex. 2 | | | | | 1 | | | 0.16 | G | G | G | Former half of the order of $10^9$ |
| Ex. 3 | | | | | 3 | | | 0.47 | G | G | G | Former half of the order of $10^9$ |
| Ex. 4 | | | | | 5 | | | 0.78 | G | G | G | Former half of the order of $10^9$ |
| | Comp. Ex. 2 | | | | 6 | | | 0.94 | NG | NG | G | Former half of the order of $10^9$ |
| | Comp. Ex. 3 | | 16 | 0 | 0.4 | | | 0.03 | G | G | G | Former half of the order of $10^{13}$ |
| Ex. 5 | | | | | 0.5 | | | 0.04 | G | G | G | Latter half of the order of $10^{10}$ |
| Ex. 6 | | | | | 1 | | | 0.08 | G | G | G | Latter half of the order of $10^9$ |
| Ex. 7 | | | | | 3 | | | 0.25 | G | G | G | Latter half of the order of $10^9$ |
| Ex. 8 | | | | | 5 | | | 0.42 | G | G | G | Latter half of the order of $10^9$ |
| | Comp. Ex. 4 | | | | 6 | | | 0.5 | NG | NG | G | Latter half of the order of $10^9$ |

Silicone Adhesive Composition II-α

In Examples 9(II) to 12(II) and Comparative Examples 5(II) and 6(II), polyoxyalkylene (a) with m=0 and n=10, ioninc liquid A and catalyst A were used in the various amounts of the polyoxyalkylene. In Examples 13(II) to 16(II) and Comparative Examples 7(II) and 8(II), polyoxyalkylene (a) with m=12 and n=2, ioninc liquid A and catalyst A were used in the various amounts of the polyoxyalkylene. The results are as shown in Table 2(II). The term "(II)" in the Example and Comparative Example numbers is omitted in this Table.

TABLE 2(II)

| Example | Comparative Example | Catalyst | Component (B-1) m | n | Amount, part by mass | Component (C) Type | Amount, part by mass | Component (c2) Amount, part by mass | Curability, Heating time, minute 1 | 3 | 5 | Evaluation results Surface resistivity |
|---|---|---|---|---|---|---|---|---|---|---|---|---|
|  | Comp. Ex. 5 | A | 0 | 10 | 0.4 | A | 0.5 | 0.04 | G | G | G | Former half of the order of $10^{13}$ |
| Ex. 9 |  |  |  |  | 0.5 |  |  | 0.05 | G | G | G | Latter half of the order of $10^9$ |
| Ex. 10 |  |  |  |  | 1 |  |  | 0.1 | G | G | G | Latter half of the order of $10^9$ |
| Ex. 11 |  |  |  |  | 3 |  |  | 0.3 | G | G | G | Latter half of the order of $10^9$ |
| Ex. 12 |  |  |  |  | 5 |  |  | 0.5 | G | G | G | Latter half of the order of $10^9$ |
|  | Comp. Ex. 6 |  |  |  | 6 |  |  | 0.6 | NG | NG | G | Latter half of the order of $10^9$ |
|  | Comp. Ex. 7 |  | 12 | 2 | 0.4 |  |  | 0.04 | G | G | G | Former half of the order of $10^{13}$ |
| Ex. 13 |  |  |  |  | 0.5 |  |  | 0.05 | G | G | G | Former half of the order of $10^{10}$ |
| Ex. 14 |  |  |  |  | 1 |  |  | 0.09 | G | G | G | Former half of the order of $10^{10}$ |
| Ex. 15 |  |  |  |  | 3 |  |  | 0.27 | G | G | G | Former half of the order of $10^{10}$ |
| Ex. 16 |  |  |  |  | 5 |  |  | 0.46 | G | G | G | Former half of the order of $10^{10}$ |
|  | Comp. Ex. 8 |  |  |  | 6 |  |  | 0.55 | NG | NG | G | Former half of the order of $10^{10}$ |

Silicone Adhesive Composition II-α

In Examples 17(II) to 20(II) and Comparative Examples 9(II) and 10(II), polyoxyalkylene (b) with m=6 and n=0, ioninc liquid A and catalyst A were used in the various amounts of the polyoxyalkylene. The results are as shown in Table 3(II). The term "(II)" in the Example and Comparative Example numbers is omitted in this Table.

TABLE 3(II)

| Example | Comparative Example | Catalyst | Component (B-1) m | n | Amount, part by mass | Component (C) Type | Amount, part by mass | Component (c2) Amount, part by mass | Curability, Heating time, minute 1 | 3 | 5 | Evaluation results Surface resistivity |
|---|---|---|---|---|---|---|---|---|---|---|---|---|
|  | Comp. Ex. 9 | A | 6 | 0 | 0.4 | A | 0.5 | 0.08 | G | G | G | Former half of the order of $10^{13}$ |
| Ex. 17 |  |  |  |  | 0.5 |  |  | 0.1 | G | G | G | Former half of the order of $10^{10}$ |
| Ex. 18 |  |  |  |  | 1 |  |  | 0.19 | G | G | G | Former half of the order of $10^{10}$ |
| Ex. 19 |  |  |  |  | 3 |  |  | 0.58 | G | G | G | Former half of the order of $10^{10}$ |
| Ex. 20 |  |  |  |  | 5 |  |  | 0.96 | G | G | G | Former half of the order of $10^{10}$ |
|  | Comp. Ex. 10 |  |  |  | 6 |  |  | 1.15 | NG | NG | G | Former half of the order of $10^{10}$ |

Silicone Adhesive Composition II-α

In Comparative Examples 11(II) to 25(II), ioninc liquid A and comparative catalyst C were used together with component (B-1) shown in the following Table in the various amounts. As component (B-1), compound (a) was used in Comparative Examples 11(II) to 21(II), and compound (b) was used in Comparative Examples 22(II) to 25(II). The results are as shown in Table 4(II). The term "(II)" in the Comparative Example numbers is omitted in this Table.

TABLE 4(II)

| Comparative Example | Catalyst | Component (B-1) m | n | Amount, part by mass | Component (C) Type | Amount, part by mass | Component (c2) Amount, part by mass | Curability, Heating time, minute 1 | 3 | 5 | Surface resistivity |
|---|---|---|---|---|---|---|---|---|---|---|---|
| Comp. Ex. 11 | C | 8 | 0 | 0.5 | A | 0.5 | 0.08 | NG | NG | G | Latter half of the order of $10^{12}$ |
| Comp. Ex. 12 | | 8 | 0 | 1 | | | 0.16 | NG | NG | G | Former half of the order of $10^9$ |
| Comp. Ex. 13 | | 8 | 0 | 3 | | | 0.47 | NG | NG | NG | Former half of the order of $10^9$ |
| Comp. Ex. 14 | | 16 | 0 | 0.5 | | | 0.04 | NG | NG | G | Latter half of the order of $10^{10}$ |
| Comp. Ex. 15 | | 16 | 0 | 1 | | | 0.08 | NG | NG | G | Latter half of the order of $10^9$ |
| Comp. Ex. 16 | | 16 | 0 | 3 | | | 0.25 | NG | NG | NG | Latter half of the order of $10^9$ |
| Comp. Ex. 17 | | 0 | 10 | 0.5 | | | 0.05 | NG | NG | G | Latter half of the order of $10^9$ |
| Comp. Ex. 18 | | 0 | 10 | 1 | | | 0.1 | NG | NG | G | Latter half of the order of $10^9$ |
| Comp. Ex. 19 | | 12 | 2 | 0.5 | | | 0.05 | NG | NG | G | Former half of the order of $10^{10}$ |
| Comp. Ex. 20 | | 12 | 2 | 1 | | | 0.09 | NG | NG | G | Former half of the order of $10^{10}$ |
| Comp. Ex. 21 | | 12 | 2 | 3 | | | 0.27 | NG | NG | NG | Former half of the order of $10^{10}$ |
| Comp. Ex. 22 | | 6 | 0 | 0.5 | | | 0.1 | NG | NG | G | Former half of the order of $10^{10}$ |
| Comp. Ex. 23 | | 6 | 0 | 1 | | | 0.19 | NG | NG | G | Former half of the order of $10^{10}$ |
| Comp. Ex. 24 | | 6 | 0 | 3 | | | 0.58 | NG | NG | NG | Former half of the order of $10^{10}$ |
| Comp. Ex. 25 | | 6 | 0 | 5 | | | 0.96 | NG | NG | NG | Former half of the order of $10^{10}$ |

Silicone Adhesive Composition II-α

In Examples 21(II) to 32(II) and Comparative Examples 26(II) and 27(II), ioninc liquid B or C in an amount of 0.5 part by mass and catalyst A were used together with component (B-1) shown in the following Table in the various amounts. The results are as shown in Table 5(II). The term "(II)" in the Example and Comparative Example numbers is omitted in this Table.

TABLE 5(II)

| Example | Comparative Example | Catalyst | Component (B-1) m | n | Amount, part by mass | Component (C) Type | Amount, part by mass | Component (c2) Amount, part by mass | Curability, Heating time, minute 1 | 3 | 5 | Surface resistivity |
|---|---|---|---|---|---|---|---|---|---|---|---|---|
| | Comp. Ex. 26 | A | 8 | 0 | 0.4 | B | 0.5 | 0.06 | G | G | G | Former half of the order of $10^{13}$ |
| Ex. 21 | | | 8 | 0 | 0.5 | | | 0.08 | G | G | G | Latter half of the order of $10^{12}$ |
| Ex. 22 | | | 8 | 0 | 1 | | | 0.16 | G | G | G | Former half of the order of $10^9$ |
| Ex. 23 | | | 8 | 0 | 3 | | | 0.47 | G | G | G | Former half of the order of $10^9$ |
| Ex. 24 | | | 8 | 0 | 5 | | | 0.78 | NG | G | G | Former half of the order of $10^9$ |
| | Comp. Ex. 27 | | 8 | 0 | 6 | | | 0.94 | NG | NG | NG | Former half of the order of $10^9$ |
| Ex. 25 | | | 16 | 0 | 0.5 | | | 0.04 | G | G | G | Latter half of the order of $10^9$ |
| Ex. 26 | | | 16 | 0 | 5 | | | 0.42 | NG | G | G | Latter half of the order of $10^9$ |
| Ex. 27 | | | 8 | 0 | 0.5 | C | | 0.08 | G | G | G | Latter half of the order of $10^{12}$ |
| Ex. 28 | | | 8 | 0 | 1 | | | 0.16 | G | G | G | Former half of the order of $10^9$ |
| Ex. 29 | | | 8 | 0 | 3 | | | 0.47 | G | G | G | Former half of the order of $10^9$ |
| Ex. 30 | | | 8 | 0 | 5 | | | 0.78 | NG | G | G | Former half of the order of $10^9$ |
| Ex. 31 | | | 16 | 0 | 0.5 | | | 0.04 | G | G | G | Latter half of the order of $10^9$ |
| Ex. 32 | | | 16 | 0 | 5 | | | 0.42 | NG | G | G | Latter half of the order of $10^9$ |

Silicone Adhesive Composition II-α

In Comparative Examples 28(II) to 39(II), catalyst C was substituted for catalyst A in Examples 21(II) to 32(II). The results are as shown in Table 6(II). The term "(II)" in the Comparative Example numbers is omitted in this Table.

TABLE 6(II)

| Comparative Example | Catalyst | Component (B-1) m | n | Amount, part by mass | Component (C) Type | Amount, part by mass | Component (c2) Amount, part by mass | Curability, Heating time, minute 1 | 3 | 5 | Surface resistivity |
|---|---|---|---|---|---|---|---|---|---|---|---|
| Comp. Ex. 28 | C | 8 | 0 | 0.5 | B | 0.5 | 0.08 | NG | NG | G | Latter half of the order of $10^{12}$ |
| Comp. Ex. 29 | | 8 | 0 | 1 | | | 0.16 | NG | NG | G | Former half of the order of $10^9$ |
| Comp. Ex. 30 | | 8 | 0 | 3 | | | 0.47 | NG | NG | NG | Former half of the order of $10^9$ |
| Comp. Ex. 31 | | 8 | 0 | 5 | | | 0.78 | NG | NG | NG | Former half of the order of $10^9$ |
| Comp. Ex. 32 | | 16 | 0 | 0.5 | | | 0.04 | NG | NG | G | Latter half of the order of $10^9$ |
| Comp. Ex. 33 | | 16 | 0 | 5 | | | 0.42 | NG | NG | NG | Latter half of the order of $10^9$ |
| Comp. Ex. 34 | | 8 | 0 | 0.5 | C | | 0.08 | NG | NG | G | Latter half of the order of $10^{12}$ |
| Comp. Ex. 35 | | 8 | 0 | 1 | | | 0.16 | NG | NG | G | Former half of the order of $10^9$ |
| Comp. Ex. 36 | | 8 | 0 | 3 | | | 0.47 | NG | NG | NG | Former half of the order of $10^9$ |
| Comp. Ex. 37 | | 16 | 0 | 0.5 | | | 0.04 | NG | NG | G | Latter half of the order of $10^9$ |
| Comp. Ex. 38 | | 16 | 0 | 1 | | | 0.08 | NG | NG | G | Latter half of the order of $10^9$ |
| Comp. Ex. 39 | | 16 | 0 | 3 | | | 0.25 | NG | NG | NG | Latter half of the order of $10^9$ |

Silicone Adhesive Composition II-α

In Examples 33(II) to 40(II), ioninc liquid A was used in an amount of 0.01 part by mass or 2 parts by mass. The results are as shown in Table 7(II). The term "(II)" in the Example numbers is omitted in this Table.

TABLE 7(II)

| Example | Catalyst | Component (B-1) m | n | Amount, part by mass | Component (C) Type | Amount, part by mass | Component (c2) Amount, part by mass | Curability, Heating time, minute 1 | 3 | 5 | Surface resistivity |
|---|---|---|---|---|---|---|---|---|---|---|---|
| Ex. 33 | A | 8 | 0 | 0.5 | A | 0.01 | 0.08 | G | G | G | Latter half of the order of $10^{12}$ |
| Ex. 34 | | 8 | 0 | 5 | | | 0.78 | G | G | G | Former half of the order of $10^{12}$ |
| Ex. 35 | | 16 | 0 | 0.5 | | | 0.04 | G | G | G | Latter half of the order of $10^{12}$ |
| Ex. 36 | | 16 | 0 | 5 | | | 0.42 | G | G | G | Latter half of the order of $10^{12}$ |
| Ex. 37 | | 8 | 0 | 0.5 | | 2 | 0.08 | G | G | G | Latter half of the order of $10^{12}$ |
| Ex. 38 | | 8 | 0 | 5 | | | 0.78 | G | G | G | Former half of the order of $10^9$ |
| Ex. 39 | | 16 | 0 | 0.5 | | | 0.04 | G | G | G | Latter half of the order of $10^9$ |
| Ex. 40 | | 16 | 0 | 5 | | | 0.42 | G | G | G | Latter half of the order of $10^9$ |

Silicone Adhesive Composition II-α

In Comparative Examples 40(II) to 45(II), ioninc liquid A was used in the amount of more than the upper limit. In Comparative Examples 46(II) to 49(II), no ionic liquid was used. The results are as shown in Table 8(II). The term "(II)" in the Comparative Example numbers is omitted in this Table.

TABLE 8(II)

| Comparative Example | Catalyst | Component (B-1) m | n | Amount, part by mass | Component (C) Type | Amount, part by mass | Component (c2) Amount, part by mass | Curability, Heating time, minute 1 | 3 | 5 | Surface resistivity |
|---|---|---|---|---|---|---|---|---|---|---|---|
| Comp. Ex. 40 | A | 8 | 0 | 0.5 | A | 3 | 0.08 | NG | G | G | Latter half of the order of $10^{12}$ |
| Comp. Ex. 41 | | 8 | 0 | 1 | | | 0.16 | NG | G | G | Former half of the order of $10^9$ |

TABLE 8(II)-continued

|  | Component (B-1) | | | Component (C) | | Component (c2) | Evaluation results | | | |
|---|---|---|---|---|---|---|---|---|---|---|
| Comparative Example | Catalyst | m | n | Amount, part by mass | Type | Amount, part by mass | Amount, part by mass | Curability, Heating time, minute | | | Surface resistivity |
| | | | | | | | | 1 | 3 | 5 | |
| Comp. Ex. 42 | | 8 | 0 | 5 | | | 0.78 | NG | G | G | Former half of the order of $10^9$ |
| Comp. Ex. 43 | | 16 | 0 | 0.5 | | | 0.04 | NG | G | G | Latter half of the order of $10^9$ |
| Comp. Ex. 44 | | 16 | 0 | 3 | | | 0.25 | NG | G | G | Latter half of the order of $10^9$ |
| Comp. Ex. 45 | | 16 | 0 | 5 | | | 0.42 | NG | G | G | Latter half of the order of $10^9$ |
| Comp. Ex. 46 | | 8 | 0 | 0.5 | | 0 | 0.08 | G | G | G | Former half of the order of $10^{14}$ |
| Comp. Ex. 47 | | 8 | 0 | 1 | | | 0.16 | G | G | G | Former half of the order of $10^{14}$ |
| Comp. Ex. 48 | | 8 | 0 | 3 | | | 0.47 | G | G | G | Former half of the order of $10^{14}$ |
| Comp. Ex. 49 | | 8 | 0 | 5 | | | 0.78 | G | G | G | Former half of the order of $10^{14}$ |

Silicone Adhesive Composition II-α

In Comparative Examples 50(II) to 57(II), comparative catalyst C was substituted for catalyst A in Examples 33(II) to 40(II). The results are as shown in Table 9(II). The term "(II)" in the Comparative Example numbers is omitted in this Table.

TABLE 9(II)

|  | Component (B-1) | | | Component (C) | | Component (c2) | Evaluation results | | | |
|---|---|---|---|---|---|---|---|---|---|---|
| Comparative Example | Catalyst | m | n | Amount, part by mass | Type | Amount, part by mass | Amount, part by mass | Curability, Heating time, minute | | | Surface resistivity |
| | | | | | | | | 1 | 3 | 5 | |
| Comp. Ex. 50 | C | 8 | 0 | 0.5 | A | 0.01 | 0.08 | NG | NG | G | Latter half of the order of $10^{12}$ |
| Comp. Ex. 51 | | 8 | 0 | 5 | | | 0.78 | NG | NG | G | Former half of the order of $10^{12}$ |
| Comp. Ex. 52 | | 16 | 0 | 0.5 | | | 0.04 | NG | NG | G | Latter half of the order of $10^{12}$ |
| Comp. Ex. 53 | | 16 | 0 | 5 | | | 0.42 | NG | NG | G | Latter half of the order of $10^{12}$ |
| Comp. Ex. 54 | | 8 | 0 | 0.5 | | 2 | 0.08 | NG | NG | G | Latter half of the order of $10^{12}$ |
| Comp. Ex. 55 | | 8 | 0 | 5 | | | 0.78 | NG | NG | G | Former half of the order of $10^9$ |
| Comp. Ex. 56 | | 16 | 0 | 0.5 | | | 0.04 | NG | NG | G | Latter half of the order of $10^9$ |
| Comp. Ex. 57 | | 16 | 0 | 5 | | | 0.42 | NG | NG | G | Latter half of the order of $10^9$ |

Silicone Adhesive Composition II-α

In Examples 41(II) to 53(II) and Comparative Examples 58(II) to 60(II), catalyst B was used. The results are as shown in Table 10(II). The term "(II)" in the Example and Comparative Example numbers is omitted in this Table.

TABLE 10(II)

| Example | Comparative Example | Catalyst | Component (B-1) | | | Component (C) | | Component (c2) | Evaluation results | | | |
|---|---|---|---|---|---|---|---|---|---|---|---|---|
| | | | m | n | Amount, part by mass | Type | Amount, part by mass | Amount, part by mass | Curability, Heating time, minute | | | Surface resistivity |
| | | | | | | | | | 1 | 3 | 5 | |
| Ex. 41 | | B | 8 | 0 | 5 | A | 0.5 | 0.78 | G | G | G | Former half of the order of $10^9$ |
| Ex. 42 | | | 0 | 10 | 5 | A | 0.5 | 0.5 | G | G | G | Latter half of the order of $10^9$ |
| Ex. 43 | | | 12 | 2 | 0.5 | A | 0.05 | 0.05 | G | G | G | Former half of the order of $10^{10}$ |
| Ex. 44 | | | 6 | 0 | 0.5 | A | 0.1 | 0.1 | G | G | G | Former half of the order of $10^{10}$ |

TABLE 10(II)-continued

| Example | Comparative Example | Catalyst | Component (B-1) m | n | Amount, part by mass | Component (C) Type | Amount, part by mass | Component (c2) Amount, part by mass | Curability, Heating time, minute 1 | 3 | 5 | Evaluation results Surface resistivity |
|---|---|---|---|---|---|---|---|---|---|---|---|---|
| Ex. 45 | | | 8 | 0 | 0.5 | B | | 0.08 | G | G | G | Latter half of the order of $10^{12}$ |
| Ex. 46 | | | 16 | 0 | 5 | B | | 0.42 | NG | G | G | Latter half of the order of $10^9$ |
| Ex. 47 | | | 8 | 0 | 5 | C | | 0.78 | NG | G | G | Former half of the order of $10^9$ |
| Ex. 48 | | | 16 | 0 | 5 | C | | 0.42 | NG | G | G | Latter half of the order of $10^9$ |
| Ex. 49 | | | 8 | 0 | 0.5 | A | 0.01 | 0.08 | G | G | G | Latter half of the order of $10^{12}$ |
| Ex. 50 | | | 16 | 0 | 0.5 | A | | 0.04 | G | G | G | Latter half of the order of $10^{12}$ |
| Ex. 51 | | | 8 | 0 | 5 | A | 2 | 0.78 | G | G | G | Former half of the order of $10^9$ |
| Ex. 52 | | | 16 | 0 | 0.5 | A | | 0.04 | G | G | G | Latter half of the order of $10^9$ |
| Ex. 53 | | | 16 | 0 | 5 | A | | 0.42 | G | G | G | Latter half of the order of $10^9$ |
| | Comp. Ex. 58 | | 8 | 0 | 0.5 | A | 3 | 0.08 | NG | NG | G | Latter half of the order of $10^{12}$ |
| | Comp. Ex. 59 | | 16 | 0 | 5 | A | | 0.42 | NG | NG | G | Latter half of the order of $10^9$ |
| | Comp. Ex. 60 | | 8 | 0 | 5 | A | 0 | 0.78 | G | G | G | Former half of the order of $10^{14}$ |

Silicone Adhesive Composition II-α

The following Tables 11(II) to 15(II) show the cases where polyoxyalkylene (B-2) having two unsaturated hydrocarbon groups was used. In Examples 54(II) to 57(II) and Comparative Examples 61(II) and 62(II), polyoxyalkylene (a) with m=8 and n=0, ioninc liquid A and catalyst A were used in the various amounts of the polyoxyalkylene. In Examples 58(II) to 61(II) and Comparative Examples 63(II) and 64(II), polyoxyalkylene (a) with m=16 and n=0, ioninc liquid A and catalyst A were used in the various amounts of the polyoxyalkylene. The results are as shown in Table 11(II). The term "(II)" in the Example and Comparative Example numbers is omitted in this Table.

TABLE 11(II)

| Example | Comparative Example | Catalyst | Component (B-2) m | n | Amount, part by mass | Component (C) Type | Amount, part by mass | Component (c2) Amount, part by mass | Curability, Heating time, minute 1 | 3 | 5 | Evaluation results Surface resistivity |
|---|---|---|---|---|---|---|---|---|---|---|---|---|
| | Comp. Ex. 61 | A | 8 | 0 | 0.4 | A | 0.5 | 0.06 | G | G | G | Former half of the order of $10^{13}$ |
| Ex. 54 | | | | | 0.5 | | | 0.07 | G | G | G | Latter half of the order of $10^{12}$ |
| Ex. 55 | | | | | 1 | | | 0.15 | G | G | G | Former half of the order of $10^9$ |
| Ex. 56 | | | | | 3 | | | 0.44 | G | G | G | Former half of the order of $10^9$ |
| Ex. 57 | | | | | 5 | | | 0.74 | G | G | G | Former half of the order of $10^9$ |
| | Comp. Ex. 62 | | | | 6 | | | 0.88 | NG | NG | G | Former half of the order of $10^9$ |
| | Comp. Ex. 63 | | 16 | 0 | 0.4 | | | 0.03 | G | G | G | Former half of the order of $10^{13}$ |
| Ex. 58 | | | | | 0.5 | | | 0.04 | G | G | G | Latter half of the order of $10^{10}$ |
| Ex. 59 | | | | | 1 | | | 0.08 | G | G | G | Latter half of the order of $10^9$ |
| Ex. 60 | | | | | 3 | | | 0.24 | G | G | G | Latter half of the order of $10^9$ |
| Ex. 61 | | | | | 5 | | | 0.41 | G | G | G | Latter half of the order of $10^9$ |
| | Comp. Ex. 64 | | | | 6 | | | 0.49 | NG | NG | G | Latter half of the order of $10^9$ |

Silicone Adhesive Composition II-α

In Examples 62(II) to 65(II) and Comparative Examples 65(II) and 66(II), polyoxyalkylene (a) with m=0 and n=10, ioninc liquid A and catalyst A were used in the various amounts of the polyoxyalkylene. In Examples 66(II) to 69(II) and Comparative Examples 67(II) and 68(II), polyoxyalkylene (a) with m=12 and n=0, ioninc liquid A and catalyst A were used in the various amounts of the polyoxyalkylene. The results are as shown in Table 12(II). The term "(II)" in the Example and Comparative Example numbers is omitted in this Table.

TABLE 12(II)

| Example | Comparative Example | Catalyst | Component (B-2) m | n | Amount, part by mass | Component (C) Type | Amount, part by mass | Component (c2) Amount, part by mass | Curability, Heating time, minute 1 | 3 | 5 | Surface resistivity |
|---|---|---|---|---|---|---|---|---|---|---|---|---|
|  | Comp. Ex. 65 | A | 0 | 10 | 0.4 | A | 0.5 | 0.04 | G | G | G | Former half of the order of $10^{13}$ |
| Ex. 62 |  |  |  |  | 0.5 |  |  | 0.05 | G | G | G | Latter half of the order of $10^9$ |
| Ex. 63 |  |  |  |  | 1 |  |  | 0.1 | G | G | G | Latter half of the order of $10^9$ |
| Ex. 64 |  |  |  |  | 3 |  |  | 0.29 | G | G | G | Latter half of the order of $10^9$ |
| Ex. 65 |  |  |  |  | 5 |  |  | 0.48 | G | G | G | Latter half of the order of $10^9$ |
|  | Comp. Ex. 66 |  |  |  | 6 |  |  | 0.58 | NG | NG | G | Latter half of the order of $10^9$ |
|  | Comp. Ex. 67 |  | 12 | 2 | 0.4 |  |  | 0.04 | G | G | G | Former half of the order of $10^{13}$ |
| Ex. 66 |  |  |  |  | 0.5 |  |  | 0.04 | G | G | G | Former half of the order of $10^{10}$ |
| Ex. 67 |  |  |  |  | 1 |  |  | 0.09 | G | G | G | Former half of the order of $10^{10}$ |
| Ex. 68 |  |  |  |  | 3 |  |  | 0.26 | G | G | G | Former half of the order of $10^{10}$ |
| Ex. 69 |  |  |  |  | 5 |  |  | 0.44 | G | G | G | Former half of the order of $10^{10}$ |
|  | Comp. Ex. 68 |  |  |  | 6 |  |  | 0.53 | NG | NG | G | Former half of the order of $10^{10}$ |

Silicone Adhesive Composition II-α

In Comparative Examples 69(II) to 82(II), ioninc liquid A and comparative catalyst C were used together with component (B-2) shown in the following Table in the various amounts. The results are as shown in Table 13(II). The term "(II)" in the Comparative Example numbers is omitted in this Table.

TABLE 13(II)

| Comparative Example | Catalyst | Component (B-2) m | n | Amount, part by mass | Component (C) Type | Amount, part by mass | Component (c2) Amount, part by mass | Curability, Heating time, minute 1 | 3 | 5 | Surface resistivity |
|---|---|---|---|---|---|---|---|---|---|---|---|
| Comp. Ex. 69 | C | 8 | 0 | 0.5 | A | 0.5 | 0.07 | NG | NG | G | Latter half of the order of $10^{13}$ |
| Comp. Ex. 70 |  | 8 | 0 | 1 | A | 0.5 | 0.15 | NG | NG | G | Former half of the order of $10^{13}$ |
| Comp. Ex. 71 |  | 8 | 0 | 3 | A | 0.5 | 0.44 | NG | NG | NG | Latter half of the order of $10^{12}$ |
| Comp. Ex. 72 |  | 8 | 0 | 5 | A | 0.5 | 0.74 | NG | NG | NG | Latter half of the order of $10^{12}$ |
| Comp. Ex. 73 |  | 8 | 0 | 6 | A | 0.5 | 0.88 | NG | NG | NG | Former half of the order of $10^{12}$ |
| Comp. Ex. 74 |  | 16 | 0 | 0.4 | A | 0.5 | 0.03 | NG | NG | G | Latter half of the order of $10^{13}$ |
| Comp. Ex. 75 |  | 16 | 0 | 0.5 | A | 0.5 | 0.04 | NG | NG | G | Former half of the order of $10^{13}$ |
| Comp. Ex. 76 |  | 16 | 0 | 1 | A | 0.5 | 0.08 | NG | NG | G | Latter half of the order of $10^{12}$ |
| Comp. Ex. 77 |  | 16 | 0 | 3 | A | 0.5 | 0.24 | NG | NG | NG | Latter half of the order of $10^{12}$ |
| Comp. Ex. 78 |  | 0 | 10 | 5 | A | 0.5 | 0.41 | NG | NG | NG | Latter half of the order of $10^{12}$ |
| Comp. Ex. 79 |  | 12 | 2 | 0.5 | A | 0.5 | 0.05 | NG | NG | G | Latter half of the order of $10^{12}$ |
| Comp. Ex. 80 |  | 12 | 2 | 1 | A | 0.5 | 0.1 | NG | NG | G | Latter half of the order of $10^{12}$ |
| Comp. Ex. 81 |  | 12 | 2 | 3 | A | 0.5 | 0.29 | NG | NG | NG | Latter half of the order of $10^{12}$ |
| Comp. Ex. 82 |  | 12 | 2 | 5 | A | 0.5 | 0.48 | NG | NG | NG | Latter half of the order of $10^{12}$ |

Silicone Adhesive Composition II-α

In Examples 70(II) to 81(II) and Comparative Examples 83(II) and 84(II), ioninc liquid B or C was used. The results are as shown in Table 14(II). The term "(II)" in the Example and Comparative Example numbers is omitted in this Table.

TABLE 14(II)

| Example | Comparative Example | Catalyst | Component (B-2) m | n | Amount, part by mass | Component (C) Type | Amount, part by mass | Component (c2) Amount, part by mass | Curability, Heating time, minute 1 | 3 | 5 | Surface resistivity |
|---|---|---|---|---|---|---|---|---|---|---|---|---|
|  | Comp. Ex. 83 | A | 8 | 0 | 0.4 | B | 0.5 | 0.06 | G | G | G | Former half of the order of $10^{13}$ |
| Ex. 70 |  |  | 8 | 0 | 0.5 |  |  | 0.07 | G | G | G | Latter half of the order of $10^{12}$ |
| Ex. 71 |  |  | 8 | 0 | 1 |  |  | 0.15 | G | G | G | Former half of the order of $10^{12}$ |

TABLE 14(II)-continued

| Example | Comparative Example | Catalyst | Component (B-2) m | n | Amount, part by mass | Component (C) Type | Amount, part by mass | (c2) Amount, part by mass | Curability, Heating time, minute 1 | 3 | 5 | Surface resistivity |
|---|---|---|---|---|---|---|---|---|---|---|---|---|
| Ex. 72 | | | 8 | 0 | 3 | | | 0.44 | G | G | G | Former half of the order of $10^{12}$ |
| Ex. 73 | | | 8 | 0 | 5 | | | 0.74 | NG | G | G | Former half of the order of $10^{12}$ |
| | Comp. Ex. 84 | | 8 | 0 | 6 | | | 0.88 | NG | NG | NG | Former half of the order of $10^{12}$ |
| Ex. 74 | | | 16 | 0 | 0.5 | | | 0.04 | G | G | G | Latter half of the order of $10^{12}$ |
| Ex. 75 | | | 16 | 0 | 5 | | | 0.41 | NG | G | G | Latter half of the order of $10^{12}$ |
| Ex. 76 | | | 8 | 0 | 0.5 | C | | 0.07 | G | G | G | Latter half of the order of $10^{12}$ |
| Ex. 77 | | | 8 | 0 | 1 | | | 0.15 | G | G | G | Former half of the order of $10^{12}$ |
| Ex. 78 | | | 8 | 0 | 3 | | | 0.44 | G | G | G | Former half of the order of $10^{12}$ |
| Ex. 79 | | | 8 | 0 | 5 | | | 0.74 | NG | G | G | Former half of the order of $10^{12}$ |
| Ex. 80 | | | 16 | 0 | 0.5 | | | 0.04 | G | G | G | Latter half of the order of $10^{12}$ |
| Ex. 81 | | | 16 | 0 | 5 | | | 0.41 | NG | G | G | Latter half of the order of $10^{12}$ |

Silicone Adhesive Composition II-α

In Comparative Examples 85(II) to 93(II), catalyst C was substituted for catalyst A in Examples 70(II) to 81(II). The results are as shown in Table 15(II). The term "(II)" in the Comparative Example numbers is omitted in this Table.

TABLE 15(II)

| Comparative Example | Catalyst | Component (B-2) m | n | Amount, part by mass | Component (C) Type | Amount, part by mass | (c2) Amount, part by mass | Curability, Heating time, minute 1 | 3 | 5 | Surface resistivity |
|---|---|---|---|---|---|---|---|---|---|---|---|
| Comp. Ex. 85 | C | 8 | 0 | 0.5 | B | 0.5 | 0.07 | NG | NG | G | Latter half of the order of $10^{13}$ |
| Comp. Ex. 86 | | 8 | 0 | 1 | | | 0.15 | NG | NG | G | Former half of the order of $10^{13}$ |
| Comp. Ex. 87 | | 8 | 0 | 3 | | | 0.44 | NG | NG | NG | Latter half of the order of $10^{12}$ |
| Comp. Ex. 88 | | 8 | 0 | 5 | | | 0.74 | NG | NG | NG | Latter half of the order of $10^{12}$ |
| Comp. Ex. 89 | | 16 | 0 | 0.5 | | | 0.04 | NG | NG | G | Former half of the order of $10^{12}$ |
| Comp. Ex. 90 | | 16 | 0 | 5 | | | 0.41 | NG | NG | NG | Latter half of the order of $10^{13}$ |
| Comp. Ex. 91 | | 8 | 0 | 0.5 | C | | 0.07 | NG | NG | G | Former half of the order of $10^{13}$ |
| Comp. Ex. 92 | | 8 | 0 | 1 | | | 0.15 | NG | NG | G | Latter half of the order of $10^{12}$ |
| Comp. Ex. 93 | | 8 | 0 | 3 | | | 0.44 | NG | NG | NG | Latter half of the order of $10^{12}$ |

Silicone Adhesive Composition II-β

The following Tables 16(II) to 24(II) show the cases where polyoxyalkylene (B-1) having one unsaturated hydrocarbon group was used. In Examples 82(II) to 85(II) and Comparative Examples 94(II) and 95(II), polyoxyalkylene (a) with m=8 and n=0, ioninc liquid A and catalyst A were used in the various amounts of the polyoxyalkylene. In Examples 86(II) to 89(II) and Comparative Examples 96(II) and 97(II), polyoxyalkylene (a) with m=16 and n=0, ioninc liquid A and catalyst A were used in the various amounts of the polyoxyalkylene. The results are as shown in Table 16(II). The term "(II)" in the Example and Comparative Example numbers is omitted in this Table.

TABLE 16(II)

| Example | Comparative Example | Catalyst | Component (B-1) m | n | Amount, part by mass | Component (C) Type | Amount, part by mass | (c2) Amount, part by mass | Curability, Heating time, minute 1 | 3 | 5 | Surface resistivity |
|---|---|---|---|---|---|---|---|---|---|---|---|---|
| | Comp. Ex. 94 | A | 8 | 0 | 0.4 | A | 0.5 | 0.06 | G | G | G | Former half of the order of $10^{13}$ |
| Ex. 82 | | | | | 0.5 | | | 0.08 | G | G | G | Latter half of the order of $10^{12}$ |
| Ex. 83 | | | | | 1 | | | 0.16 | G | G | G | Former half of the order of $10^{9}$ |
| Ex. 84 | | | | | 3 | | | 0.47 | G | G | G | Former half of the order of $10^{9}$ |
| Ex. 85 | | | | | 5 | | | 0.78 | G | G | G | Former half of the order of $10^{9}$ |
| | Comp. Ex. 95 | | | | 6 | | | 0.94 | NG | NG | G | Former half of the order of $10^{9}$ |
| | Comp. Ex. 96 | | 16 | 0 | 0.4 | | | 0.03 | G | G | G | Former half of the order of $10^{13}$ |

TABLE 16(II)-continued

| Example | Comparative Example | Catalyst | Component (B-1) m | n | Amount, part by mass | Component (C) Type | Amount, part by mass | Component (c2) Amount, part by mass | Curability, Heating time, minute 1 | 3 | 5 | Surface resistivity |
|---|---|---|---|---|---|---|---|---|---|---|---|---|
| Ex. 86 | | | | | 0.5 | | | 0.04 | G | G | G | Latter half of the order of $10^{10}$ |
| Ex. 87 | | | | | 1 | | | 0.08 | G | G | G | Latter half of the order of $10^9$ |
| Ex. 88 | | | | | 3 | | | 0.25 | G | G | G | Latter half of the order of $10^9$ |
| Ex. 89 | | | | | 5 | | | 0.42 | G | G | G | Latter half of the order of $10^9$ |
| | Comp. Ex. 97 | | | | 6 | | | 0.5 | NG | NG | G | Latter half of the order of $10^9$ |

Silicone Adhesive Composition II-β

In Examples 90(II) to 93(II) and Comparative Examples 98(II) and 99(II), polyoxyalkylene (a) with m=0 and n=10, ioninc liquid A and catalyst A were used in the various amounts of the polyoxyalkylene. In Examples 94(II) to 97(II) and Comparative Examples 100(II) and 101(II), polyoxyalkylene (a) with m=12 and n=2, ioninc liquid A and catalyst A were used in the various amounts of the polyoxyalkylene. The results are as shown in Table 17(II). The term "(II)" in the Example and Comparative Example numbers is omitted in this Table.

TABLE 17(II)

| Example | Comparative Example | Catalyst | Component (B-1) m | n | Amount, part by mass | Component (C) Type | Amount, part by mass | Component (c2) Amount, part by mass | Curability, Heating time, minute 1 | 3 | 5 | Surface resistivity |
|---|---|---|---|---|---|---|---|---|---|---|---|---|
| | Comp. Ex. 98 | A | 0 | 10 | 0.4 | A | 0.5 | 0.04 | G | G | G | Former half of the order of $10^{13}$ |
| Ex. 90 | | | | | 0.5 | | | 0.05 | G | G | G | Latter half of the order of $10^9$ |
| Ex. 91 | | | | | 1 | | | 0.1 | G | G | G | Latter half of the order of $10^9$ |
| Ex. 92 | | | | | 3 | | | 0.3 | G | G | G | Latter half of the order of $10^9$ |
| Ex. 93 | | | | | 5 | | | 0.5 | G | G | G | Latter half of the order of $10^9$ |
| | Comp. Ex. 99 | | | | 6 | | | 0.6 | NG | NG | G | Latter half of the order of $10^9$ |
| | Comp. Ex. 100 | | 12 | 9 | 0.4 | | | 0.04 | G | G | G | Former half of the order of $10^{13}$ |
| Ex. 94 | | | | | 0.5 | | | 0.05 | G | G | G | Former half of the order of $10^{10}$ |
| Ex. 95 | | | | | 1 | | | 0.09 | G | G | G | Former half of the order of $10^{10}$ |
| Ex. 96 | | | | | 3 | | | 0.27 | G | G | G | Former half of the order of $10^{10}$ |
| Ex. 97 | | | | | 5 | | | 0.46 | G | G | G | Former half of the order of $10^{10}$ |
| | Comp. Ex. 101 | | | | 6 | | | 0.55 | NG | NG | G | Former half of che order of $10^{10}$ |

Silicone Adhesive Composition II-β

In Examples 98(II) to 101(II) and Comparative Examples 102(II) and 103(II), polyoxyalkylene (b) with m=6 and n=0, ioninc liquid A and catalyst A were used in the various amounts of the polyoxyalkylene. The results are as shown in Table 18(II). The term "(II)" in the Example and Comparative Example numbers is omitted in this Table.

TABLE 18(II)

| Example | Comparative Example | Catalyst | Component (B-1) m | n | Amount, part by mass | Component (C) Type | Amount, part by mass | Component (c2) Amount, part by mass | Curability, Heating time, minute 1 | 3 | 5 | Surface resistivity |
|---|---|---|---|---|---|---|---|---|---|---|---|---|
| | Comp. Ex. 102 | A | 6 | 0 | 0.4 | A | 0.5 | 0.08 | G | G | G | Former half of the order of $10^{13}$ |
| Ex. 98 | | | | | 0.5 | | | 0.1 | G | G | G | Former half of the order of $10^{10}$ |
| Ex. 99 | | | | | 1 | | | 0.19 | G | G | G | Former half of the order of $10^{10}$ |
| Ex. 100 | | | | | 3 | | | 0.58 | G | G | G | Former half of the order of $10^{10}$ |
| Ex. 101 | | | | | 5 | | | 0.96 | G | G | G | Former half of the order of $10^{10}$ |
| | Comp. Ex. 103 | | | | 6 | | | 1.15 | NG | NG | G | Former half of the order of $10^{10}$ |

Silicone Adhesive Composition II-β

In Comparative Examples 104(II) to 118(II), ioninc liquid A and comparative catalyst C were used together with component (B-1) shown in the following Table in the various amounts. As component (B-1), compound (a) was used in Comparative Examples 104(II) to 114(II), and compound (b) was used in Comparative Examples 115(II) to 118(II). The results are as shown in Table 19(II). The term "(II)" in the Comparative Example numbers is omitted in this Table.

TABLE 19(II)

| Comparative Example | Catalyst | Component (B-1) m | Component (B-1) n | Component (B-1) Amount, part by mass | Component (C) Type | Component (C) Amount, part by mass | Component (c2) Amount, part by mass | Curability, Heating time, minute 1 | 3 | 5 | Surface resistivity |
|---|---|---|---|---|---|---|---|---|---|---|---|
| Comp. Ex. 104 | C | 8 | 0 | 0.5 | A | 0.5 | 0.08 | NG | NG | G | Latter half of the order of $10^{12}$ |
| Comp. Ex. 105 |   | 8 | 0 | 1 |   |   | 0.16 | NG | NG | G | Former half of the order of $10^9$ |
| Comp. Ex. 106 |   | 8 | 0 | 3 |   |   | 0.47 | NG | NG | NG | Former half of the order of $10^9$ |
| Comp. Ex. 107 |   | 16 | 0 | 0.5 |   |   | 0.04 | NG | NG | G | Latter half of the order of $10^{10}$ |
| Comp. Ex. 108 |   | 16 | 0 | 1 |   |   | 0.08 | NG | NG | G | Latter half of the order of $10^9$ |
| Comp. Ex. 109 |   | 16 | 0 | 3 |   |   | 0.25 | NG | NG | NG | Latter half of the order of $10^9$ |
| Comp. Ex. 110 |   | 0 | 10 | 0.5 |   |   | 0.05 | NG | NG | G | Latter half of the order of $10^9$ |
| Comp. Ex. 111 |   | 0 | 10 | 1 |   |   | 0.1 | NG | NG | G | Latter half of the order of $10^9$ |
| Comp. Ex. 112 |   | 12 | 2 | 0.5 |   |   | 0.05 | NG | NG | G | Former half of the order of $10^{10}$ |
| Comp. Ex. 113 |   | 12 | 2 | 1 |   |   | 0.09 | NG | NG | G | Former half of the order of $10^{10}$ |
| Comp. Ex. 114 |   | 12 | 2 | 3 |   |   | 0.27 | NG | NG | NG | Former half of the order of $10^{10}$ |
| Comp. Ex. 115 |   | 6 | 0 | 0.5 |   |   | 0.1 | NG | NG | G | Former half of the order of $10^{10}$ |
| Comp. Ex. 116 |   | 6 | 0 | 1 |   |   | 0.19 | NG | NG | G | Former half of the order of $10^{10}$ |
| Comp. Ex. 117 |   | 6 | 0 | 3 |   |   | 0.58 | NG | NG | NG | Former half of the order of $10^{10}$ |
| Comp. Ex. 118 |   | 6 | 0 | 5 |   |   | 0.96 | NG | NG | NG | Former half of the order of $10^{10}$ |

Silicone Adhesive Composition II-β

In Examples 102(II) to 113(II) and Comparative Examples 119(II) and 120(II), ioninc liquid B or C in an amount of 0.5 part by mass and catalyst A were used together with component (B-1) shown in the following Table in the various amounts. The results are as shown in Table 20(II). The term "(II)" in the Example and Comparative Example numbers is omitted in this Table.

TABLE 20(II)

| Example | Comparative Example | Catalyst | Component (B-1) m | Component (B-1) n | Component (B-1) Amount, part by mass | Component (C) Type | Component (C) Amount, part by mass | Component (c2) Amount, part by mass | Curability, Heating time, minute 1 | 3 | 5 | Surface resistivity |
|---|---|---|---|---|---|---|---|---|---|---|---|---|
|   | Comp. Ex. 119 | A | 8 | 0 | 0.4 | B | 0.5 | 0.06 | G | G | G | Former half of the order of $10^{13}$ |
| Ex. 102 |   |   | 8 | 0 | 0.5 |   |   | 0.08 | G | G | G | Latter half of the order of $10^{12}$ |
| Ex. 103 |   |   | 8 | 0 | 1 |   |   | 0.16 | G | G | G | Former half of the order of $10^9$ |
| Ex. 104 |   |   | 8 | 0 | 3 |   |   | 0.47 | G | G | G | Former half of the order of $10^9$ |
| Ex. 105 |   |   | 8 | 0 | 5 |   |   | 0.78 | NG | G | G | Former half of the order of $10^9$ |
|   | Comp. Ex. 120 |   | 8 | 0 | 6 |   |   | 0.94 | NG | NG | NG | Former half of the order of $10^9$ |
| Ex. 106 |   |   | 16 | 0 | 0.5 |   |   | 0.04 | G | G | G | Latter half of the order of $10^9$ |
| Ex. 107 |   |   | 16 | 0 | 5 |   |   | 0.42 | NG | G | G | Latter half of the order of $10^9$ |
| Ex. 108 |   |   | 8 | 0 | 0.5 | C |   | 0.08 | G | G | G | Latter half of the order of $10^{12}$ |
| Ex. 109 |   |   | 8 | 0 | 1 |   |   | 0.16 | G | G | G | Former half of the order of $10^9$ |
| Ex. 110 |   |   | 8 | 0 | 3 |   |   | 0.47 | G | G | G | Former half of the order of $10^9$ |
| Ex. 111 |   |   | 8 | 0 | 5 |   |   | 0.78 | NG | G | G | Former half of the order of $10^9$ |
| Ex. 112 |   |   | 16 | 0 | 0.5 |   |   | 0.04 | G | G | G | Latter half of the order of $10^9$ |
| Ex. 113 |   |   | 16 | 0 | 5 |   |   | 0.42 | NG | G | G | Latter half of the order of $10^9$ |

Silicone Adhesive Composition II-β

In Comparative Examples 121(II) to 132(II), Catalyst C was substituted for catalyst A in Examples 102(II) to 113(II). The results are as shown in Table 21(II). The term "(II)" in the Comparative Example numbers is omitted in this Table.

TABLE 21(II)

| Comparative Example | Catalyst | Component (B-1) m | n | Amount, part by mass | Component (C) Type | Amount, part by mass | Component (c2) Amount, part by mass | Curability, Heating time, minute 1 | 3 | 5 | Surface resistivity |
|---|---|---|---|---|---|---|---|---|---|---|---|
| Comp. Ex. 121 | C | 8 | 0 | 0.5 | B | 0.5 | 0.08 | NG | NG | G | Latter half of the order of $10^{12}$ |
| Comp. Ex. 122 |   | 8 | 0 | 1 |   |   | 0.16 | NG | NG | G | Former half of the order of $10^9$ |
| Comp. Ex. 123 |   | 8 | 0 | 3 |   |   | 0.47 | NG | NG | NG | Former half of the order of $10^9$ |
| Comp. Ex. 124 |   | 8 | 0 | 5 |   |   | 0.78 | NG | NG | NG | Former half of the order of $10^9$ |
| Comp. Ex. 125 |   | 16 | 0 | 0.5 |   |   | 0.04 | NG | NG | G | Latter half of the order of $10^9$ |
| Comp. Ex. 126 |   | 16 | 0 | 5 |   |   | 0.42 | NG | NG | NG | Latter half of the order of $10^9$ |
| Comp. Ex. 127 |   | 8 | 0 | 0.5 | C |   | 0.08 | NG | NG | G | Latter half of the order of $10^{12}$ |
| Comp. Ex. 128 |   | 8 | 0 | 1 |   |   | 0.16 | NG | NG | G | Former half of the order of $10^9$ |
| Comp. Ex. 129 |   | 8 | 0 | 3 |   |   | 0.47 | NG | NG | NG | Former half of the order of $10^9$ |
| Comp. Ex. 130 |   | 16 | 0 | 0.5 |   |   | 0.04 | NG | NG | G | Latter half of the order of $10^9$ |
| Comp. Ex. 131 |   | 16 | 0 | 1 |   |   | 0.08 | NG | NG | G | Latter half of the order of $10^9$ |
| Comp. Ex. 132 |   | 16 | 0 | 3 |   |   | 0.25 | NG | NG | NG | Latter half of the order of $10^9$ |

Silicone Adhesive Composition II-β

In Examples 114(II) to 121(II), ioninc liquid A was used in an amount of 0.01 part by mass or 2 parts by mass. The results are as shown in Table 22(II). The term "(II)" in the Example numbers is omitted in this Table.

TABLE 22(II)

| Example | Catalyst | Component (B-1) m | n | Amount, part by mass | Component (C) Type | Amount, part by mass | Component (c2) Amount, part by mass | Curability, Heating time, minute 1 | 3 | 5 | Surface resistivity |
|---|---|---|---|---|---|---|---|---|---|---|---|
| Ex. 114 | A | 8 | 0 | 0.5 | A | 0.01 | 0.08 | G | G | G | Latter half of the order of $10^{12}$ |
| Ex. 115 |   | 8 | 0 | 5 |   |   | 0.78 | G | G | G | Former half of the order of $10^{12}$ |
| Ex. 116 |   | 16 | 0 | 0.5 |   |   | 0.04 | G | G | G | Latter half of the order of $10^{12}$ |
| Ex. 117 |   | 16 | 0 | 5 |   |   | 0.42 | G | G | G | Latter half of the order of $10^{12}$ |
| Ex. 118 |   | 8 | 0 | 0.5 |   | 2 | 0.08 | G | G | G | Latter half of the order of $10^{12}$ |
| Ex. 119 |   | 8 | 0 | 5 |   |   | 0.78 | G | G | G | Former half of the order of $10^9$ |
| Ex. 120 |   | 16 | 0 | 0.5 |   |   | 0.04 | G | G | G | Latter half of the order of $10^9$ |
| Ex. 121 |   | 16 | 0 | 5 |   |   | 0.42 | G | G | G | Latter half of the order of $10^9$ |

Silicone Adhesive Composition II-β

In Comparative Examples 133(II) to 138(II), ioninc liquid A was used in the amount of more than the upper limit. In Comparative Examples 139(II) to 142(II), no ionic liquid was used. The results are as shown in Table 23(II). The term "(II)" in the Comparative Example numbers is omitted in this Table.

TABLE 23(II)

| Comparative Example | Catalyst | Component (B-1) m | n | Amount, part by mass | Component (C) Type | Amount, part by mass | Component (c2) Amount, part by mass | Curability, Heating time, minute 1 | 3 | 5 | Surface resistivity |
|---|---|---|---|---|---|---|---|---|---|---|---|
| Comp. Ex. 133 | A | 8 | 0 | 0.5 | A | 3 | 0.08 | NG | G | G | Latter half of the order of $10^{12}$ |
| Comp. Ex. 134 |   | 8 | 0 | 1 |   |   | 0.16 | NG | G | G | Former half of the order of $10^9$ |
| Comp. Ex. 135 |   | 8 | 0 | 5 |   |   | 0.78 | NG | G | G | Former half of the order of $10^9$ |
| Comp. Ex. 136 |   | 16 | 0 | 0.5 |   |   | 0.04 | NG | G | G | Latter half of the order of $10^9$ |
| Comp. Ex. 137 |   | 16 | 0 | 3 |   |   | 0.25 | NG | G | G | Latter half of the order of $10^9$ |
| Comp. Ex. 138 |   | 16 | 0 | 5 |   |   | 0.42 | NG | G | G | Latter half of the order of $10^9$ |
| Comp. Ex. 139 |   | 8 | 0 | 0.5 |   | 0 | 0.08 | G | G | G | Former half of the order of $10^{14}$ |
| Comp. Ex. 140 |   | 8 | 0 | 1 |   |   | 0.16 | G | G | G | Former half of the order of $10^{14}$ |
| Comp. Ex. 141 |   | 8 | 0 | 3 |   |   | 0.47 | G | G | G | Former half of the order of $10^{14}$ |
| Comp. Ex. 142 |   | 8 | 0 | 5 |   |   | 0.78 | G | G | G | Former half of the order of $10^{14}$ |

Silicone Adhesive Composition II-β

In Comparative Examples 143(II) to 150(II), catalyst C was substituted for catalyst A in Examples 114(I) to 121(II). The results are as shown in Table 24(II). The term "(II)" in the Comparative Example numbers is omitted in this Table.

TABLE 24(II)

| Comparative Example | Catalyst | Component (B-1) | | | Component (C) | | Component (c2) | Evaluation results | | | |
|---|---|---|---|---|---|---|---|---|---|---|---|
| | | m | n | Amount, part by mass | Type | Amount, part by mass | Amount, part by mass | Curability, Heating time, minute | | | |
| | | | | | | | | 1 | 3 | 5 | Surface resistivity |
| Comp. Ex. 143 | C | 8 | 0 | 0.5 | A | 0.01 | 0.08 | NG | NG | G | Latter half of the order of $10^{12}$ |
| Comp. Ex. 144 | | 8 | 0 | 5 | | | 0.78 | NG | NG | G | Former half of the order of $10^{12}$ |
| Comp. Ex. 145 | | 16 | 0 | 0.5 | | | 0.04 | NG | NG | G | Latter half of the order of $10^{12}$ |
| Comp. Ex. 146 | | 16 | 0 | 5 | | | 0.42 | NG | NG | G | Latter half of the order of $10^{12}$ |
| Comp. Ex. 147 | | 8 | 0 | 0.5 | | 2 | 0.08 | NG | NG | G | Latter half of the order of $10^{12}$ |
| Comp. Ex. 148 | | 8 | 0 | 5 | | | 0.78 | NG | NG | G | Former half of the order of $10^{9}$ |
| Comp. Ex. 149 | | 16 | 0 | 0.5 | | | 0.04 | NG | NG | G | Latter half of the order of $10^{9}$ |
| Comp. Ex. 150 | | 16 | 0 | 5 | | | 0.42 | NG | NG | G | Latter half of the order of $10^{9}$ |

Silicone Adhesive Composition II-β

The following Tables 25(II) to 29(II) show the cases where polyoxyalkylene (B-2) having two unsaturated hydrocarbon groups was used. In Examples 122(II) to 125(II) and Comparative Examples 151(II) and 152(II), polyoxyalkylene (a) with m=8 and n=0, ioninc liquid A and catalyst A were used in the various amounts of the polyoxyalkylene. In Examples 126(II) to 129(II) and Comparative Examples 153(II) and 154(II), polyoxyalkylene (a) with m=16 and n=0, ioninc liquid A and catalyst A were used in the various amounts of the polyoxyalkylene. The results are as shown in Table 25(II). The term "(II)" in the Example and Comparative Example numbers is omitted in this Table.

TABLE 25(II)

| Example | Comparative Example | Catalyst | Component (B-2) | | | Component (C) | | Component (c2) | Evaluation results | | | |
|---|---|---|---|---|---|---|---|---|---|---|---|---|
| | | | m | n | Amount, part by mass | Type | Amount, part by mass | Amount, part by mass | Curability, Heating time, minute | | | |
| | | | | | | | | | 1 | 3 | 5 | Surface resistivity |
| | Comp. Ex. 151 | A | 8 | 0 | 0.4 | A | 0.5 | 0.06 | G | G | G | Former half of the order of $10^{13}$ |
| Ex. 122 | | | | | 0.5 | | | 0.07 | G | G | G | Latter half of the order of $10^{12}$ |
| Ex. 123 | | | | | 1 | | | 0.15 | G | G | G | Former half of the order of $10^{12}$ |
| Ex. 124 | | | | | 3 | | | 0.44 | G | G | G | Former half of the order of $10^{12}$ |
| Ex. 125 | | | | | 5 | | | 0.74 | G | G | G | Former half of the order of $10^{12}$ |
| | Comp. Ex. 152 | | | | 6 | | | 0.88 | NG | NG | G | Former half of the order of $10^{12}$ |
| | Comp. Ex. 153 | | 16 | 0 | 0.4 | | | 0.03 | G | G | G | Former half of the order of $10^{13}$ |
| Ex. 126 | | | | | 0.5 | | | 0.04 | G | G | G | Latter half of the order of $10^{12}$ |
| Ex. 127 | | | | | 1 | | | 0.08 | G | G | G | Latter half of the order of $10^{12}$ |
| Ex. 128 | | | | | 3 | | | 0.24 | G | G | G | Latter half of the order of $10^{12}$ |
| Ex. 129 | | | | | 5 | | | 0.41 | G | G | G | Latter half of the order of $10^{12}$ |
| | Comp. Ex. 154 | | | | 6 | | | 0.49 | NG | NG | G | Latter half of the order of $10^{12}$ |

Silicone Adhesive Composition II-β

In Examples 130(II) to 133(II) and Comparative Examples 155(II) and 156(II), polyoxyalkylene (a) with m=8 and n=0, ioninc liquid A and catalyst A were used in the various amounts of the polyoxyalkylene. In Examples 134(II) to 137(II) and Comparative Examples 157(II) and 158(II), polyoxyalkylene (a) with m=16 and n=0, ioninc liquid A and catalyst A were used in the various amounts of the polyoxyalkylene. The results are as shown in Table 26(II). The term "(II)" in the Example and Comparative Example numbers is omitted in this Table.

TABLE 26(II)

| Example | Comparative Example | Catalyst | Component (B-2) m | n | Amount, part by mass | Component (C) Type | Amount, part by mass | Component (c2) Amount, part by mass | Curability, Heating time, minute 1 | 3 | 5 | Surface resistivity |
|---|---|---|---|---|---|---|---|---|---|---|---|---|
| | Comp. Ex. 155 | A | 0 | 10 | 0.4 | A | 0.5 | 0.04 | G | G | G | Former half of the order of $10^{13}$ |
| Ex. 130 | | | | | 0.5 | | | 0.05 | G | G | G | Latter half of the order of $10^{12}$ |
| Ex. 131 | | | | | 1 | | | 0.1 | G | G | G | Latter half of the order of $10^{12}$ |
| Ex. 132 | | | | | 3 | | | 0.29 | G | G | G | Latter half of the order of $10^{12}$ |
| Ex. 133 | | | | | 5 | | | 0.48 | G | G | G | Latter half of the order of $10^{12}$ |
| | Comp. Ex. 156 | | | | 6 | | | 0.58 | NG | NG | G | Latter half of the order of $10^{12}$ |
| | Comp. Ex. 157 | | 12 | 2 | 0.4 | | | 0.04 | G | G | G | Former half of the order of $10^{13}$ |
| Ex. 134 | | | | | 0.5 | | | 0.04 | G | G | G | Former half of the order of $10^{12}$ |
| Ex. 135 | | | | | 1 | | | 0.09 | G | G | G | Former half of the order of $10^{12}$ |
| Ex. 136 | | | | | 3 | | | 0.26 | G | G | G | Former half of the order of $10^{12}$ |
| Ex. 137 | | | | | 5 | | | 0.44 | G | G | G | Former half of the order of $10^{12}$ |
| | Comp. Ex. 158 | | | | 6 | | | 0.53 | NG | NG | G | Former half of the order of $10^{12}$ |

Silicone Adhesive Composition II-β

In Comparative Examples 159(II) and 172(II), ioninc liquid A and comparative catalyst C were used together with component (B-2) shown in the following Table in the various amounts. The results are as shown in Table 27(II). The term "(II)" in the Comparative Example numbers is omitted in this Table.

TABLE 27(II)

| Comparative Example | Catalyst | Component (B-2) m | n | Amount, part by mass | Component (C) Type | Amount, part by mass | Component (c2) Amount, part by mass | Curability, Heating time, minute 1 | 3 | 5 | Surface resistivity |
|---|---|---|---|---|---|---|---|---|---|---|---|
| Comp. Ex. 159 | C | 8 | 0 | 0.5 | A | 0.5 | 0.07 | NG | NG | G | Latter half of the order of $10^{12}$ |
| Comp. Ex. 160 | | 8 | 0 | 1 | A | 0.5 | 0.15 | NG | NG | G | Former half of the order of $10^{12}$ |
| Comp. Ex. 161 | | 8 | 0 | 3 | A | 0.5 | 0.44 | NG | NG | NG | Former half of the order of $10^{12}$ |
| Comp. Ex. 162 | | 8 | 0 | 5 | A | 0.5 | 0.74 | NG | NG | NG | Former half of the order of $10^{12}$ |
| Comp. Ex. 163 | | 16 | 0 | 6 | A | 0.5 | 0.88 | NG | NG | NG | Former half of the order of $10^{12}$ |
| Comp. Ex. 164 | | 16 | 0 | 0.4 | A | 0.5 | 0.03 | NG | NG | G | Former half of the order of $10^{13}$ |
| Comp. Ex. 165 | | 16 | 0 | 0.5 | A | 0.5 | 0.04 | NG | NG | G | Latter half of the order of $10^{12}$ |
| Comp. Ex. 166 | | 16 | 0 | 1 | A | 0.5 | 0.08 | NG | NG | G | Latter half of the order of $10^{12}$ |
| Comp. Ex. 167 | | 16 | 0 | 3 | A | 0.5 | 0.24 | NG | NG | NG | Latter half of the order of $10^{12}$ |
| Comp. Ex. 168 | | 0 | 10 | 5 | A | 0.5 | 0.41 | NG | NG | NG | Latter half of the order of $10^{12}$ |
| Comp. Ex. 169 | | 12 | 2 | 0.5 | A | 0.5 | 0.05 | NG | NG | G | Latter half of the order of $10^{12}$ |
| Comp. Ex. 170 | | 12 | 2 | 1 | A | 0.5 | 0.1 | NG | NG | G | Latter half of the order of $10^{12}$ |
| Comp. Ex. 171 | | 12 | 2 | 3 | A | 0.5 | 0.29 | NG | NG | NG | Latter half of the order of $10^{12}$ |
| Comp. Ex. 172 | | 12 | 2 | 5 | A | 0.5 | 0.48 | NG | NG | NG | Latter half of the order of $10^{12}$ |

Silicone Adhesive Composition II-β

In Examples 138(II) to 149(II) and Comparative Examples 173(II) and 174(II), ioninc liquid B or C was used. The results are as shown in Table 28(II). The term "(II)" in the Example and Comparative Example numbers is omitted in this Table.

TABLE 28(II)

| Example | Comparative Example | Catalyst | Component (B-2) m | n | Amount, part by mass | Component (C) Type | Amount, part by mass | Component (c2) Amount, part by mass | Curability, Heating time, minute 1 | 3 | 5 | Surface resistivity |
|---|---|---|---|---|---|---|---|---|---|---|---|---|
| | Comp. Ex. 173 | A | 8 | 0 | 0.4 | B | 0.5 | 0.06 | G | G | G | Former half of the order of $10^{13}$ |
| Ex. 138 | | | 8 | 0 | 0.5 | | | 0.07 | G | G | G | Latter half of the order of $10^{12}$ |
| Ex. 139 | | | 8 | 0 | 1 | | | 0.15 | G | G | G | Former half of the order of $10^{12}$ |
| Ex. 140 | | | 8 | 0 | 3 | | | 0.44 | G | G | G | Former half of the order of $10^{12}$ |
| Ex. 141 | | | 8 | 0 | 5 | | | 0.74 | NG | G | G | Former half of the order of $10^{12}$ |
| | Comp. Ex. 174 | | 8 | 0 | 6 | | | 0.88 | NG | NG | NG | Former half of the order of $10^{12}$ |
| Ex. 142 | | | 16 | 0 | 0.5 | | | 0.04 | G | G | G | Latter half of the order of $10^{12}$ |
| Ex. 143 | | | 16 | 0 | 5 | | | 0.41 | NG | G | G | Latter half of the order of $10^{12}$ |
| Ex. 144 | | | 8 | 0 | 0.5 | C | | 0.07 | G | G | G | Latter half of the order of $10^{12}$ |
| Ex. 145 | | | 8 | 0 | 1 | | | 0.15 | G | G | G | Former half of the order of $10^{12}$ |
| Ex. 146 | | | 8 | 0 | 3 | | | 0.44 | G | G | G | Former half of the order of $10^{12}$ |
| Ex. 147 | | | 8 | 0 | 5 | | | 0.74 | NG | G | G | Former half of the order of $10^{12}$ |
| Ex. 148 | | | 16 | 0 | 0.5 | | | 0.04 | G | G | G | Latter half of the order of $10^{12}$ |
| Ex. 149 | | | 16 | 0 | 5 | | | 0.41 | NG | G | G | Latter half of the order of $10^{12}$ |

Silicone Adhesive Composition II-β

In Comparative Examples 175(II) to 183(II), catalyst C was substituted for catalyst A in Examples 138(II) to 149(II). The results are as shown in Table 29(II). The term "(II)" in the Comparative Example numbers is omitted in this Table.

TABLE 29(II)

| Comparative Example | Catalyst | Component (B-2) m | n | Amount, part by mass | Component (C) Type | Amount, part by mass | Component (c2) Amount, part by mass | Curability, Heating time, minute 1 | 3 | 5 | Surface resistivity |
|---|---|---|---|---|---|---|---|---|---|---|---|
| Comp. Ex. 175 | C | 8 | 0 | 0.5 | B | 0.5 | 0.07 | NG | NG | G | Latter half of the order of $10^{12}$ |
| Comp. Ex. 176 | | 8 | 0 | 1 | | | 0.15 | NG | NG | G | Former half of the order of $10^{12}$ |
| Comp. Ex. 177 | | 8 | 0 | 3 | | | 0.44 | NG | NG | NG | Former half of the order of $10^{12}$ |
| Comp. Ex. 178 | | 8 | 0 | 5 | | | 0.74 | NG | NG | NG | Former half of the order of $10^{12}$ |
| Comp. Ex. 179 | | 16 | 0 | 0.5 | | | 0.04 | NG | NG | G | Latter half of the order of $10^{12}$ |
| Comp. Ex. 180 | | 16 | 0 | 5 | | | 0.41 | NG | NG | NG | Latter half of the order of $10^{12}$ |
| Comp. Ex. 181 | | 8 | 0 | 0.5 | C | | 0.07 | NG | NG | G | Latter half of the order of $10^{12}$ |
| Comp. Ex. 182 | | 8 | 0 | 1 | | | 0.15 | NG | NG | G | Former half of the order of $10^{12}$ |
| Comp. Ex. 183 | | 8 | 0 | 3 | | | 0.44 | NG | NG | NG | Former half of the order of $10^{12}$ |

Silicone Adhesive Composition II-α

In Comparative Examples 184(II) to 188(II), component (B) was not used. Therefore, addition of component (c2) is unnecessary. The results are as shown in Table 30(II). The term "(II)" in the Comparative Example numbers is omitted in this Table.

TABLE 30(II)

| Comparative Example | Catalyst | Component (B-1) m | n | Amount, part by mass | Component (C) Type | Amount, part by mass | Component (c2) Amount, part by mass | Curability, Heating time, minute 1 | 3 | 5 | Surface resistivity |
|---|---|---|---|---|---|---|---|---|---|---|---|
| Comp. Ex. 184 | A | — | | | A | 0 | — | G | G | G | $10^{15}$ or more |
| Comp. Ex. 185 | | | | | | 1 | | G | G | G | $10^{15}$ or more |
| Comp. Ex. 186 | | | | | | 3 | | G | G | G | Latter half of the order of $10^{14}$ |
| Comp. Ex. 187 | | | | | | 5 | | G | G | G | Latter half of the order of $10^{14}$ |
| Comp. Ex. 188 | | | | | | 10 | | NG | G | G | Latter half of the order of $10^{14}$ |

Silicone Adhesive Composition II-α

In Examples 150(II) to 152(II), component (B-3) and catalyst A were used. The results are as shown in Table 31(II). The term "(II)" in the Example numbers is omitted in this Table.

TABLE 31(II)

|  |  | Component (B-3) | | | Component (C) | | Component (c2) | Curability, | | | Evaluation results |
|---|---|---|---|---|---|---|---|---|---|---|---|
|  |  |  |  | Amount, part by |  | Amount, part by | Amount, part by | Heating time, minute | | | |
| Example | Catalyst | m | n | mass | Type | mass | mass | 1 | 3 | 5 | Surface resistivity |
| Ex. 150 | A | 2 | 0 | 1.5 | A | 0.5 | 0.75 | G | G | G | Latter half of the order of $10^{10}$ |
| Ex. 151 |  | 10 | 0 |  |  |  | 0.40 | G | G | G | Former half of the order of $10^{11}$ |
| Ex. 152 |  | 20 | 0 |  |  |  | 0.20 | G | G | G | Latter half of the order of $10^{11}$ |

Silicone Adhesive Composition II-α

In Comparative Examples 189(II) to 191(II), Component (B-3) and catalyst C were used. The results are as shown in Table 32(II). The term "(II)" in the Comparative Example numbers is omitted in this Table.

TABLE 32(II)

|  |  | Component (B-3) | | | Component (C) | | Component (c2) | Curability, | | | Evaluation results |
|---|---|---|---|---|---|---|---|---|---|---|---|
|  |  |  |  | Amount, part by |  | Amount, part by | Amount, part by | Heating time, minute | | | |
| Comparative Example | Catalyst | m | n | mass | Type | mass | mass | 1 | 3 | 5 | Surface resistivity |
| Comp. Ex. 189 | C | 2 | 0 | 1.5 | A | 0.5 | 0.75 | NG | NG | G | Latter half of the order of $10^{10}$ |
| Comp. Ex. 190 | C | 10 | 0 | 1.5 | A | 0.5 | 0.40 | NG | NG | G | Former half of the order of $10^{11}$ |
| Comp. Ex. 191 | C | 20 | 0 | 1.5 | A | 0.5 | 0.20 | NG | NG | G | Latter half of the order of $10^{11}$ |

As shown in the Comparative Examples above, the compositions comprising the complex of platinum with a vinyl group-containing siloxane together with the oxyalkylene having one or two unsaturated hydrocarbon groups were inferior in the curability, Thus, they could not cure sufficiently by heating for a short time of less than 5 minutes. In contrast, the present silicone adhesive compositions according to the second embodiment cured well in a short time. Thus, they cured sufficiently by heating for less than 5 minutes, particularly for 3 minutes or less. When the adhesive tapes having the adhesive layers obtained from the present compositions were peeled from a tape-stuck body, no residual adhesive occurred. Further, as shown in the Examples above, the cured products of the present compositions comprising a combination of the oxyalkylene compound with the ionic liquid had the low surface resistivities of a former half of the order of $10^{10}$ to a latter half of the order of $10^{12}$, i.e., 1E+10 to 9.9E+12 Ω/sq. and the excellent antistatic properties.

INDUSTRIAL APPLICABILITY

The first silicone adhesive composition of the present invention provides an adhesive layer which has an excellent antistatic property and an excellent strength of bond to various tape substrates. The second silicone adhesive composition of the present invention cures well by heating for a short time to provide an adhesive layer having an excellent antistatic property. The adhesive tape having the first or second adhesive layer may be suitably used for masking electronic parts or in situations where generation of static electricity is undesirable.

The invention claimed is:

1. A silicone adhesive composition, comprising
(A) an addition reaction-curable silicone,
(B1) a compound having at least two unsaturated hydrocarbon groups and two (poly)oxyalkylene residues in one molecule, which is represented by the following formula (1):

(1)

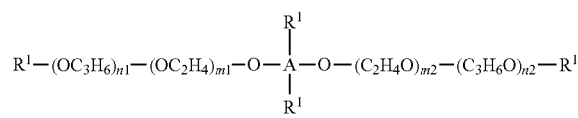

wherein A is a tetravalent hydrocarbon group having 2 to 22 carbon atoms which is selected from the group consisting of a linear or branched, tetravalent aliphatic saturated hydrocarbon group having 2 to 16 carbon atoms and a cyclic hydrocarbon group having 6 to 22 carbon atoms and optionally a branched chain, $R^1$ is, independently of each other, a hydrogen atom, an acyl group, or a monovalent hydrocarbon group which has 1 to 12 carbon atoms, may have an unsaturated bond and may have an oxygen atom, two $R^1$s bonded to A are each aliphatic hydrocarbon group which has the unsaturated bond and optionally an oxygen atom, $m^1$ and $m^2$ are, independently of each other, a real number of 0 to 20, $n^1$ and $n^2$ are, independently of each other, a real number of 0 to 10, $m^1+n^1$ is not zero, $m^2+n^2$ is not zero, and ($C_2H_4O$) and ($C_3H_6O$) may be bonded in random order, and (C) an ionic liquid containing no lithium.

2. The silicone adhesive composition according to claim 1, wherein the compound (B1) is represented by the following formula (2):

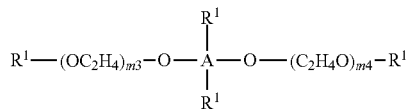

(2)

wherein A and $R^1$ are as defined above, and $m^3$ and $m^4$ are, independently of each other, a real number of 1 to 20.

3. A silicone adhesive composition, comprising (A) an addition reaction-curable silicone, (B1) a compound having at least two unsaturated hydrocarbon groups and two (poly)oxyalkylene residues in one molecule, which is represented by the following formula (1):

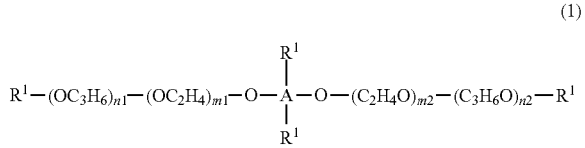

(1)

wherein A is a tetravalent hydrocarbon group having 2 to 22 carbon atoms which is selected from the group consisting of a linear or branched, tetravalent aliphatic saturated hydrocarbon group having 2 to 16 carbon atoms and a cyclic hydrocarbon group having 6 to 22 carbon atoms and optionally a branched chain, $R^1$ is, independently of each other, a hydrogen atom, an acyl group, or a monovalent hydrocarbon group which has 1 to 12 carbon atoms, may have an unsaturated bond and may have an oxygen atom, two $R^1$s bonded to A are each aliphatic hydrocarbon group which has the unsaturated bond and optionally an oxygen atom, $m^1$ and $m^2$ are, independently of each other, a real number of 0 to 20, $n^1$ and $n^2$ are, independently of each other, a real number of 0 to 10, $m^1+n^1$ is not zero, $m^2+n^2$ is not zero, and ($C_2H_4O$) and ($C_3H_6O$) may be bonded in random order, (C) an ionic liquid containing no lithium, and (e) a platinum group metal catalyst which is not a complex with a compound having an unsaturated hydrocarbon bond.

4. The silicone adhesive composition according to claim 3, wherein the compound having an unsaturated hydrocarbon bond for component (e) is an olefinic compound or a vinyl group-containing siloxane.

5. The silicone adhesive composition according to claim 3 or 4, wherein the platinum group metal catalyst is at least one selected from the group consisting of chloroplatinic acid, a solution of chloroplatinic acid in an alcohol, and a reaction product of chloroplatinic acid with an alcohol.

6. The silicone adhesive composition according to claim 3, wherein the compound (B1) is represented by the following formula (2):

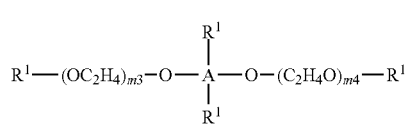

(2)

wherein A and $R^1$ are as defined above, and $m^3$ and $m^4$ are, independently of each other, a real number of 1 to 20.

7. The silicone adhesive composition according to claim 1 or 3, wherein the ionic liquid (C) is at least one selected from the group consisting of quaternary ammonium salts, quaternary phosphonium salts, imidazolium salts, pyridinium salts and pyrrolidinium salts.

8. The silicone adhesive composition according to claim 7, wherein the ionic liquid (C) is a quaternary ammonium salt composed of a quaternary ammonium cation and a bis(trifluoromethylsulfonyl)imide anion.

9. The silicone adhesive composition according to claim 2 or 6, wherein A in formula (1) or (2) is a linear or branched, aliphatic saturated hydrocarbon group having 2 to 16 carbon atoms or a cyclic hydrocarbon group having 6 to 22 carbon atoms.

10. The silicone adhesive composition according to claim 1 or 3, wherein an amount of component (B1) is 0.27 to 3.3 parts by mass and an amount of component (C) is 0.003 to 1.5 parts by mass, relative to 100 parts by mass of the addition curable silicone (A).

11. The silicone adhesive composition according to claim 1, comprising, as the addition curable silicone (A), the following components (a) to (c):

(a) a linear diorganopolysiloxane having two or more alkenyl groups in one molecule in an amount of 20 to 100 parts by mass, (b) an organopolysiloxane having $(R^4)_3SiO_{0.5}$ units and $SiO_2$ units in a mole ratio of the $(R^4)_3SiO_{0.5}$ units to the $SiO_2$ units of 0.6 to 1.7, wherein $R^4$ is a monovalent hydrocarbon group having 1 to 10 carbon atoms, in an amount of 0 to 80 parts by mass, provided that a total amount of components (a) and (b) is 100 parts by mass, (c) an organohydrogenpolysiloxane having two or more SiH groups in one molecule in an amount such that a ratio of the number of SiH groups in component (c) to the total number of the unsaturated hydrocarbon groups in components (a) and (B1) is 1 to 20, and further comprising:

(d) a reaction inhibitor in an amount of 0 to 8 parts by mass, relative to total 100 parts by mass of components (a) and (b), and (e') a catalyst for an addition reaction in a catalytic amount, wherein the amount of component (B1) is 0.27 to 3.3 parts by mass, relative to total 100 parts by mass of components (a), (b) and (c), and the amount of component (C) is 0.003 to 1.5 parts by mass, relative to total 100 parts by mass of components (a), (b) and (c).

12. The silicone adhesive composition according to claim 3, comprising, as the addition curable silicone (A), the following components (a) to (c):
   (a) a linear diorganopolysiloxane having two or more alkenyl groups in one molecule in an amount of 20 to 100 parts by mass,
   (b) an organopolysiloxane having $(R^4)_3SiO_{0.5}$ units and $SiO_2$ units in a mole ratio of the $(R^4)_3SiO_{0.5}$ units to the $SiO_2$ units of 0.6 to 1.7, wherein $R^4$ is a monovalent hydrocarbon group having 1 to 10 carbon atoms, in an amount of 0 to 80 parts by mass, provided that a total amount of components (a) and (b) is 100 parts by mass, and
   (c) an organohydrogenpolysiloxane having two or more SiH groups in one molecule in an amount such that a ratio of the number of SiH groups in component (c) to the total number of the unsaturated hydrocarbon groups in components (a) and (B1) is 1 to 20, and further comprising;
   (d) a reaction inhibitor in an amount of 0 to 8 parts by mass, relative to total 100 parts by mass of components (a) and (b),
   wherein the amount of component (B1) is 0.27 to 3.3 parts by mass, relative to total 100 parts by mass of components (a), (b) and (c), and the amount of component (C) is 0.003 to 1.5 parts by mass, relative to total 100 parts by mass of components (a), (b) and (c).

13. The silicone adhesive composition according to claim 1 or 3, further comprising an organic solvent.

14. A cured product of the silicone adhesive composition according to claim 1 or 3.

15. An adhesive tape comprising a sheet substrate at least one surface of which is laminated with the cured product according to claim 14.

16. An adhesive film comprising a sheet substrate at least one surface of which is laminated with the cured product according to claim 14.

* * * * *